US009116353B2

(12) United States Patent
Sangu

(10) Patent No.: US 9,116,353 B2
(45) Date of Patent: Aug. 25, 2015

(54) MICROSCOPE DEVICE

(75) Inventor: Hiroyuki Sangu, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 940 days.

(21) Appl. No.: 12/560,211

(22) Filed: Sep. 15, 2009

(65) Prior Publication Data

US 2010/0067103 A1    Mar. 18, 2010

(30) Foreign Application Priority Data

Sep. 16, 2008  (JP) ................................ 2008-235946
Sep. 16, 2008  (JP) ................................ 2008-235947
Sep. 16, 2008  (JP) ................................ 2008-235948
Sep. 16, 2008  (JP) ................................ 2008-235950
Jan. 29, 2009  (JP) ................................ 2009-017476
Jun. 18, 2009  (JP) ................................ 2009-145341

(51) Int. Cl.
*G02B 21/06*         (2006.01)
*G02B 21/00*         (2006.01)
(Continued)

(52) U.S. Cl.
CPC .............. *G02B 21/16* (2013.01); *G02B 21/008* (2013.01); *G02B 21/0076* (2013.01); *G02B 21/06* (2013.01); *G02B 21/14* (2013.01)

(58) Field of Classification Search
CPC .. G02B 21/06; G02B 21/0076; G02B 21/008; G02B 21/14; G02B 21/16
USPC .................. 359/368–390, 237, 278, 285–287
See application file for complete search history.

(56) References Cited

U.S. PATENT DOCUMENTS 5,081,349 A * 1/1992 Iwasaki ......................... 250/234
5,386,112 A * 1/1995 Dixon ........................... 250/234
5,617,500 A * 4/1997 Shionoya et al. ............. 385/132
(Continued)

FOREIGN PATENT DOCUMENTS

DE        4326473 A1    2/1995
JP        2-272514 A    11/1990
(Continued)

OTHER PUBLICATIONS

Robert H. Webb et al, "Confocal microscope with large field and working distance." Applied Optics, Aug. 1, 1999, vol. 38, No. 22.
(Continued)

*Primary Examiner* — Thong Nguyen
(74) *Attorney, Agent, or Firm* — Westerman, Hattori, Daniels & Adrian, LLP

(57) ABSTRACT

With a microscope device according to the invention, it is possible to acquire information on a deeper part of a living organism than that in the case of a conventional microscope device. The microscope device according to a first invention comprises an illumination optical system for irradiating an object with illumination rays in a line-like form, a detection optical system for receiving light rays generated by the illumination rays. The second invention relates to a microscope device wherein an objective lens of an illumination optical system, and an objective lens of a detection optical system are at respective positions. The third invention relates to a microscope device wherein a separation filter is structured such that a laser beam can pass through only a part (a region) thereof. The fourth invention relates to a microscope device wherein illumination rays having coherence are separated into two portions.

6 Claims, 43 Drawing Sheets

(51) Int. Cl.
   *G02B 21/16* (2006.01)
   *G02B 21/14* (2006.01)

(56) References Cited

U.S. PATENT DOCUMENTS

| | | | | |
|---|---|---|---|---|
| 5,748,317 | A * | 5/1998 | Maris et al. | 356/502 |
| 5,801,881 | A * | 9/1998 | Lanni et al. | 359/386 |
| 5,969,854 | A | 10/1999 | Stelzer et al. | |
| 5,973,828 | A | 10/1999 | Webb | |
| 6,423,956 | B1 | 7/2002 | Mandella et al. | |
| 6,496,267 | B1 | 12/2002 | Takaoka | |
| 6,642,504 | B2 * | 11/2003 | Cathey, Jr. | 250/216 |
| 7,050,178 | B2 * | 5/2006 | Morath et al. | 356/630 |
| 2001/0019414 | A1 | 9/2001 | Bewersdorf | |
| 2003/0132394 | A1 | 7/2003 | Wolleschensky et al. | |
| 2006/0146402 | A1 * | 7/2006 | Nakata | 359/388 |
| 2006/0221441 | A1 | 10/2006 | Zimmerman et al. | |

FOREIGN PATENT DOCUMENTS

| | | |
|---|---|---|
| JP | 4-127152 A | 4/1992 |
| JP | 8-166514 A | 6/1996 |
| JP | 2006-504989 A | 2/2006 |
| JP | 2006-509246 A | 3/2006 |
| JP | 2006-275685 A | 10/2006 |
| JP | 2007-233241 A | 9/2007 |
| WO | 2004/053558 A1 | 6/2004 |

OTHER PUBLICATIONS

Thomas D. Wang et al, "Dual-axis confocal microscope for high-resolution in vivo imaging." Optics Letters, Mar. 15, 2003, vol. 28, No. 6.

European Office Action, issued May 18, 2010 for corresponding European Patent Application No. 09011813.4.

European Search Report dated Nov. 11, 2009, issued in corresponding European Patent Application No. 09011813.4.

Japanese Office Action dated Jan. 15, 2013, issued in corresponding Japanese patent application No. 2008-235946, w/ English translation, ( 5 pages).

Japanese Office Action dated Jan. 15, 2013, issued in corresponding Japanese patent application No. 2008-235948, w/ English translation, (6 pages).

* cited by examiner

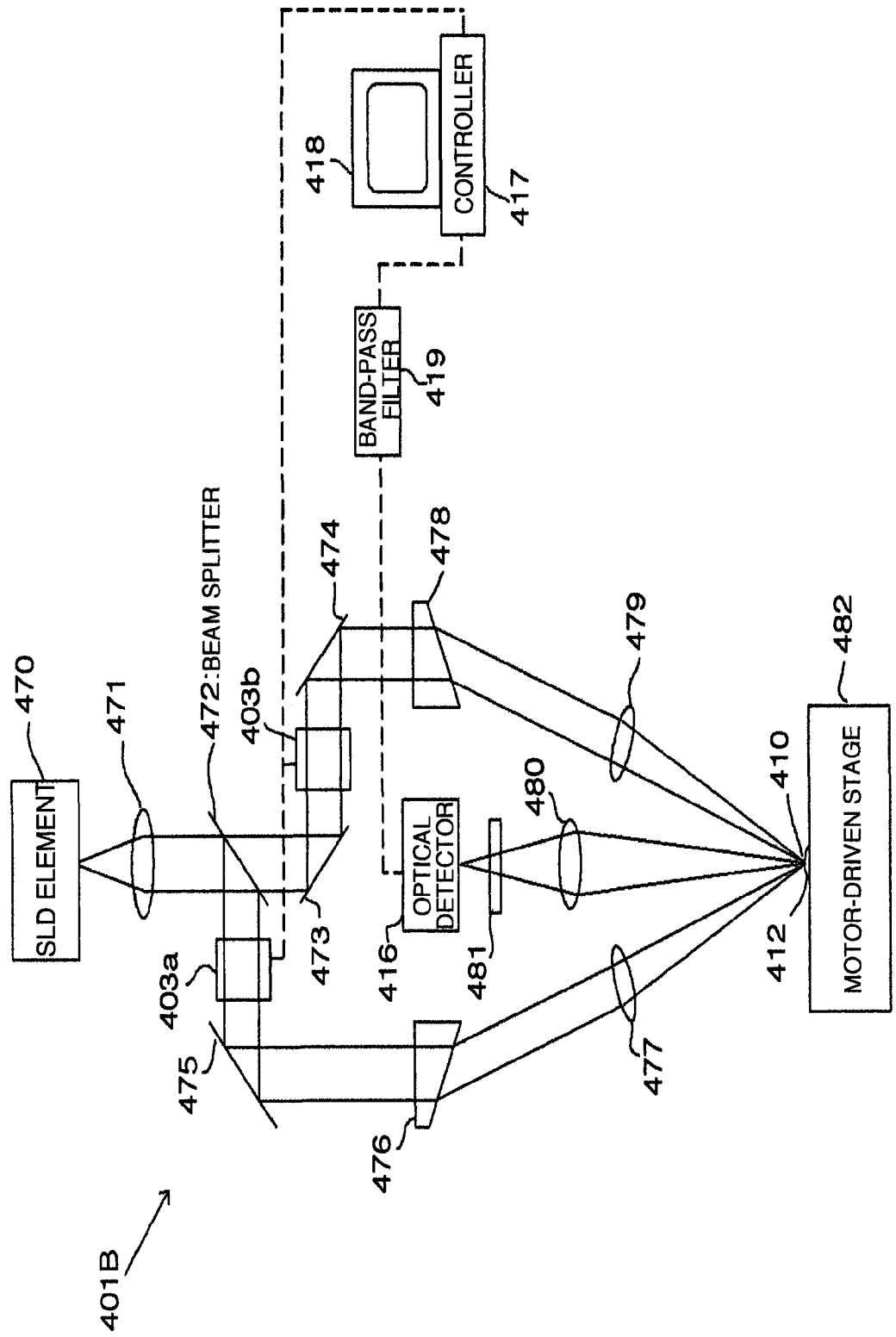

MICROSCOPE DEVICE

FIELD OF THE INVENTION

The present invention includes first to fourth inventions, the first invention relating to a microscope device comprising an illumination optical system for irradiating an object with illumination rays in a line-like form, a detection optical system for receiving light rays generated by the illumination rays in the line-like form to thereby form an image on a detector, and scanning means for scanning the illumination rays in the line-like form, wherein information on an image on a flat plane, obtained by scanning the illumination rays in the line-like form by use of the scanning means, is acquired on the basis of a signal from a detector.

The second invention relates to a microscope device wherein an objective lens of an illumination optical system for irradiating an object with illumination rays, and an objective lens of a detection optical system for detecting feedback light rays based on the illumination rays are at respective positions where respective primary axes of the objective lenses have undergone parallel translation against each other, the objective lenses being disposed such that respective focal planes thereof coincide with each other.

The third invention relates to a microscope device wherein a specimen is irradiated with illumination rays via an objective lens to thereby form a focal point of the illumination rays on the specimen while acquiring feedback light rays from the focal point via the objective lens to be detected by a detector.

The fourth invention relates to a microscope device wherein a specimen is irradiated with illumination rays to thereby detect feedback light rays from the specimen, based on the illumination rays.

BACKGROUND OF THE INVENTION

When observation is conducted on a deep part of a living organism during observation with a microscope, an S/N ratio of an mage undergoes deterioration due to effects of feedback light rays from other than a focal plane. This phenomenon cannot be sufficiently removed even with the use of a confocal microscope.

Techniques for solving this problem (refer to U.S. Pat. No. 5,973,828, U.S. Pat. No. 5,969,854, U.S. Pat. No. 6,423,956, DE4326473) have been proposed.

With those techniques, 2 units of objective lenses are employed to be disposed such that respective focal regions intersect each other, combination of such a layout with confocal microscope techniques enabling information on an intersected region only to be obtained, thereby enhancing primarily resolution depthwise (refer to FIG. 2, U.S. Pat. No. 5,973,828) although horizontal resolution undergoes deterioration to some extent.

In Non-patent Document 2, it has been described that a structure made up of lenses relatively low in NA has advantageous effects as follows:
(1) Resolution in the direction of the optical axis is enhanced.
(2) In observation on deep parts of a living organism, aberration is insusceptible to occur because NA is small.
(3) Components small in diameter can be fabricated with greater ease.
(4) Since WD can be rendered longer, the structure is suited for observation on the deep parts.
(5) Since two optical paths are separate from each other, observation on the deep parts is insusceptible to effects of noise rays such as rays of feedback light from other than an observation plane, and so forth.

Further, in FIG. 7 of U.S. Pat. No. 5,973,828, there has been disclosed a scanning mechanism for scanning respective positions of focal points while keeping positional relation between two objective lenses. Still further, in Non-patent Document 1, and Non-patent Document 2, there has been disclosed a method for scanning while moving an object with the use of a stage, and so forth.
[Patent Document 1] U.S. Pat. No. 5,973,828
[Patent Document 2] U.S. Pat. No. 5,969,854
[Patent Document 3] U.S. Pat. No. 6,423,956
[Patent Document 4] German Patent No. 4326473
[Non-patent Document 1] "Confocal microscope with large field and working distance", Applied Optics, Vol. 38, No. 22, pp. 4870
[Non-patent Document 2] "Dual axis confocal microscope for high resolution in vivo imaging", Optics Letters, Vol. 28, No. 6, pp. 414

SUMMARY OF THE INVENTION

However, it is considered that the mechanism for scanning the respective positions of focal points while keeping positional relation between the focal points of light rays passing through two objective lenses intersecting each other at an angle will be complex, and scanning will take time. Further, it is also considered that in the case of adopting the method for scanning while moving an object with the use of the stage, and so forth, very long scanning time will be required in practice. Further, with the use of the two objective lenses intersecting each other at an angle, light rays are irradiated from one side while the light rays are detected on the other side, so that an S/N ratio of a signal is enhanced, and observation on a deep part of a living organism is now possible.

However, it is still impossible to cope with a desire for acquiring information on a deeper part thereof.

The first to third inventions each have an object of providing a microscope device capable of easily scanning illumination rays, and suitable for observation on a deep part of a living organism.

Further, it is an object of the fourth invention to provide a microscope device capable of acquiring information on a part deeper than that in the case of a conventional microscope device, and suitable for observation on a deep part of a living organism.

The microscope device according to the first invention is a microscope device comprising an illumination optical system for irradiating an object with illumination rays in a line-like form, a detection optical system for receiving light rays generated by the illumination rays in the line-like form to thereby form an image on a detector, and scanning means for scanning the illumination rays in the line-like form, wherein information on an image on a flat plane, obtained by scanning the illumination rays in the line-like form by use of the scanning means, is acquired on the basis of a signal from a detector, a primary axis of an objective lens of the illumination optical system, and a primary axis of an objective lens of the detection optical system intersect each other at a given angle, and the detector detects intensity distribution on a relevant line of the light rays generated by the illumination rays in the line-like form. With this microscope device, the primary axis of the objective lens of the illumination optical system, and the primary axis of the objective lens of the detection optical system intersect each other at the given angle, and the detector detects intensity distribution on the relevant line of the light rays generated by the illumination rays in the line-like form, so that it is possible to obtain a microscope device capable of scanning the illumination rays with ease, suitable for observation on a deep part of an object.

The light rays generated by the illumination rays in the line-like form may be fluorescent rays from the object.

The light rays generated by the illumination rays in the line-like form may be reflected, or scattered light rays from the object.

The given angle may be 90 degrees.

The given angle may be in a range of 30 to 180 degrees.

The object may be irradiated with a near infrared laser beam in the illumination optical system.

The object may be irradiated with the illumination rays in the line-like form by causing parallel rays to fall on a cylindrical lens in the illumination optical system.

The illumination rays in the line-like form may be present on a focal plane of the detection optical system.

The object may be irradiated with the illumination rays in the line-like form by forming an image of a slit on the object in the illumination optical system.

An intersection line between a focal plane of the illumination optical system and a focal plane of the detection optical system may be irradiated with the illumination rays in the line-like form.

The scanning means scans illumination rays in the line-like form in a direction perpendicular to the line.

The scanning means may cause the whole or a part of both the illumination optical system, and the detection optical system to move, thereby scanning the illumination rays in the line-like form.

A slit may be disposed on an image-forming plane of the detection optical system.

The detector may be a line sensor.

The detector may be a two-dimensional sensor, and the two-dimensional sensor may be moved in conjunction with light rays for detection in such a way as to be in sync with scanning by the scanning means.

Thus, with the microscope device according to the first invention, since the primary axis of the objective lens of the illumination optical system, and the primary axis of the objective lens of the detection optical system intersect each other at the given angle, and the detector detects intensity distribution on the relevant line of the light rays generated by the illumination rays in the line-like form, it is possible to obtain a microscope device capable of scanning the illumination rays with ease, suitable for observation on a deep part of an object.

The microscope device according to the second invention is a microscope device wherein an objective lens of an illumination optical system for irradiating an object with illumination rays, and an objective lens of a detection optical system for detecting feedback light rays based on the illumination rays are at respective positions where respective primary axes of the objective lenses have undergone parallel translation against each other, the objective lenses being disposed such that respective focal planes thereof coincide with each other, a convergence point of the illumination optical system coinciding with a detection point to be detected by the detection optical system while the respective focal planes being scanned according to the convergence point, and the detection point with the convergence point kept in coincidence with the detection point.

With this microscope device, since the convergence point of the illumination optical system coincides with a detection point to be detected by the detection optical system while the respective focal planes being scanned according to the convergence point, and the detection point with the convergence point kept in coincidence with the detection point, it is possible to obtain a microscope device capable of scanning the illumination rays with ease, suitable for observation on a deep part of an object.

An optical axis of the illumination optical system and an optical axis of the detection optical system may intersect each other at an angle in a range of 30 to 150 degrees on the focal plane.

The microscope device described as above may further comprise means for suppressing detection of light rays of the feedback light rays from entering the illumination optical system.

The illumination optical system may not share an optical path with the detection optical system.

The illumination optical system may share a portion of an optical path thereof with the detection optical system, the feedback light rays may be fluorescent rays, and a filter or mirror having wavelength characteristics may be used as means for suppressing detection of light rays of the fluorescent rays from entering the illumination optical system.

The illumination optical system may share a part of an optical path thereof with the detection optical system, the feedback light rays may be reflected or scattered light rays, and an optical component having polarization characteristics may be used as means for suppressing detection of light rays of the reflected or scattered light rays from entering the illumination optical system.

A variable mirror may be used as means for scanning respective focal planes according to the convergence point, and the detection point.

A mask pattern member with a predetermined pattern formed thereon may be used as means for scanning respective focal planes according to the convergence point, and the detection point.

A pinhole pattern may be formed on the mask pattern member, and scanning is executed by rotation of the mask pattern member.

A set of the convergence points of the illumination optical system may be in the form of a line, and a set of the detection points to be detected by the detector may also be in the form of a line, coinciding with the set of the convergence points.

The illumination rays may be a near infrared laser beam.

With the microscope device according to the second invention, since the convergence point of the illumination optical system coincides with the detection point to be detected by the detection optical system while the respective focal planes are scanned according to the convergence point, and the detection point with the convergence point kept in coincidence with the detection point, it is possible to obtain a microscope device capable of scanning the illumination rays with ease, suitable for observation on a deep part of an object.

The microscope device according to the third invention is a microscope device wherein a specimen is irradiated with illumination rays via an objective lens to thereby form a focal point of the illumination rays on the specimen while acquiring feedback light rays from the focal point via the objective lens to be detected by a detector, an optical path of the illumination rays, from the objective lens to the focal point, being separated from an optical path of light rays of the feedback light rays, detected by the detector, from the focal point to the objective lens, throughout the respective optical paths.

With this microscope device, the optical path of the illumination rays, from the objective lens to the focal point, is separated from the optical path of light rays of the feedback light rays, detected by the detector, from the focal point to the objective lens, throughout the respective optical paths, so that it is possible to obtain a microscope device capable of scanning the illumination rays with ease, suitable for observation on a deep part of a living organism.

The feedback light rays may be fluorescent rays.

The feedback light rays may be reflected or scattered light rays.

The focal point of the illumination rays may be scanned on a focal plane of the objective lens, and the feedback light rays from the respective focal points as scanned may be detected by the detector.

The focal point of the illumination rays may be scanned by driving a mirror in the optical path of the illumination rays.

The focal point of the illumination rays may be scanned by driving a mask pattern member in the optical path of the illumination rays.

A region at a position of a pupil of the objective lens, passed by the illumination rays reaching the focal point from the objective lens, is separated from a region at the position of the pupil of the objective lens, passed by the light rays of the feedback light rays, detected by the detector.

A region passed by the illumination rays and a region passed by the feedback light rays may be present in respective segments radially separated by at least one length of a straight line or a curve, crossing the position of the pupil of the objective lens, at the position of the pupil.

A region passed by the illumination rays and a region passed by the feedback light rays may be present in respective segments radially separated by at least two lengths of straight lines, or curves, intersecting each other, and crossing the position of the pupil of the objective lens, at the position of the pupil.

A region passed by the illumination rays and a region passed by the feedback light rays may be present in respective segments radially separated by at least one length of a straight line or a curve, crossing the position of the pupil of the objective lens, at the position of the pupil.

A region passed by the illumination rays and a region passed by the feedback light rays may be present in respective segments separated between inside and outside by at least one closed length of straight line or a curve, present inside the position of the pupil of the objective lens, at the position of the pupil.

Optical path limiting means for separating the optical path of the feedback light rays from the optical path of the illumination rays may be provided.

The feedback light rays may be fluorescent rays, and a filter or mirror having wavelength characteristics may be used as the optical path limiting means to thereby limit an optical path of the fluorescent rays to be detected by the detector.

A filter or mirror having wavelength characteristics may be used as the optical path limiting means to thereby limit an optical path of the illumination ray falling on the objective lens The feedback light rays may be reflected or scattered light rays, and a filter or a mirror, having polarization characteristics may be used as the optical path limiting means to thereby limit an optical path of the feedback light rays detected by the detector.

A portion of the optical path of the illumination rays or the optical path of the feedback light rays may be limited by a light-blocking mask serving as the optical path limiting means.

The optical path limiting means may be provided in close proximity to a position of a pupil of the objective lens The optical path limiting means may be provided in close proximity to a spot where the position of the pupil of the objective lens is relayed.

The optical path limiting means may be provided in a potion of an optical path, where the illumination rays, or the feedback light rays are in the form of parallel rays.

The optical path of the feedback light rays may be made up of optical components independent from those making up the optical path of the illumination rays.

A set of the focal points of the illumination rays may be in the form of a line, and a set of the detection points to be detected by the detection optical system may be in the form of a line, coinciding with the set of the focal points.

The illumination rays are a near infrared laser beam.

With the microscope device according to the third invention, the optical path of the illumination rays, from the objective lens to the focal point, is separated from the optical path of light rays of the feedback light rays, detected by the detector, from the focal point to the objective lens, throughout the respective optical paths, so that it is possible to obtain a microscope device capable of scanning the illumination rays with ease, suitable for observation on a deep part of a living organization.

A microscope device according the fourth invention is a microscope device wherein a specimen is irradiated with illumination rays to thereby detect feedback light rays from the specimen, based on the illumination rays, comprising modulation means for separating the illumination rays having coherence into at least two portions to thereby apply modulation to at least one portion of the illumination rays as separated, objective lenses for guiding the two portions of the illumination rays as separated such that respective optical paths overlap each other on the specimen, and detection means for detecting light rays generated by interference light occurring in a region where the respective optical paths overlap each other as feedback light rays.

With this microscope device, modulation is applied to the at least one portion of the illumination rays as separated, the two portions of the illumination rays as separated are guided such that respective optical paths overlap each other on the specimen, and the light rays generated by the interference light occurring in the region where the respective optical paths overlap each other are detected as the feedback light rays, so that it is possible to acquire information on a deeper part of a living organism than that in the case of a conventional microscope device.

The objective lenses may cause the two portions of the illumination rays as separated to form one and the same focal point on the specimen, and the detection means may acquire the light rays generated by the interference light occurring at the focal point as the feedback light rays via the objective lens for detection.

Optical paths of the two portions of the illumination rays as separated between the respective objective lenses and the focal point may be separated from each other so as not to overlap each other.

Phase modulation, or frequency modulation, varying at a given frequency, may be applied to one of the two portions of the illumination rays, intensity modulation varying at the frequency induced by the interference light occurring at the focal point on the specimen, and a signal of the light rays generated by the interference light may be acquired to thereby extract a frequency component of the modulation.

Modulations at given frequencies differing from each other may be applied to at least two portions of the illumination rays, and intensity modulation varying at a sum of, or a difference between at least two frequencies may be induced by the interference light occurring at the focal point on the specimen, The modulation may be any of phase modulation, intensity modulation, and frequency modulation, a signal of the light rays generated by the interference light may be acquired, and a frequency component corresponding to the sum of, or the difference between the at least two frequencies may be extracted.

The feedback light rays may be fluorescent rays, and the detection means may detect the fluorescent rays generated by the interference light.

At least two portions of the illumination rays may fall on the objective lenses, respectively, as parallel rays, each being light rays smaller in size than the diameter of a pupil of the objective lens at a pupil position of the objective lens where no overlapping occurs.

A region where the illumination rays overlap each other may be scanned, and the detection means may detect feedback light rays from the respective focal points as scanned.

With this microscope device according to the fourth invention, modulation is applied to the at least one portion of the illumination rays as separated, and the two portions of the illumination rays as separated are caused to form one and the same focal point on the specimen, thereby acquiring the light rays generated by the interference light occurring at the focal point as the feedback light rays, so that it is possible to acquire information on a deeper part of a living organism than that in the case of a conventional microscope device, and the microscope device is suitable for observation on a deep part of a living organism.

BRIEF DESCRIPTION OF THE DRAWINGS

FIG. 43 is a block diagram showing a configuration of a microscope device according to Embodiment 21.

DETAILED DESCRIPTION OF THE PREFERRED EMBODIMENTS

There are described hereinafter embodiments of a microscope device according to a first invention with reference to embodiments 1, 2, embodiments of a microscope device according to a second invention with reference to embodiments 3 to 9, embodiments of a microscope device according to a third invention with reference to embodiments 10 to 18, and embodiments of a microscope device according to a fourth invention with reference to embodiments 19 to 21.

First, the embodiments of the microscope device according to the first invention are described.

Embodiment 1

A microscope device according to Embodiment 1 is described hereinafter with reference to FIGS. 1 to 3.

Figure 1:
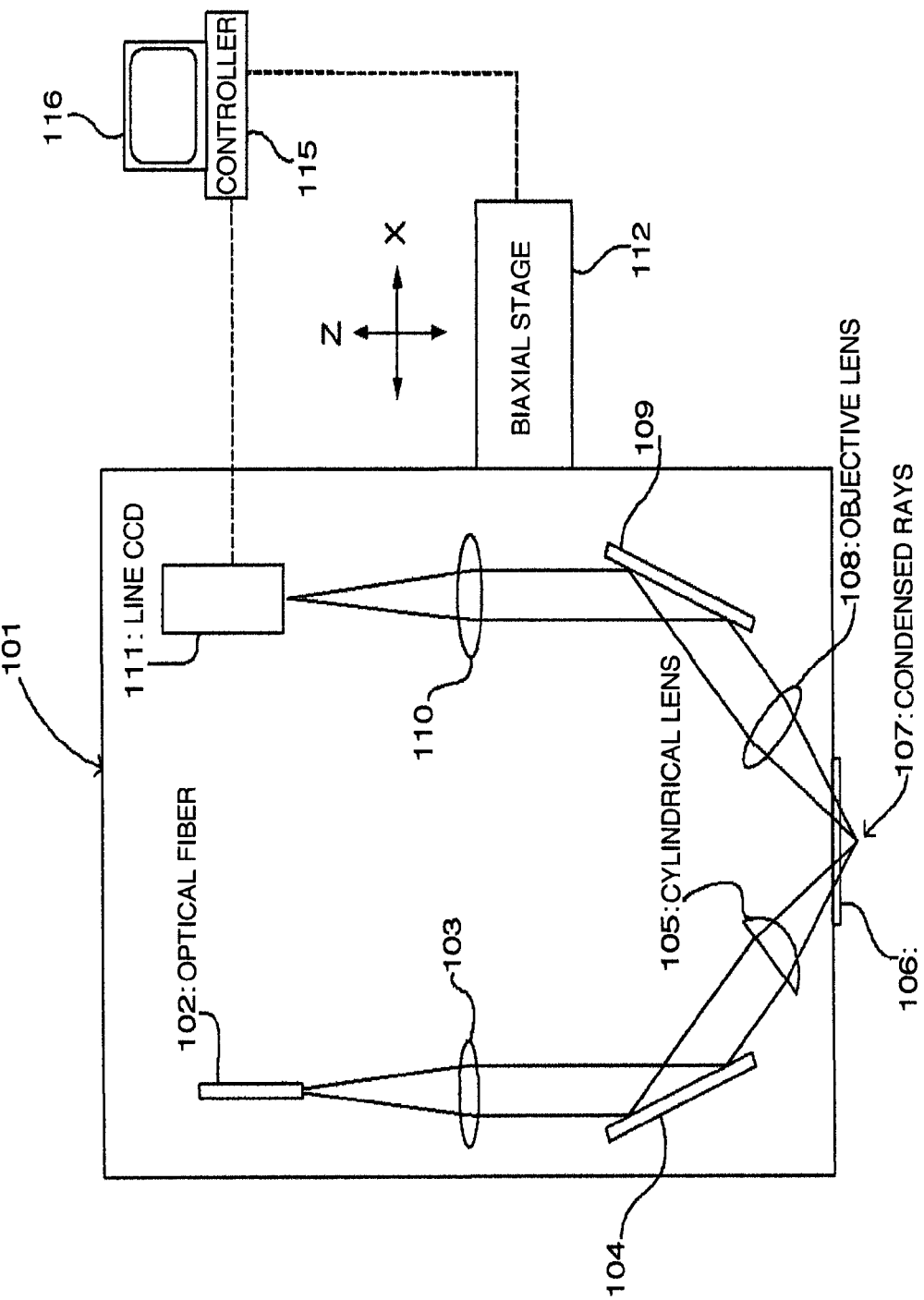
FIG. 1 is a block diagram showing a configuration of a microscope device according to Embodiment 1.

FIG. 1 is a block diagram showing a configuration of the microscope device according to Embodiment 1.

As shown in FIG. 1, an optical fiber 102 for guiding light rays from a light source (not shown) is disposed at an optical head 101 of the microscope device according to the present embodiment. In this case, near infrared rays for observation on a deep part of a living organism are preferable as the light rays from the light source, and the optical fiber 102 small in core diameter, such as a single-mode fiber, is preferable. A collimator lens 103 is provided in front of the optical fiber 102.

Further, the optical head 101 comprises a reflecting mirror 104, a cylindrical lens 105, an aperture window 106, an objective lens 108, a mirror 109, and an imaging lens 110, which are all disposed along an optical path.

The cylindrical lens 105 comprises a circular cylindrical face having an axis in the Y-direction (an axis perpendicular to the plane of FIG. 1). Herein, respective optical components are disposed such that a focal point of the objective lens 108, on a side thereof, adjacent to an object, comes substantially to a midpoint (midpoint of a width of lines) of condensed rays 107 in a line-like shape, formed when parallel rays are introduced to the cylindrical lens 105 along the primary axis thereof.

Use is made of the objective lens 108 relatively small in NA. Further, a line CCD 111 is disposed at a position of condensed rays of the imaging lens 110, as shown in FIG. 1. Herein, pixels of the line CCD 111 are arrayed in the Y-direction (the direction perpendicular to the plane of FIG. 1).

As shown in FIG. 1, the optical head 101 can be moved in the X-direction, and the Z-direction, respectively, by a biaxial stage 112.

Further, the line CCD 111, and the biaxial stage 112 are connected to a controller 115 via signal lines indicated broken lines, respectively, and a monitor 116 is connected to the controller 115.

Now, operation of the microscope device according to the present embodiment is described hereinafter.

Near infrared rays from the light source are emitted from the tip of the optical fiber 102 to be subsequently converted into parallel rays by the collimator lens 103, and the parallel rays are reflected by the reflecting mirror 104 to be then transmitted through the aperture window 106 by the action of the cylindrical lens 105 before being turned into condensed rays 107 in the line-like form. Herein, the condensed rays 107 are turned into the shape of a line extending in the Y-direction (the direction perpendicular to the plane of FIG. 1).

Figure 2:
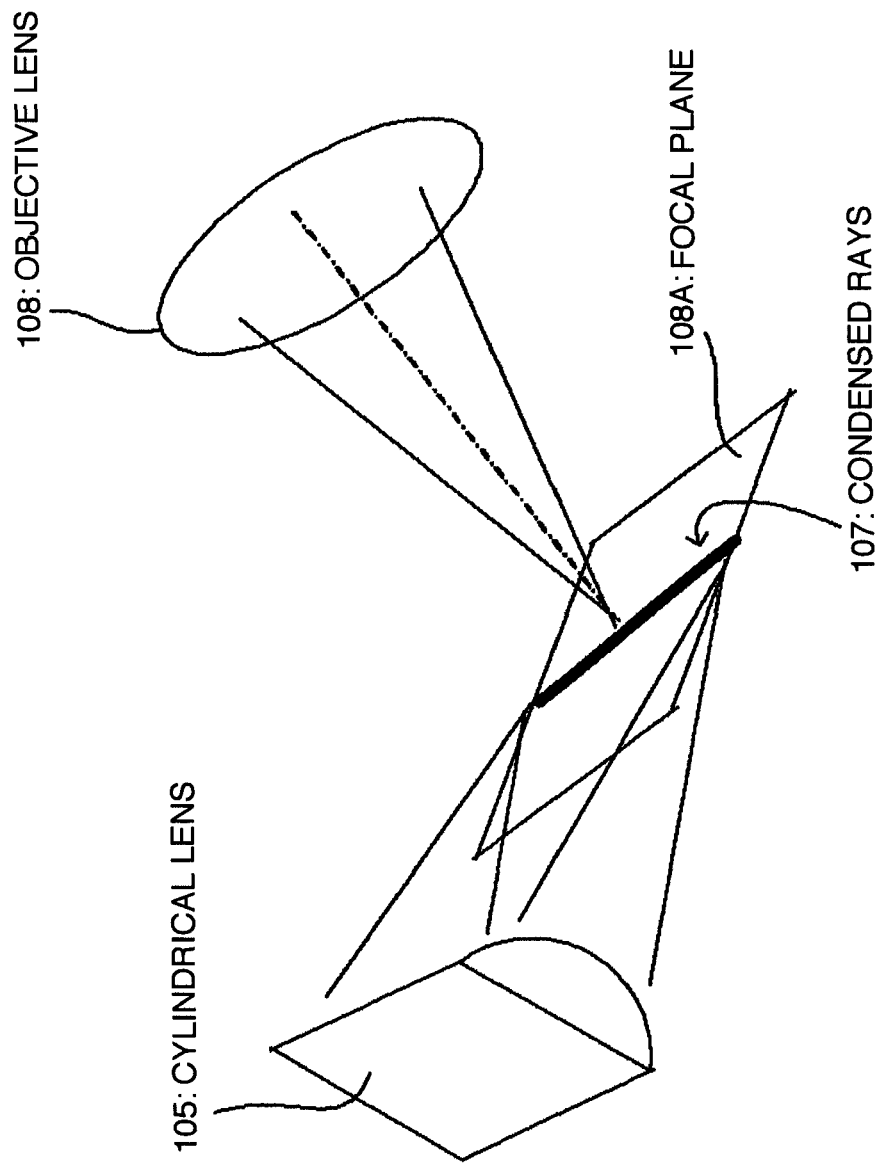
FIG. 2 is a view schematically showing a condensing point.

FIG. 2 is a view schematically showing a condensing point.

As shown in FIG. 2, the line of the condensed rays 107 is positioned on a focal plane 108A of the objective lens 108. If an object, such as a living organism, and so forth, is present in the condensed rays 107, and scattered light rays, or fluorescent rays and so forth are emitted therefrom, those rays are converted into parallel rays by the action of the objective lens 108. The parallel rays are reflected by the mirror 109, and the condensed rays 107 in the line-like form are turned into an image on the line CCD 111 by the action of the imaging lens 110, whereupon intensity distribution on the line of the condensed rays 107 is detected by the line CCD 111. The pixels of the line CCD 111 can be regarded sufficiently small, so that the line CCD 111 acts as a confocal optical system, being less susceptible to the effect of light rays from other than the focal plane 108A. Further, a slit may be provided on the line CCD 111 as necessary.

Figure 3:
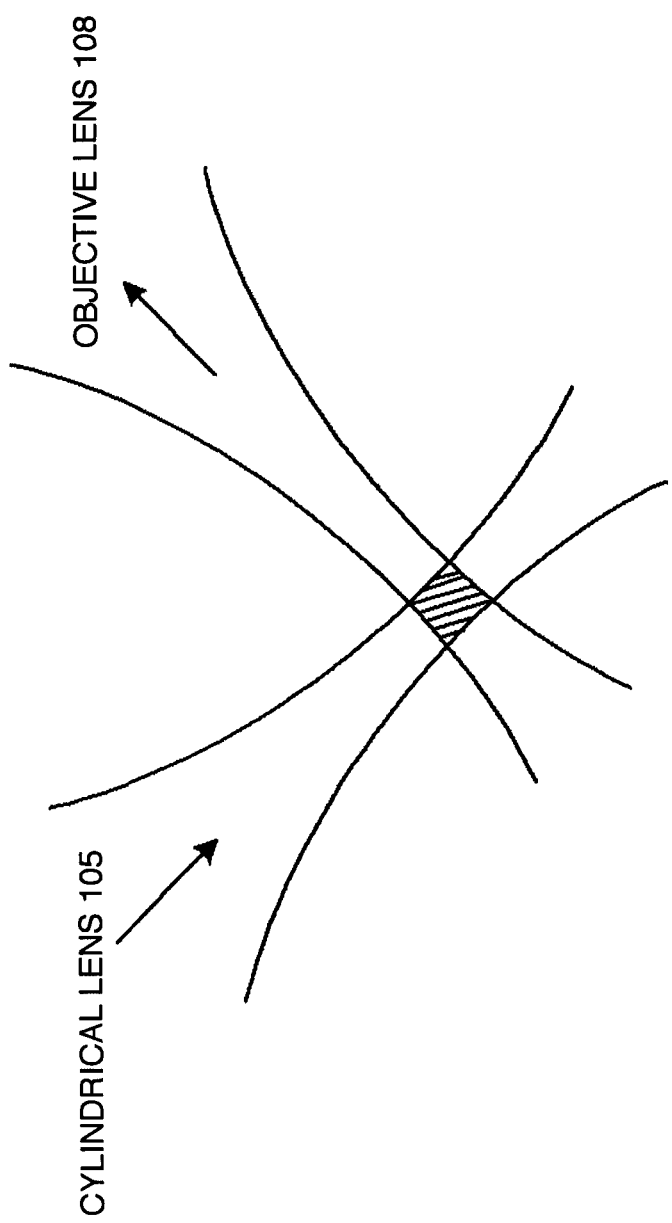
FIG. 3 is an enlarged view of condensed rays 107 in a line-like shape.

FIG. 3 is an enlarged view of the condensed rays 107 in the line-like form.

In FIG. 3, there are shown a beam spread according to point spread function (PSF) of the cylindrical lens 105, and a beam spread according to point spread function (PSF) in the case where the parallel rays are introduced to the objective lens 108 along the primary axis thereof from a reverse direction. Since light rays only in a region indicated by hatching in FIG. 3, where the light rays turned into beams by the action of both the lenses overlap one another are projected onto the line CCD 111, information on the line of the condensed rays 107 is conveyed with resolution in the optical axis direction, kept in excellent state.

In the case where scattered light rays are acquired from the condensed rays 107, a configuration shown in FIG. 1, as it is, may be adopted, however, in the case where fluorescence information is acquired from an object, a fluorescent filter (not shown) is preferably inserted in close proximity to the front of the line CCD 111 where appropriate.

Now, the line of the condensed rays 107 is scanned in the X-axis direction by moving the biaxial stage 112 in the X-axis direction (FIG. 1) by the action of the controller 115. Imaging of information on the line of the condensed rays 107 in each position at this point in time is executed by the line CCD 111. The controller 115 is capable of displaying an image in section along the x-y plane on the monitor 116 by making use of a position signal of the biaxial stage 112, and a signal from the line CCD 111, or capable of recording the image in section along the x-y plane in an internal memory of the controller 115.

Further, the line of the condensed rays 107 is scanned in the Z-axis direction by moving the biaxial stage 112 in the Z-axis direction (FIG. 1) by the action of the controller 115. Imaging of information on the line of the condensed rays 107 in each position at this point in time is executed by the line CCD 111. The controller 115 is capable of displaying an image in section along a y-z plane on the monitor 116 by making use of a position signal of the biaxial stage 112, and a signal from the line CCD 111, or capable of recording the image in section along the y-z plane in an internal memory of the controller 115.

With the embodiment described as above, for an objective lens, use is made of the cylindrical lens and the objective lens, however, use is not limited thereto, and use may be made of other lens systems having a similar function. Furthermore, use may be made of a catoptric system such as a concave mirror.

Thus, with the microscope device according to the present embodiment, the focal point of the objective lens 108 of the detection optical system, on the side thereof, adjacent to an object, is positioned on a line where light rays of the illumination optical system are condensed, and both the optical systems are disposed such that the respective optical axes thereof intersect each other at an angle, so that it is possible to acquire the information on the line of the condensed rays, with resolution excellent in an optical axis direction. The angle formed between the respective optical axes is preferably selected in a range of 30 to 180°, more preferably at 90°.

Further, since an illumination optical path is separated from an optical path of condensed rays, the microscope device according to the present embodiment has a configuration wherein light rays from other than a position of the condensed rays are insusceptible to be fed back, so that an image excellent in S/N ratio can be acquired.

Still further, since the cylindrical lens 105 small in NA is used as the objective lens of the illumination optical system, sufficient WD can be obtained, and aberration is reduced, rendering the configuration to be suitable for observation on a deep part of an object.

Yet further, the microscope device is configured such that an image is acquired by scanning the line as above, so that a canning method is easy to carry out and high-speed scanning is possible.

Furthermore, with the present embodiment of the invention, the light source for emitting near infrared rays is adopted so that it is possible to obtain the microscope device suitable for observation on the deep parts of an object.

Embodiment 2

A microscope device according to Embodiment 2 is described hereinafter with reference to FIGS. 4 to 6.

Figure 4:
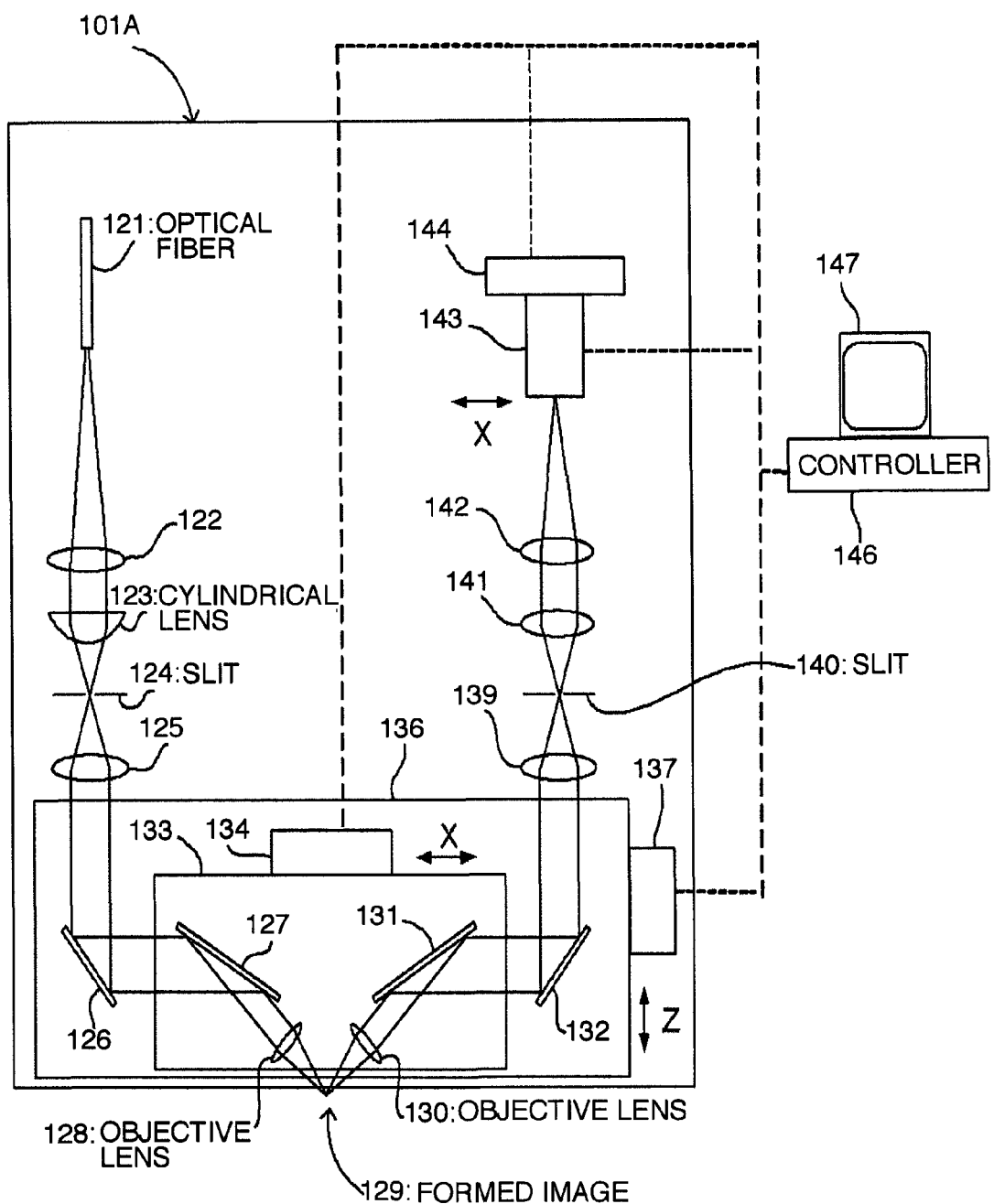
FIG. 4 is a block diagram showing a configuration of a microscope device according to Embodiment 2.

FIG. 4 is a block diagram showing a configuration of the microscope device according to Embodiment 2.

As shown in FIG. 4, an optical head 101A of the microscope device according to the present embodiment comprises an optical fiber 121 for guiding light rays from a light source (not shown), a collimator lens 122, a cylindrical lens 123, a slit 124 provided at a point of condensed light rays from the cylindrical lens 123, an imaging lens 125, reflecting mirrors 126, 127, and an objective lens 128, which are all disposed along an optical path of an illumination optical system.

Further, an objective lens 130 is disposed such that a focal point 129 of the objective lens 130, on a side thereof, adjacent to an object, will coincide with that of the objective lens 128. An angle between optical axes of the two objective lenses is 90°. For those objective lenses 128, 130, use is made of an objective lens relatively small in NA. Further, the angle between the optical axes need not be 90°, but is preferably selected so as to fall in a range of 30 to 180°.

Further, reflecting mirrors 131, 132 are disposed as shown in FIG. 4.

Herein, the reflecting mirrors 127, 131 and the objective lenses 128, 130 are integrated by an x-axis drive unit 133. The x-axis drive unit 133 is movable in the X-axis direction by the action of an x-axis drive stage 134. Further, the x-axis drive unit 133, the x-axis drive stage 134, the reflecting mirror 126, and a reflecting mirror 132 are integrated as a z-axis drive unit 136, which is made up so as to be movable in a Z-axis direction by the action of a z-axis drive stage 137.

Still further, as shown in FIG. 4, an imaging lens 139, a slit 140 provided at an imaging position of the imaging lens 139, and relay lenses 141, 142 are disposed along the optical path.

A high sensitivity camera 143 is movable by the action of a second x-axis drive stage 144.

The x-axis drive stage 134, the z-axis drive stage 137, the second x-axis drive stage 144, and the high sensitivity camera 143 are connected to a controller 146 via a signal line indicated by a broken line, and further, a monitor 147 is connected to the controller 146.

Next, operation of the microscope device according to the present embodiment is described hereinafter.

Near infrared rays from the light source are emitted from the tip of the optical fiber 121 to be subsequently converted into parallel rays by the collimator lens 122, and the parallel rays are condensed at the slit 124 by the action of the cylindrical lens 123. Light rays having passed the slit 124 are converted into parallel rays corresponding to the position of the slit 124 by the imaging lens 125. The parallel rays are reflected by the reflecting mirrors 126, 127 before passing through the objective lens 128. Herein, the slit 124 is projected on a formed image 129 by the actions of the imaging lens 125, and the objective lens 128.

At this point in time, the slit 124 is extended in the Y-direction (the direction perpendicular to the plane of FIG. 4), and the formed image 129 as well will be in the form of a line extending in the Y-direction.

Figure 5:
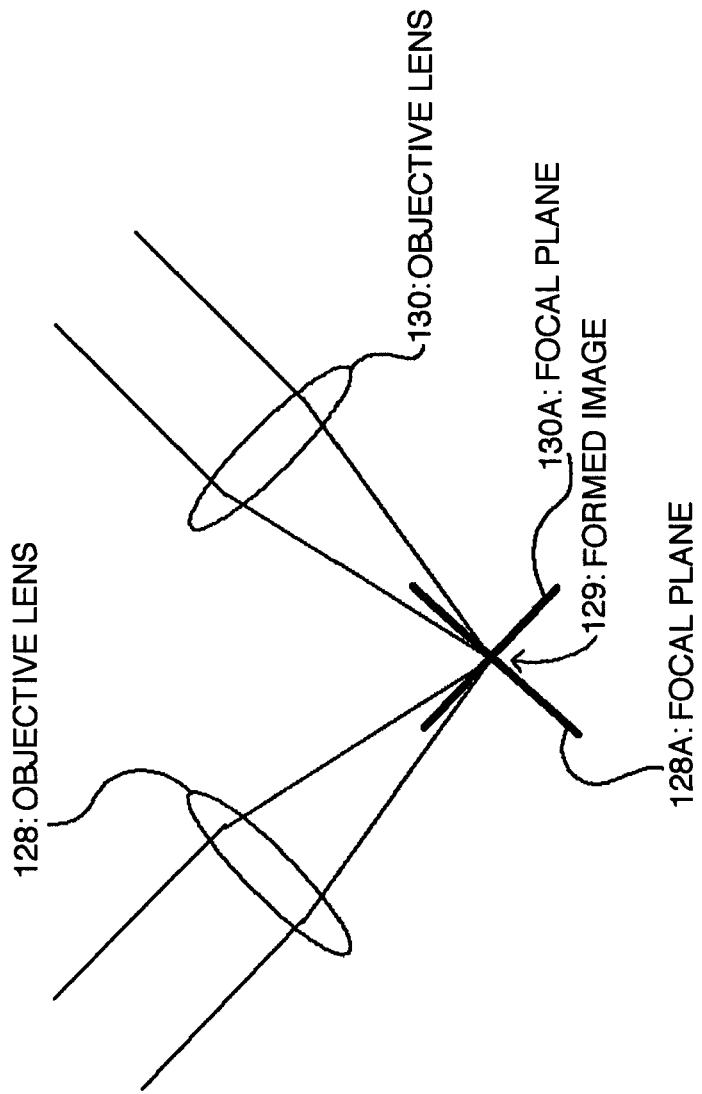
FIG. 5 is a view showing positional relation between objective lenses in FIG. 4.

FIG. 5 is a view showing positional relation between the objective lenses.

As shown in FIG. 5, a focal plane 128A of the objective lens 128, and a focal plane 130A of the objective lens 130 intersect each other, and a focal point of the objective lens 128, and a focal point of the objective lens 130 are positioned on respective straight lines passing through an intersection, whereupon the formed image 129 in the form of the line come to be positioned on the respective straight lines If an object, such as a living organism, and so forth, is present at the position of the formed image 129, and scattered light rays, or fluorescent rays and so forth are emitted therefrom, those rays are converted into parallel rays by the action of the objective lens 130. The parallel rays as converted are reflected by the reflecting mirrors 131, 132 to be condensed on the slit 140 by the action of the imaging lens 139. Portions of condensed rays, having passed through the slit 140, form an image on pixels of the high sensitivity camera 143.

Figure 6:
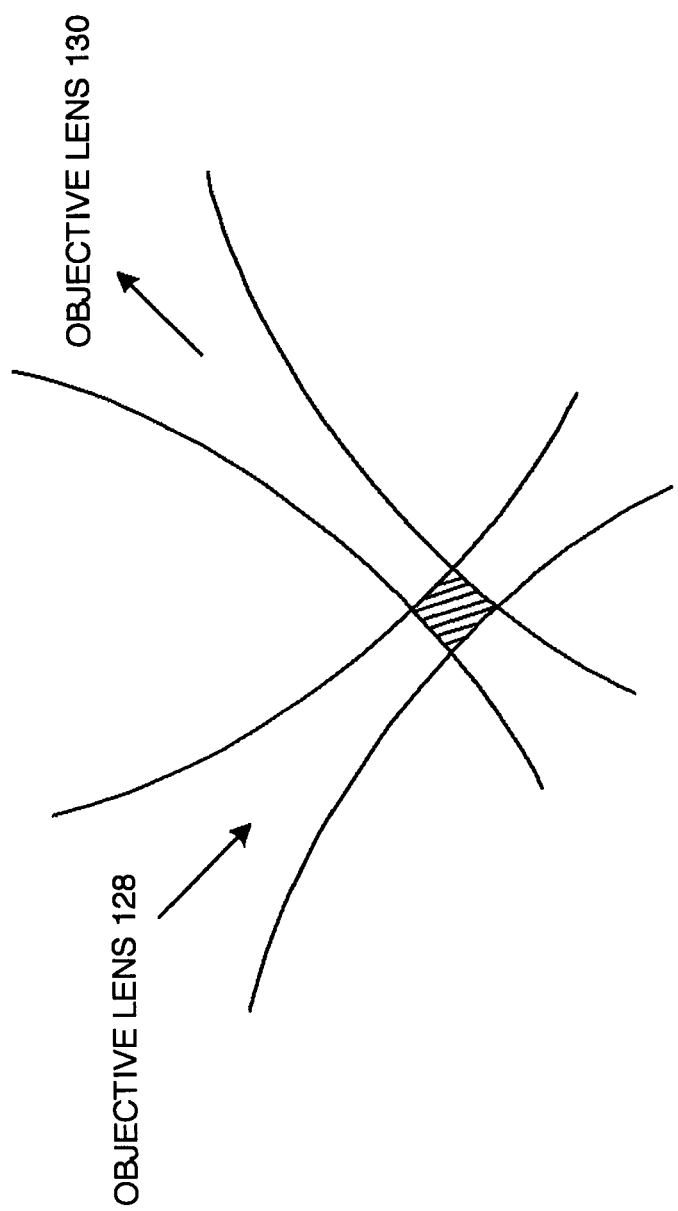
FIG. 6 is an enlarged view of a formed image 129 in a line-like shape.

FIG. 6 is an enlarged view of the formed image 129 in a line-like shape.

In FIG. 6, there are shown a beam spread according to point spread function (PSF) of the objective lens 128, and a beam spread according to point spread function (PSF) in the case where the parallel rays are introduced to the objective lens 130 along the primary optical axis thereof from a direction opposite. Since light rays only in a region where the respective beam shapes of both the lenses overlap one over the other, as indicated by hatching in FIG. 6, are projected onto the high sensitivity camera 143, information in a line-like form, with resolution excellent in the optical axis direction, (intensity distribution on the line of the condensed rays 107) is detected.

Further, in the case where the scattered light rays are acquired from the formed image 129, the configuration shown in FIG. 4, as it is, may be adopted, however, in the case where fluorescence information on the object is acquired, a fluorescent filter (not shown) is preferably inserted in close proximity to the front of the high sensitivity camera 143 as appropriate.

Herein, the x-axis drive stage 134 is driven for movement in the X-axis direction by the controller 146, whereupon the formed image 129 in the line-like form is scanned in the X-axis direction.

In this case, an optical axis between the reflecting mirrors 126, 127, and an optical axis between the reflecting mirrors 131, 132 are each an optical axis of parallel rays, and the optical axes are in the X-axis direction, so that the device is made up such that even if the x-axis drive unit 133 is moved, the optical systems before, and after the x-axis drive unit 133 will not be affected.

Furthermore, concurrently with driving by the action of the x-axis drive stage 134, the second x-axis drive stage 144 is also moved in sync with the x-axis drive stage 134 by a corresponding distance. If the optical system has a magnification, for example, 10 times, when the x-axis drive unit 133 is moved 1 μm, the second x-axis drive stage 144 is concurrently moved 10 μm. The controller 146 synchronizes the two stages in this way, adjusting exposure time of the high sensitivity camera 143 in sync with scanning as described. In so doing, the high sensitivity camera 143 picks up an image on an x-y plane, formed by scanning the formed image 129 in the line-like form in the X-axis direction, in uniform brightness, and transfer the image to the controller 146, whereupon the image is observed on the monitor 147, and is recorded in a memory inside the controller 146.

Further, the z-axis drive stage 137 is driven for movement in the Z-axis direction by the controller 146, whereupon the formed image 129 in the line-like form is scanned in the Z-axis direction. Further, an optical axis between the reflecting mirror 126, and the imaging lens 125, and an optical axis between the reflecting mirror 132, and the imaging lens 139 are each an optical axis of parallel rays, and the respective optical axes are in the Z-axis direction, so that the device is made up such that even if the z-axis drive unit 136 is moved, the optical systems before, and after the z-axis drive unit 136 will not be affected.

Furthermore, concurrently with driving of the z-axis drive unit 136, the second x-axis drive stage 144 is also moved in sync with the z-axis drive unit 136 by a corresponding distance. If the optical system has a magnification, for example, 10 times, when the z-axis drive unit 136 is moved 1 μm, the second x-axis drive stage 144 is concurrently moved 10 μm. The controller 146 synchronizes the two stages in this way, adjusting exposure time of the high sensitivity camera 143 in sync with the scanning as described. In so doing, the high sensitivity camera 143 picks up an image on an y-z plane, formed by scanning the formed image 129 in the line-like form in the Z-axis direction, in uniform brightness, and transfer the image to the controller 146, whereupon the image is observed on the monitor 147, and is recorded in the memory inside the controller 146.

With the present embodiment, the two objective lenses are used for image formation, however, there is no limitation thereto, and use may be made of another lens system. Further, use may be made of a catoptric system such as a concave mirror. Furthermore, for a simpler configuration, the two slits 124, 140 may be omitted.

Thus, with the microscope device according to the present embodiment, the two objective lenses are disposed such that the respective optical axes thereof intersect each other at an angle to enable respective focal point positions of the two objective lenses to coincide with each other, so that it is possible to acquire the information on the line of the condensed rays, with excellent resolution in an optical axis direction.

Further, since an illumination optical path is separated from an optical path of condensed rays, the microscope device according to the present embodiment has a configuration wherein light rays from other than a position of the condensed rays are insusceptible to be fed back, so that an image excellent in S/N ratio can be acquired.

Still further, since lenses small in NA are used for the objective lenses, sufficient WI) can be obtained, and aberration is reduced, rendering the configuration to be suitable for observation on deep parts of an object.

Yet further, the microscope device is configured such that an image is acquired by scanning the line as above, so that a canning method is easy to carry out and high-speed scanning is possible.

Further, with the present embodiment of the invention, the light source for emitting near infrared rays is adopted, so that the microscope device is suitable for observation on the deep parts of an object.

Still further, a configuration is adopted wherein necessary optical units only are scanned, so that scanning at a higher speed is possible.

Yet further, with the present embodiment, a confocal optical system is adopted by inserting a slit on a light irradiation side and a light reception side, so that it is possible to acquire more information on the focal plane only, thereby enhancing an S/N ratio.

Furthermore, a configuration is adopted wherein the high sensitivity camera is used for reception of light rays, and a photograph is taken while the high sensitivity camera is relatively moved, so that an image on an object plane can be easily acquired.

As described in the foregoing, with the microscope devices according to the first invention, the primary axis of the objective lens of the illumination optical system, and the primary axis of the objective lens of the detection optical system intersect each other at an angle, and a detector detects intensity distribution on a line of condensed rays, generated by illumination rays in a line-like form, so that it is possible to obtain the microscope device capable of scanning the illumination rays, suitable for observation on the deep part of an object.

An application scope of the first invention is not limited to those embodiments described as above. The first invention is widely applicable to a microscope device comprising an illumination optical system for irradiating an object with illumination rays in the line-like form, a detection optical system for receiving light rays resulting from the illumination rays in the line-like form to thereby form an image on a detector, scanning means for scanning the illumination rays in the line-like form, wherein information on an image on a flat plane, obtained by scanning the illumination rays in the line-like form by use of the scanning means, is acquired on the basis of a signal from the detector.

There are described hereinafter the embodiments of the microscope device according to the second invention.

Embodiment 3

There is described hereinafter the microscope device according to Embodiment 3 with reference to FIGS. 7 to 9.

Figure 7:
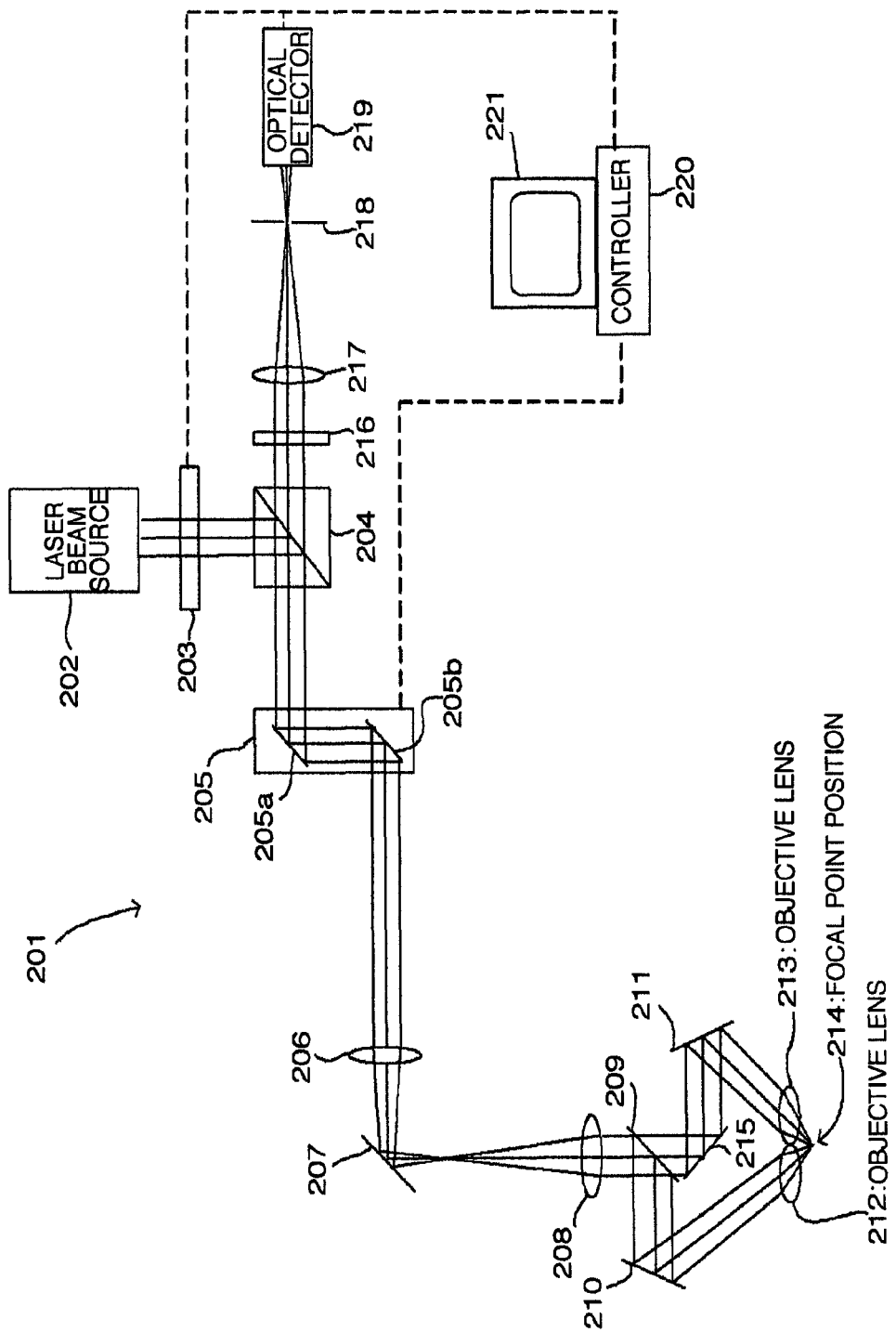
FIG. 7 is a block diagram showing a configuration of a microscope device according to Embodiment 3.

FIG. 7 is a block diagram showing a configuration of the microscope device according to Embodiment 3.

A microscope device 201 according to the present embodiment has a near infrared radiation (NIR) laser beam source 202, and an electric shutter 203 is disposed in front of the NIR laser beam source 202. Further, the microscope device 201 comprises a dichroic mirror 204 for altering orientation of a laser beam, and a scanning optical unit 205 for scanning the laser beam.

The dichroic mirror 204 has characteristics of reflecting the wavelength of the laser beam, and allowing fluorescent rays excited by the laser beam to transmit therethrough. The scanning optical unit 205 comprises a variable mirror 205a rotatable around a rotation axis, and a variable mirror 205b rotatable around an axis substantially orthogonal to the rotation axis of the variable mirror 205a.

Further, as shown in FIG. 7, there are disposed a pupil projection lens 206 for converging light rays, a mirror 207 for deflecting the laser beam, an imaging lens 208, a dichroic mirror 209 for reflecting the laser beam, and causing the fluorescent rays to transmit therethrough, and three sheets of mirrors 210, 211, and 215.

Furthermore, two units of objective lenses 212, 213 are disposed such that respective primary axes thereof are in parallel with each other, and respective focal planes thereof coincide with each other. In this case, an optical path from the dichroic mirror 209 to the objective lens 212 after reflection at the mirror 210 is substantially equal in length to an optical path from the dichroic mirror 209 to the objective lens 213 after reflections at the mirrors 215, 211, respectively.

Further, a fluorescent filter 216 for causing fluorescent rays emitted from a specimen 212 to be selectively transmitted therethrough, a lens 217 for converging the fluorescent rays, a pin hole 218, and an optical detector 219 for detecting a light beam having passed through the pin hole 218 are disposed in close proximity to the dichroic mirror 204.

Still further, the microscope device 201 comprises a controller 220, and a display monitor 221, and the controller 220 executes control of opening/closing of the electric shutter 203, and control of scanning by the scanning optical unit 205 while acquiring a signal from the optical detector 219. In addition, the controller 220 outputs information to the display monitor 221.

Next, there is described operation of the microscope device according to the present embodiment hereinafter.

A specimen (not shown) with a fluorescence indicator to be excited by the laser beam from the laser beam source 202, introduced therein, is disposed at a focal point position 214 of the microscope device.

When the electric shutter 203 is open, the laser beam passes through the electric shutter 203 to be guided to the scanning optical unit 205 by the action of the dichroic mirror 204, thereby being scanned in an optional direction by the scanning optical unit 205.

The laser beam further passes through the pupil projection lens 206, the mirror 207, and the imaging lens 208. In an illumination optical system, the laser beam is reflected by the dichroic mirror 209 to be subsequently reflected by the mirror 210, before falling, as parallel rays, onto the objective lens 212 from a direction slanted thereto. The laser beam is converged by the objective lens 212, and a convergence point is scanned over a focal plane 222 by the scanning optical unit 205.

The fluorescence indicator in the specimen is excited by the laser beam, thereby emitting fluorescent rays.

The fluorescent rays as excited are captured by the objective lens 213 to be converted into parallel rays to be reflected by the mirrors 211, and 215, the parallel rays subsequently permeating through the dichroic mirror 209, whereupon an optical path thereof comes to overlap the optical path of the laser beam. Further, the fluorescent rays captured by the objective lens 212 reverts to the same optical path as that of the laser beam, but since the fluorescent rays pass through the dichroic mirror 209, the same do not proceed toward the imaging lens 208.

Thus, the illumination optical path is separated from the detection optical system.

Figure 8:
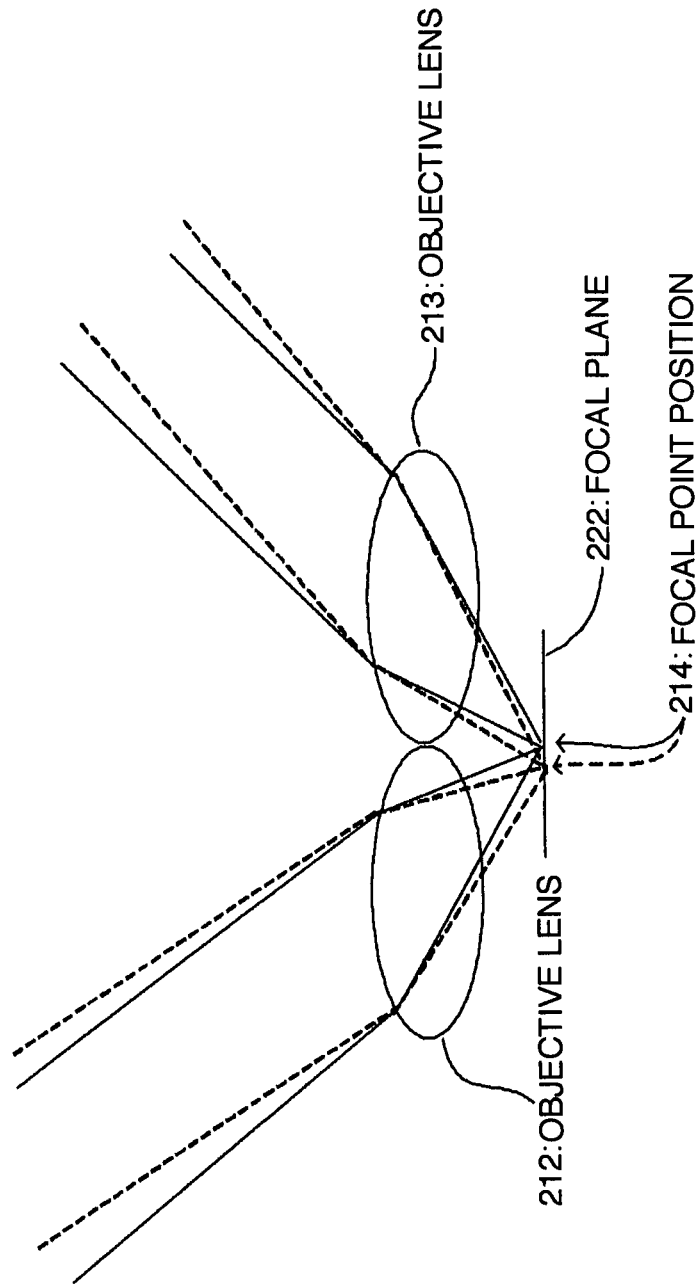
FIG. 8 is a view showing behaviors of beams when scanning is executed by a scanning optical unit.

FIG. 8 is a view showing behaviors of beams when scanning is executed by the scanning optical unit 205.

In FIG. 8, variations in beam of laser light are indicated by a solid line, and a dotted line, respectively. As shown in FIG. 8, a change in orientation of a laser beam, by the respective actions of the variable mirror 205a, and the variable mirror 205b, will cause a change in an angle of an incident light falling at the position of a pupil of the objective lens 212, thereby changing the focal point position 214. A set of the focal point positions 214 forms the focal plane 222. As described above, the focal plane 222 is also a focal plane of the objective lens 213.

The fluorescent rays from the focal point position 214 are converted into the parallel rays by the objective lens 213 as shown in FIG. 8. As shown in FIG. 7, the fluorescent rays are reflected by the mirrors 211, and 215, respectively, subsequently passing through the dichroic mirror 209. The optical system is configured such that the fluorescent rays return in the same direction as the direction in which the laser beam as scanned returns.

The fluorescent rays return to the same optical path as that for the laser beam regardless of the orientation of the laser beam as scanned, and are guided to the dichroic mirror 204 via the scanning optical unit 205. The fluorescent rays are transmitted through the dichroic mirror 204, and a specific wavelength component of the fluorescent rays is selectively transmitted through the fluorescent filter 216, whereupon light rays only from the focal plane 222 are selected by the lens 217, and the pin hole 218 before entering the optical detector 219.

An output signal from the optical detector 219 is guided to the controller 220 to be converted into a digital signal in sync with scanning control, whereupon image data corresponding to a scanning position is prepared to be displayed on the display monitor 221, or the image data is stored in the internal memory.

Further, observation of a desired depth can be executed by moving a specimen in the vertical direction (upward/downward in FIG. 1) by the action of a z-axis drive stage (not shown).

Figure 9:
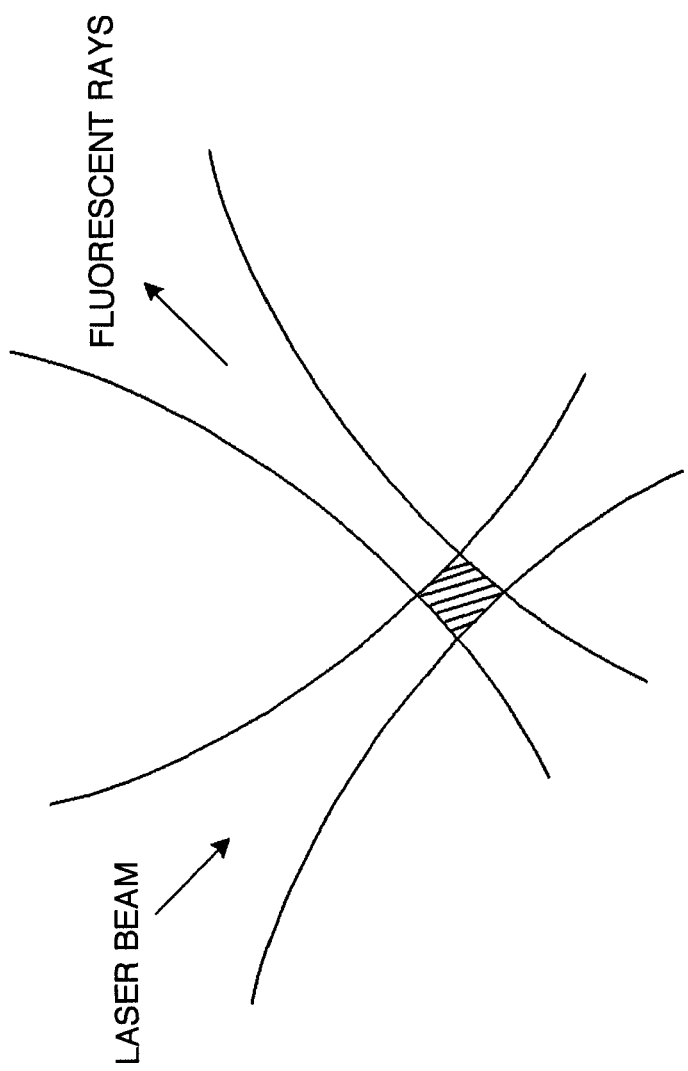
FIG. 9 is a view showing a region in close proximity to respective convergence points of the objective lenses.

FIG. 9 is a view showing a region in close proximity to the respective convergence points of the objective lens 212, and the objective lens 213.

As shown in FIG. 9, a fluorescent substance is excited by the laser beam incoming from the left side, and the fluorescent rays as excited are detected on the right side, thereby detecting the fluorescent rays in a hatched region where two optical paths overlap each other, so that superior resolution depthwise is obtained. When the optical system is made up such that the optical axis of the laser beam intersects the optical axis of the fluorescent rays as detected at an angle around 90°, the hatched region shown in FIG. 9 will be reduced in size, resulting in excellent resolution. Resolution is at the best when an angle formed between the optical axis of the illumination optical system, and the optical axis of the detection optical system is 90°. Further, since the fluorescent rays only in the hatched region will return, confocal effects are obtainable even without use of the pin hole 218, however, if the pin hole is inserted, this will further improve SN.

Thus, with the microscope device according to the present embodiment, since the optical system for irradiating the laser beam is separated from the optical system for irradiating the fluorescent rays with the use of two units of the objective lenses, it is possible to enhance resolution in the direction of the optical axis. Furthermore, since an illumination optical system is made up independently from a detection optical system, the microscope device according to the present embodiment has a configuration wherein the fluorescent rays from various spots of the path of the illumination optical system, (the fluorescent rays being a cause of a noise), have difficulty in entering the path of the detection optical system, so that the microscope device is extremely excellent in the S/N ratio, and is suitable for observation of a deep part of a texture. In addition, with the microscope device, a near infrared laser beam source is used as the light source, the microscope device is excellent in allowing illumination rays to transmit through a living organism, thereby rendering it suitable for observation of the deep part.

Embodiment 4

There is described hereinafter a microscope device according to Embodiment 4 with reference to FIG. 10. With a microscope device 201A according to the present embodiment, a configuration is adopted wherein an illumination optical system is fully separated from a detection optical system.

Figure 10:
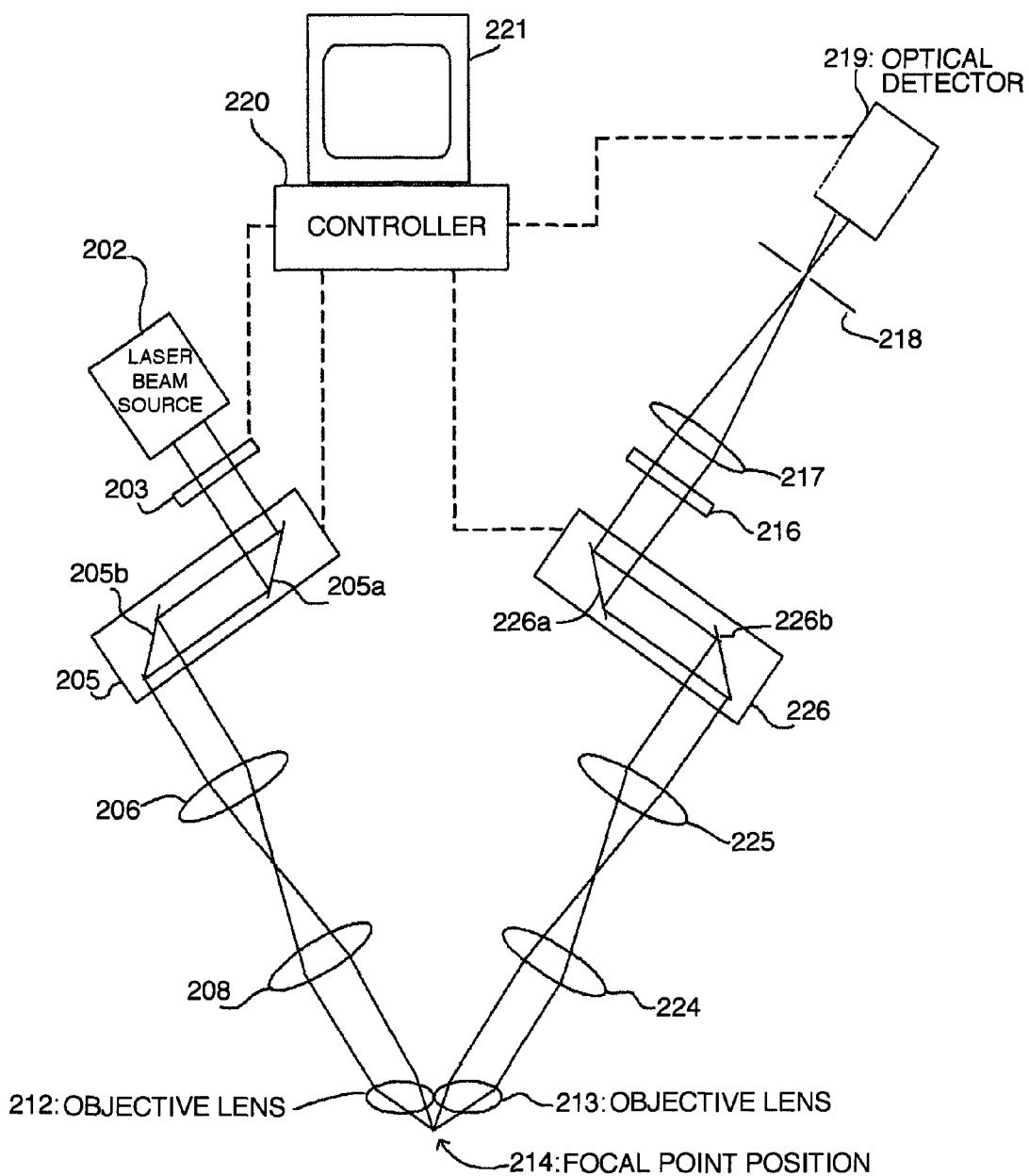
FIG. 10 is a block diagram showing a configuration of a microscope device according to Embodiment 4.

FIG. 10 is a block diagram showing a configuration of the microscope device according to Embodiment 4. Elements thereof, identical to those of Embodiment 3, are denoted by like reference numerals, omitting description thereof.

As shown in FIG. 10, the dichroic mirror 204, and the mirror 207, used in Embodiment 3, are not used in the optical path of the illumination optical system of the microscope device 201A. Further, the illumination optical system is made up such that the laser beam from the imaging lens 208 falls on the objective lens 212 as shown in FIG. 10. Fluorescent rays are recovered by the objective lens 213 to be rendered symmetrical with the laser beam of the illumination optical system, and an optical path after the objective lens 213 is provided with an imaging lens 224, a pupil projection lens 225, and a scanning optical unit 226 comprising two sheets of variable mirrors 226a, 226b, rotatable axes thereof, crossing each other at right angles. As in the case of Embodiment 3, the two objective lenses 212, 213 are disposed such that respective primary axes thereof are in parallel with each other, and respective focal planes thereof coincide with each other. Further, an optical path after the fluorescent filter 216, and thereafter is the same in configuration as that for Embodiment 3.

There is described hereinafter operation of the microscope device according to the present embodiment.

A laser beam from a laser beam source 202 passes through the optical path shown in FIG. 10 to be focused at a focal point position 214. The fluorescent rays from a focal point are recovered by the objective lens 213. At this point in time, the fluorescent rays only from the hatched region shown in FIG. 3 are recovered for the same effect as that in the case of Embodiment 3. The fluorescent rays are converted into parallel rays by the objective lens 213 to be again converted into parallel rays by the imaging lens 224, and the pupil projection lens 225. The parallel rays pass through the scanning optical unit 226, a wavelength component of the parallel rays is selected by the fluorescent filter 216 to be then condensed at the pin hole 218 by the action of the lens 217, and a beam only from the focal plane 214 is selected by the lens 217 and the pin hole 218 before entering the optical detector 219.

Further, when a controller 220 causes the scanning optical unit 205 to scan over the focal plane 214, the controller 220 controls the scanning optical unit 226 in sync with the scanning optical unit 205, thereby controlling such that orientation of the beam proceeding toward the pin hole 218 will not change even if orientation of the parallel rays entering the scanning optical unit 226 undergoes a change.

An output signal from the optical detector 219 is guided to the controller 220 to be converted into a digital signal in sync with scanning control, whereupon image data corresponding to a scanning position is prepared to be displayed on a display monitor 221, or the image data is stored in an internal memory.

With the microscope device according to the present embodiment, the respective optical paths are fully separated from each other, and additional advantages are therefore gained in that it is possible to remove stray light rays, such as feedback light rays from the illumination optical system, in addition to advantageous effect of Embodiment 3, thereby further improving the S/N ratio of an image.

Embodiment 5

There is described hereinafter a microscope device according to Embodiment 5 with reference to FIG. 11. With a microscope device 201B according to the present embodiment, a configuration is adopted wherein an illumination optical system is fully separated from a detection optical system.

Figure 11:
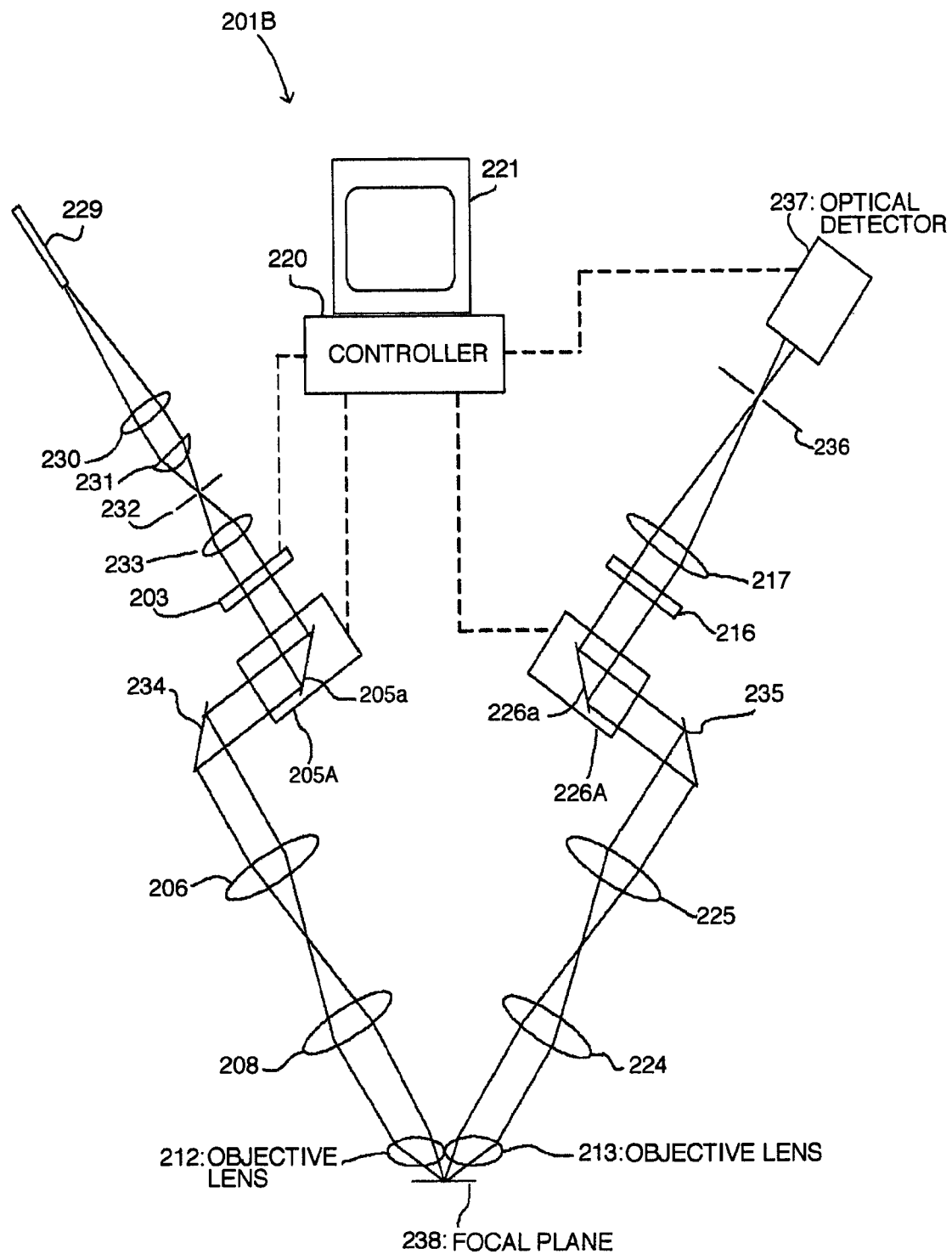
FIG. 11 is a block diagram showing a configuration of a microscope device according to Embodiment 5.

FIG. 11 is a block diagram showing a configuration of the microscope device according to Embodiment 5. Elements thereof, identical to those of Embodiments 3, and 4, respectively, are denoted by like reference numerals, omitting description thereof.

As shown in FIG. 11, the illumination optical system of the microscope device 201B has an optical fiber 229 for irradiating a laser beam from a laser beam source (not shown). Disposed ahead of the optical fiber 229 are a collimator lens 230, a cylindrical lens 231, a slit 232 having an opening in the direction perpendicular to the plane of FIG. 11, and an imaging lens 233. An optical scanning unit 205A has a variable mirror 205a rotatable around a rotation axis perpendicular to the plane of the figure. Further, a fixed mirror 234 is disposed instead of the variable mirror 205b of Embodiment 3. Similarly, an optical scanning unit 226A has a variable mirror 226a rotatable around a rotation axis perpendicular to the plane of FIG. 11. A fixed mirror 235 is disposed instead of the variable mirror 226b of Embodiment 4.

Further, a slit 236 having an opening in the direction perpendicular to the plane of FIG. 11 is disposed instead of the pin hole 218 of Embodiment 4, and a line CCD for detecting intensity distribution of light rays, in the direction perpendicular to the plane of the figure, is used as a detector 237.

Next, there is described hereinafter operation of the microscope device 201B according to the present embodiment.

As shown in FIG. 11, the laser beam from the laser beam source is transmitted as from a point-source by the optical fiber 229 to be converted into parallel rays by the collimator lens 230 before being condensed into a line-like form by the action of the cylindrical lens 231. Condensed rays having passed through the slit 232 that is disposed at a condensing point subsequently pass through the imaging lens 233.

When an electric shutter 203 is open, the laser beam passes through the electric shutter 203 to be used for scanning by the optical scanning unit 205A. Further, the laser beam passes through a pupil projection lens 206, and an imaging lens 208 to thereby form an image on a focal plane 238 by the action of an objective lens 212, the image being in the form of a line extending in the direction perpendicular to the plane of the figure. The fluorescent rays from this line are recovered by an objective lens 213, however, with respect of individual points on the line, the fluorescent rays only from the hatched region shown in FIG. 3 are recovered for the same effects as that in the case of Embodiment 3. The fluorescent rays are again turned into images at the slit 236 by the action of a lens system, and only the fluorescent rays from the focal plane 238, having passed through the slit 236, are detected by the line CCD 237.

Further, by controlling the variable mirror 205a in sync with the variable mirror 226a, the line is caused to scan over the focal plane 238, whereupon information is detected by the line CCD (the detector 237) to be turned into an image by a controller 220.

With the microscope device 201B according to the present embodiment, there is adopted a configuration wherein the line is scanned in one direction, so that the present embodiment is at an advantage in addition to the advantageous effect of Embodiment 4 in that scanning time can be further reduced.

Embodiment 6

Figure 12:
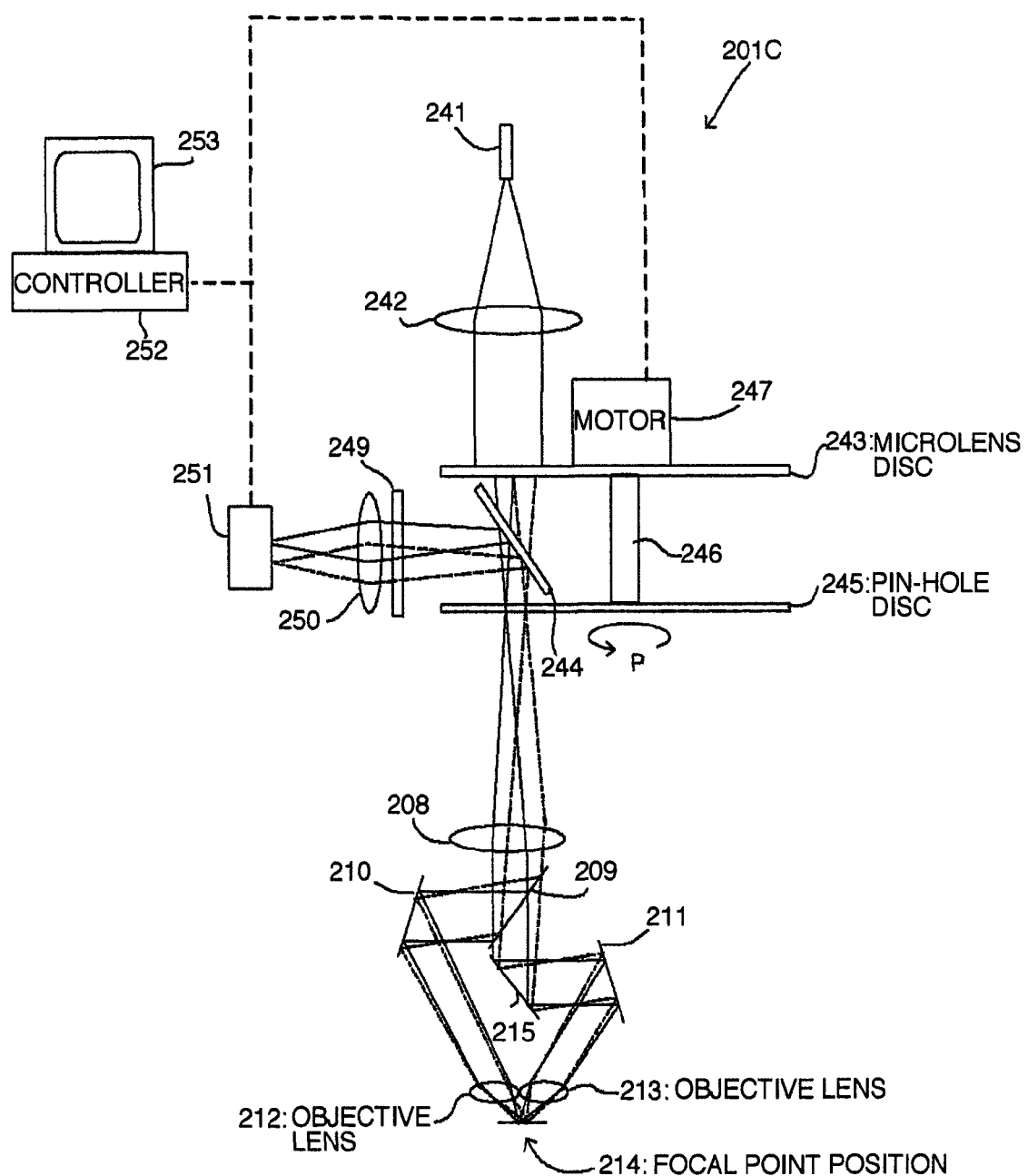
FIG. 12 is a block diagram showing a configuration of a microscope device according to Embodiment 6.

There is described hereinafter a microscope device according to Embodiment 6 with reference to FIGS. 12, and 13. With a microscope device 201C according to the present embodiment, a configuration is adopted wherein a pin-hole disc is adopted as scanning means. FIG. 12 is a block diagram showing the configuration of the microscope device according to Embodiment 6. Elements thereof, identical to those of Embodiment 3, are denoted by like reference numerals, omitting description thereof.

As shown in FIG. 12, the microscope device 201C according to the present embodiment is provided with an end face 241 of an optical fiber connected to a laser beam source (not shown), and a collimator lens 242 disposed in front of the end face 241. A near infrared radiation laser beam source is preferable as the laser beam source. Further, a single-mode optical fiber, and so forth that can be regarded as a point source is suitable as the optical fiber.

Disposed ahead of the collimator lens 242 are a microlens disc 243 with arrays of microlenses disposed thereon, and a pin-hole disc 245 on which pin-holes are disposed in the same pattern as a disposition pattern of the microlenses. The microlens disc 243, and the pin-hole disc 245 are linked to each other with a linkage drum 246 so as to be integrally rotatable in a direction in which the linkage drum 246 is rotated around its axis by a motor 247. The pin-hole disc 245 constitutes a mask-pattern member.

Figure 13:
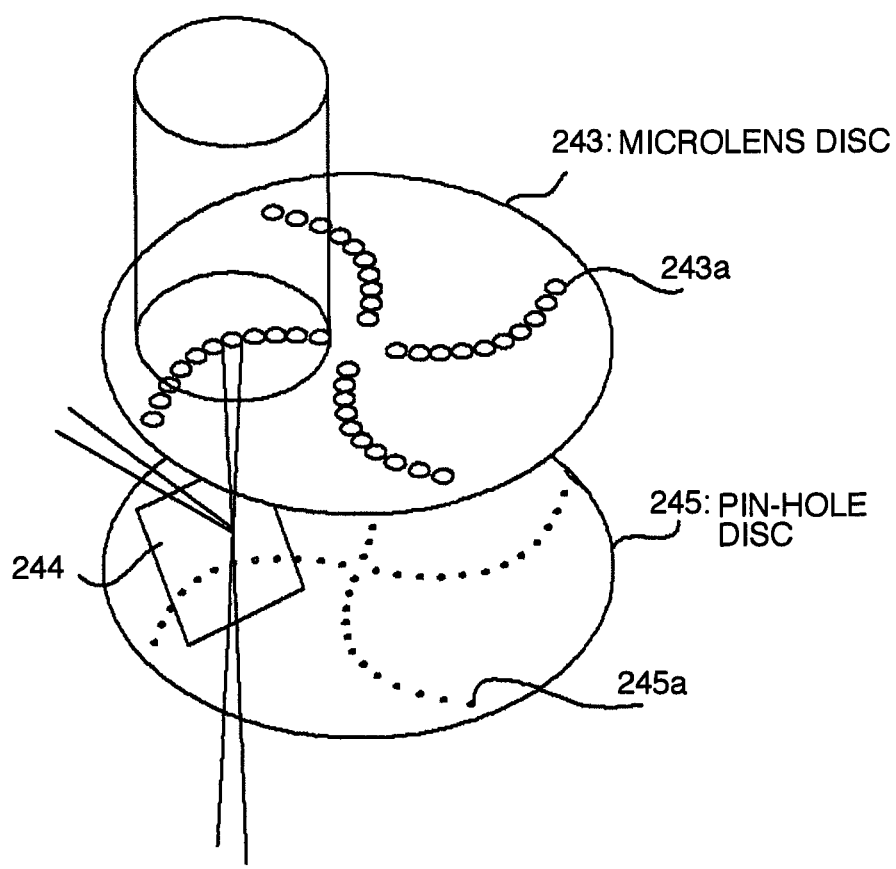
FIG. 13 is a perspective view showing respective structures of a microlens disc, and a pin-hole disc.

FIG. 13 is a perspective view showing respective structures of the microlens disc 243, and the pin-hole disc 245.

As shown in FIG. 13, both the microlenses 243a provided on the microlens disc 243, and the pin-holes 245a provided on the pin-hole disc 245 are disposed in a pattern of four-helical stripes.

As shown in FIG. 12, an imaging lens 208 is disposed ahead of those discs, and disposed ahead of the imaging lens 208 are a dichroic mirror 209 for reflecting a laser beam and allowing fluorescent rays to transmit therethrough and three sheets of mirrors 210, 211, 215. Further, two units of objective lenses 212, 213 are disposed such that respective primary axes thereof are in parallel with each other, and respective focal planes thereof coincide with each other. In this case, an optical path from the dichroic mirror 209 to the objective lens 212 after reflection at the mirror 210 is substantially equal in length to an optical path from the dichroic mirror 209 to the objective lens 213 after reflections at the mirrors 215, 211, respectively.

Further, a dichroic mirror 244 is disposed between the microlens disc 243, and the pin-hole disc 245. A fluorescent filter 249, and a camera lens 250 are disposed ahead of the dichroic mirror 244, and a high sensitivity camera 251 is disposed ahead of the fluorescent filter 249, and the camera lens 250.

Further, the motor 247, and the high sensitivity camera 251 are connected to a controller 252 via a signal line indicated by a broken line, and further, a monitor 253 is connected to the controller 252.

Next, there is described hereinafter operation of the microscope device 201C according to the present embodiment.

The laser beam from the laser beam source is emitted from the end face 241 of the optical fiber to be converted into parallel rays by the collimator lens 242. With the microscope device 201C, the parallel rays are applied to the microlens disc 243, whereupon the parallel rays are focused at the pin-holes 245a on the pin-hole disc 245, corresponding to the microlenses 243a, respectively, by the action of each of the microlenses 243a (refer to FIG. 13). The laser beam having passed through the pin-hole disc 245 are converted into parallel rays by the action of the imaging lens 208, the parallel rays having an inclination corresponding to respective positions of the pin-holes 245a through which the laser beam has passed.

In an illumination optical system, the laser beam is reflected by the dichroic mirror 209 to be subsequently reflected by the mirror 210 before falling, as parallel rays, onto the objective lens 212 from a direction slanted thereto. The laser beam is converged by the objective lens 212. A fluorescence indicator in a specimen is excited by the laser beam, thereby emitting fluorescent rays. The fluorescent rays as excited are captured by the objective lens 213 to be converted into parallel rays to be reflected by the mirrors 211, and 215, the parallel rays subsequently permeating through the dichroic mirror 209, whereupon an optical path thereof comes to overlap the optical path of the laser beam.

Further, the fluorescent rays captured by the objective lens 212 reverts to the same optical path as that of the laser beam, but since the fluorescent rays pass through the dichroic mirror 209, the same do not proceed toward the imaging lens 208.

Thus, the illumination optical path is separated from a detection optical system. Further, the fluorescent rays only from the hatched region shown in FIG. 9 are recovered for the same effects as in the case of Embodiment 3. At this point in time, the microlens disc 243, and the pin-hole disc 245 are rotated in a direction P by use of the motor 247, thereby causing the fluorescent rays to be scanned.

Respective paths of the fluorescent rays as scanned are indicated by a dotted line in FIG. 12. The fluorescent rays from the respective pin-holes at different positions are turned into parallel rays differing in orientation by the imaging lens 208 to fall on a pupil's position of the objective lens 212, to be focused at a point (along a path indicated by a solid line) differing from a previous point. The fluorescent rays from this point and onwards are converted into parallel rays by the objective lens 213, as shown in FIG. 12. The fluorescent rays are reflected by the mirrors 211, 215 to subsequently pass through the dichroic mirror 209. The optical system is made up such that the fluorescent rays revert in the same direction as that of the laser beam in such a case.

The fluorescent rays pass through each of the pin-holes 245a again by the action of the imaging lens 208 to be reflected by the dichroic mirror 244 (FIG. 13), and subsequently, a wavelength component of the parallel rays is selected by the fluorescent filter 249, thereby forming an image on the high sensitivity camera 251 by the action of the camera lens 250. Upon rotation of the microlens disc 243 integrally with the pin-hole disc 245 by use of the controller 252 at this point in time, the fluorescent rays passing through the respective pin-holes 245a are scanned over on a focal plane, and the fluorescent rays from the focal plane are scanned over image pickup elements of the high sensitivity camera 251. By so doing, information on the focal plane is projected onto the high sensitivity camera 251, thereby enabling observation of the focal plane. Furthermore, since the fluorescent rays from other than the focal plane are hardly able to pass through the respective pin-holes 245a in this case, they cannot reach the high sensitivity camera 251. It therefore follows that the high sensitivity camera 251 picks up a confocal image of the fluorescent rays only from the focal plane. The image as picked up is stored in the controller 252, or displayed on the monitor 253.

Further, it is possible to alter depth of a plane to be observed by driving a Z-axis direction drive stage (not shown).

Still further, when an angle formed between the optical axis of the illumination optical system, and the optical axis of the detection optical system is 90°, resolution depthwise is improved to the best, and such a configuration is therefore preferable. Furthermore, since the illumination optical system is separated from the detection optical system, the microscope device according to the present embodiment has a configuration wherein the fluorescent rays from various spots of the path of the illumination optical system, (the fluorescent rays being a cause of a noise), will have difficulty in entering the path of the detection optical system, so that the microscope device is extremely excellent in S/N ratio.

Further, with the present embodiment, there is shown an example wherein the microlens disc is used, however, the microlens disc is not necessarily needed. Still further, a disc provided with a slit may be used instead of the pin-hole disc. In such a case, a cylindrical lens is preferably used at a position of the microlens disc, corresponding to the slit, so as to enable parallel rays to be condensed at the slit. Furthermore, another mask pattern may be used.

With the microscope device 201C according to the present embodiment, there is adopted a configuration wherein scanning is executed by rotation of the pin-hole disc as a method for scanning light rays, so that the present embodiment is at an advantage in addition to the advantageous effect of Embodiment 3 in that scanning speed is extremely high.

Embodiment 7

Figure 15:
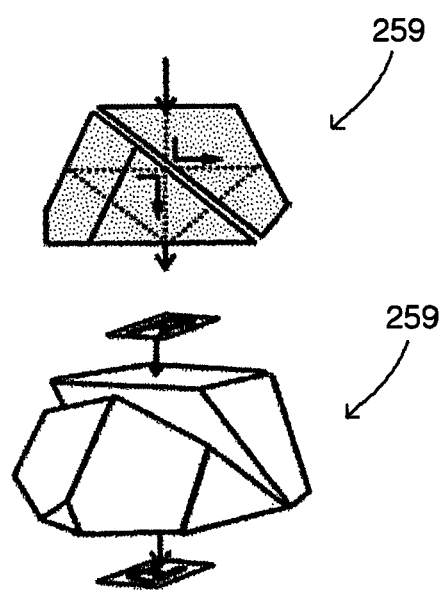
FIG. 15 is a view showing a structure of the image-rotation prism.
Figure 16:
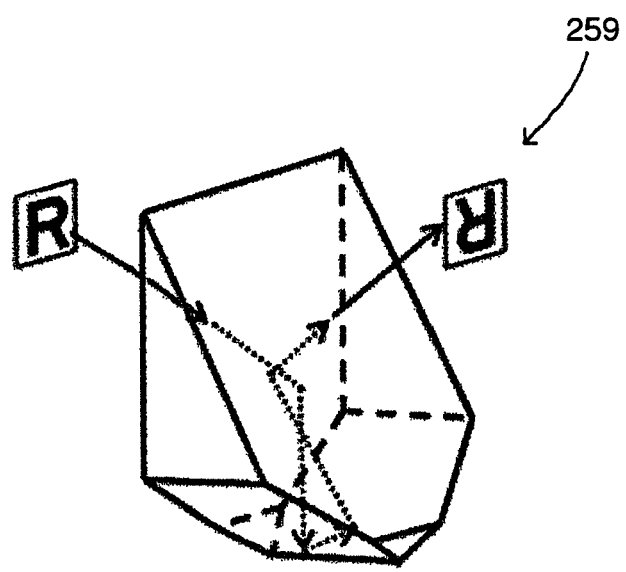
FIG. 16 is a schematic diagram showing the principle of a prism for rotating an image.

There is described hereinafter a microscope device according to Embodiment 7 with reference to FIGS. 14 to 16. With a microscope device 201D according to the present embodiment, there is shown a configuration example wherein illumination rays, and feedback light rays are caused to pass through respective pin-holes on a pin-hole disc 245.

Figure 14:
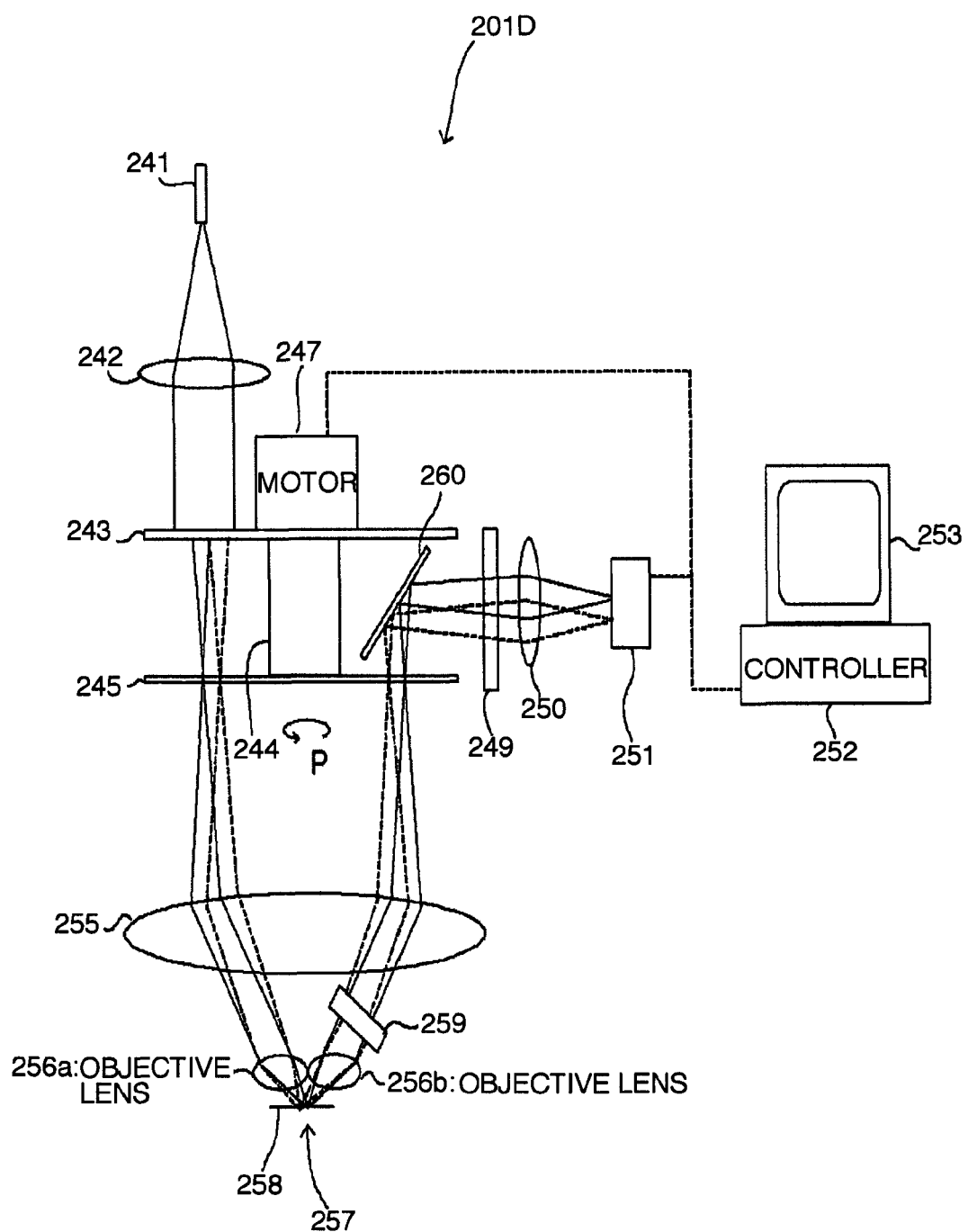
FIG. 14 is a block diagram showing a configuration of a microscope device according to Embodiment 7.

FIG. 14 is a block diagram showing the configuration of the microscope device according to Embodiment 7. Elements thereof, identical to those of Embodiment 6, are denoted by like reference numerals, omitting description thereof.

As shown in FIG. 14, with the microscope device 201D according to the present embodiment, use is not made of the dichroic mirror 244 shown in Embodiment 6. Further, for an imaging lens 255, use is made of a lens large in diameter, and the center axis of the imaging lens 255, and the rotation axis of a pin-hole disc 245 are arranged substantially in line with each other.

As is the case with Embodiment 4, disposed ahead of the imaging lens 255 are two units of objective lenses 256a, 256b. Further, an image-rotation prism 259 for rotating an image is inserted in close proximity to the objective lens 256b. FIG. 15 is a view showing a structure of the image-rotation prism 259.

A dichroic mirror 260 is disposed at a spot in an optical path of rays of the feedback light, between the pin-hole disc 245, and a microlens disc 243, and the dichroic mirror 260 is made up such that the optical path of fluorescent rays is deflected toward a high sensitivity camera 251.

Next, there is described hereinafter operation of the microscope device 201D according to the present embodiment.

A laser beam from a laser beam source is emitted from an end face 241 of an optical fiber to be converted into parallel rays by a collimator lens 242. The parallel rays are applied to the microlens disc 243, whereupon the parallel rays are focused at respective pin-holes 245a on the pin-hole disc 245, corresponding to respective microlenses 243a, by the action of each of the microlenses 243a. The laser beam having passed through the pin-hole disc 245 are converted into parallel rays having an inclination at an angle by the action of the imaging lens 255 to be then focused at a focal point 257 by the action of the objective lens 256a. Fluorescent rays from the focal point 257 are converted into parallel rays having an inclination at an angle by the action of the objective lens 256b, and orientation of the parallel rays are rotated through 180° by the image rotation prism 259. FIG. 16 is a schematic diagram showing the principle of a prism for rotating an image.

The parallel rays rotated by the image rotation prism 259 are turned into images at respective positions on the pin-hole disc 245 (positions rotated through 180° from positions where parallel rays have passed through the pin-hole disc 245) opposite to positions on the pin-hole disc 245, on an irradiation side of an optical system, by the action of the imaging lens 255. As shown in FIG. 12, because the pin-hole disc 245 is patterned so as to be rotationally symmetrical every 90°, a position pattern of pin-holes of an illumination optical system, on the pin-hole disc 245, is deviated by 180° in relation to a position pattern of pin-holes of a detection optical system. Further, since an image is rotated through 180° by the action of the image rotation prism 259, the focal point of the fluorescent rays can be aligned with the pattern on the pin-hole disc 245 by adjusting the optical systems, thereby enabling the rays of the feedback light to pass through the pin-hole disc 245.

Then, the orientation of the rays of the feedback light that have passed through the pin-hole disc 245 is changed by the dichroic mirror 260, and a wavelength component of the parallel rays is selected by a fluorescent filter 249 to be subsequently directed toward a camera lens 250, whereupon an image is formed on the high sensitivity camera 251.

Further, the image rotation prism may be inserted in the illumination optical system. The present embodiment is similar in other operations to Embodiment 6.

With the microscope device 201D according to the present embodiment, the optical path of the illumination optical system is completely separated from that of the detection optical system, so that the present embodiment is at an advantage in addition to the advantageous effect of Embodiment 6 in that an S/N ratio of a signal is enhanced.

Embodiment 8

There is described hereinafter a microscope device according to Embodiment 8 with reference to FIGS. 17, and 18. With a microscope device 201E according to the present embodiment, there is shown a configuration example wherein scanning means differ from those in the case of Embodiment 7.

Figure 17:
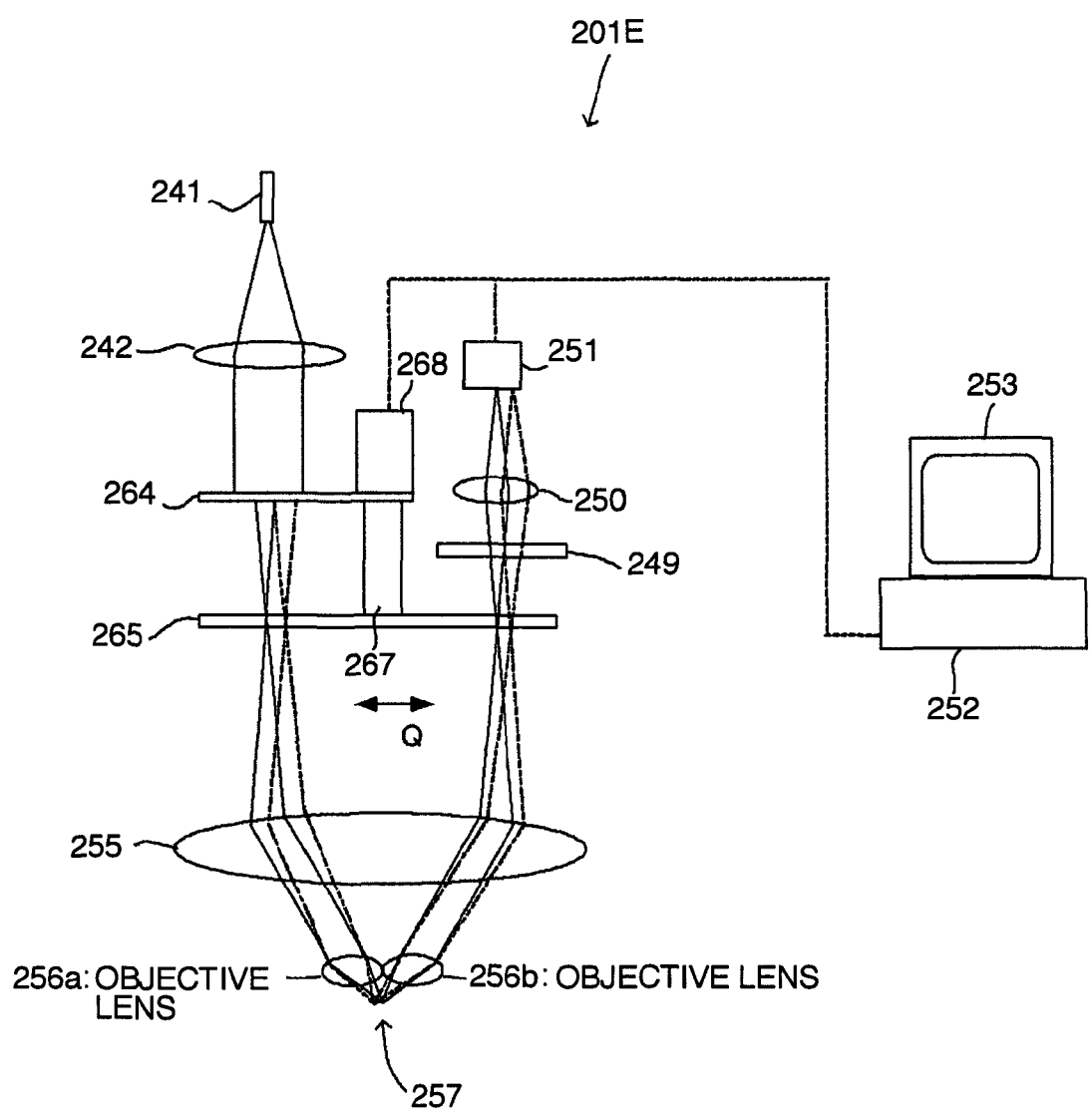
FIG. 17 is a block diagram showing a configuration of a microscope device according to Embodiment 8.
Figure 18:
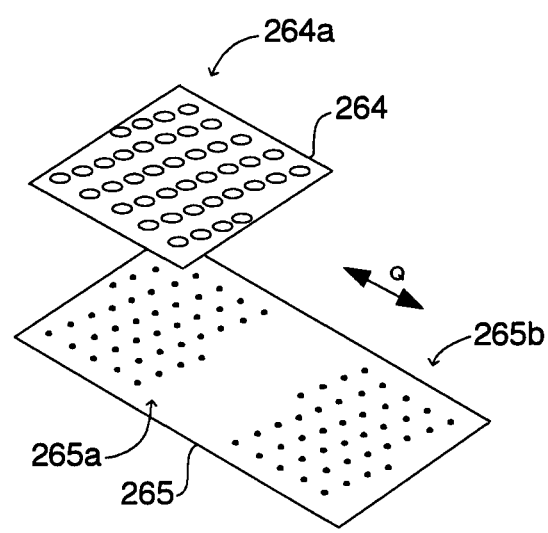
FIG. 18 is a perspective view showing the structure of a microlens disc, and the structure of a pin-hole disc.

FIG. 17 is a block diagram showing a configuration of the microscope device according to Embodiment 8, and FIG. 18 is a perspective view showing the structure of a microlens disc, and the structure of a pin-hole disc. Elements thereof, identical to those of Embodiment 7, are denoted by like reference numerals, omitting description thereof.

As shown in FIG. 17, the microlens disc 264, and the pin-hole disc 265 are linked to each other with a linkage member 267 so as to be able to make a reciprocating motion in respective directions of the arrows Q by the action of a uniaxial stage.

As shown in FIG. 18, the microlens disc 264 is provided with a microlens group 264a in a predetermined position pattern while the pin-hole disc 265 is provided with a pin-hole group 265a and a pin-hole group 265b, each group being formed in a predetermined position pattern identical to the predetermined position pattern of the microlens group 264a. Focusing by the microlens group 264a is achieved in the pin-hole group 265b. Further, rays of feedback light from a specimen pass through the pin-hole group 265b.

With the microscope device 201E according to the present embodiment, the microlens disc 264, and the pin-hole disc 265 are scanned in the respective directions of the arrows Q by the action of the uniaxial stage, thereby causing a focal point 257 corresponding to such a motion to be scanned on a focal plane. The respective rays of the feedback light pass through the pin-hole group 265b of the pin-hole disc 265 again to form an image on a high sensitivity camera 251 via a fluorescent filter 249 by the action of a camera lens 250, whereupon the image on the focal plane is picked up after appropriate exposure time.

With the present embodiment, there is shown an example wherein the illumination rays are scanned by means of the microlens disc 264, and the pin-hole disc 265, however, the configuration of the present embodiment is not limited thereto.

For example, a configuration may be adopted wherein light rays passing through a pin-hole disc in an illumination optical system are scanned through a minute angle by a first galvano-mirror, feedback light rays as well are scanned through an identical minute angle by a second galvano-mirror or the like to thereby pass through pin-holes corresponding thereto, and further, portions of feedback light rays, having passed through the pin-holes, are scanned on a high sensitivity camera by a third galvano-mirror or the like while a focal point is kept on the top of an object.

Further, an object for observation may be moved instead of the pin-hole disc. In such a case, a configuration may be adopted wherein the portions of the feedback light rays, having passed through the pin-holes, are scanned on a high sensitivity camera by a galvano-mirror or the like while the focal point is kept on the top of an object, or the high sensitivity camera may be moved for scanning.

The microscope device according to the present embodiment has advantageous effects similar to those of Embodiment 7, Embodiment 9

There is described hereinafter a microscope device according to Embodiment 9 with reference to FIG. 19. With a microscope device 201F according to the present embodiment, there is shown a configuration example for detecting reflected/scattered light rays instead of detecting fluorescent rays.

Figure 19:
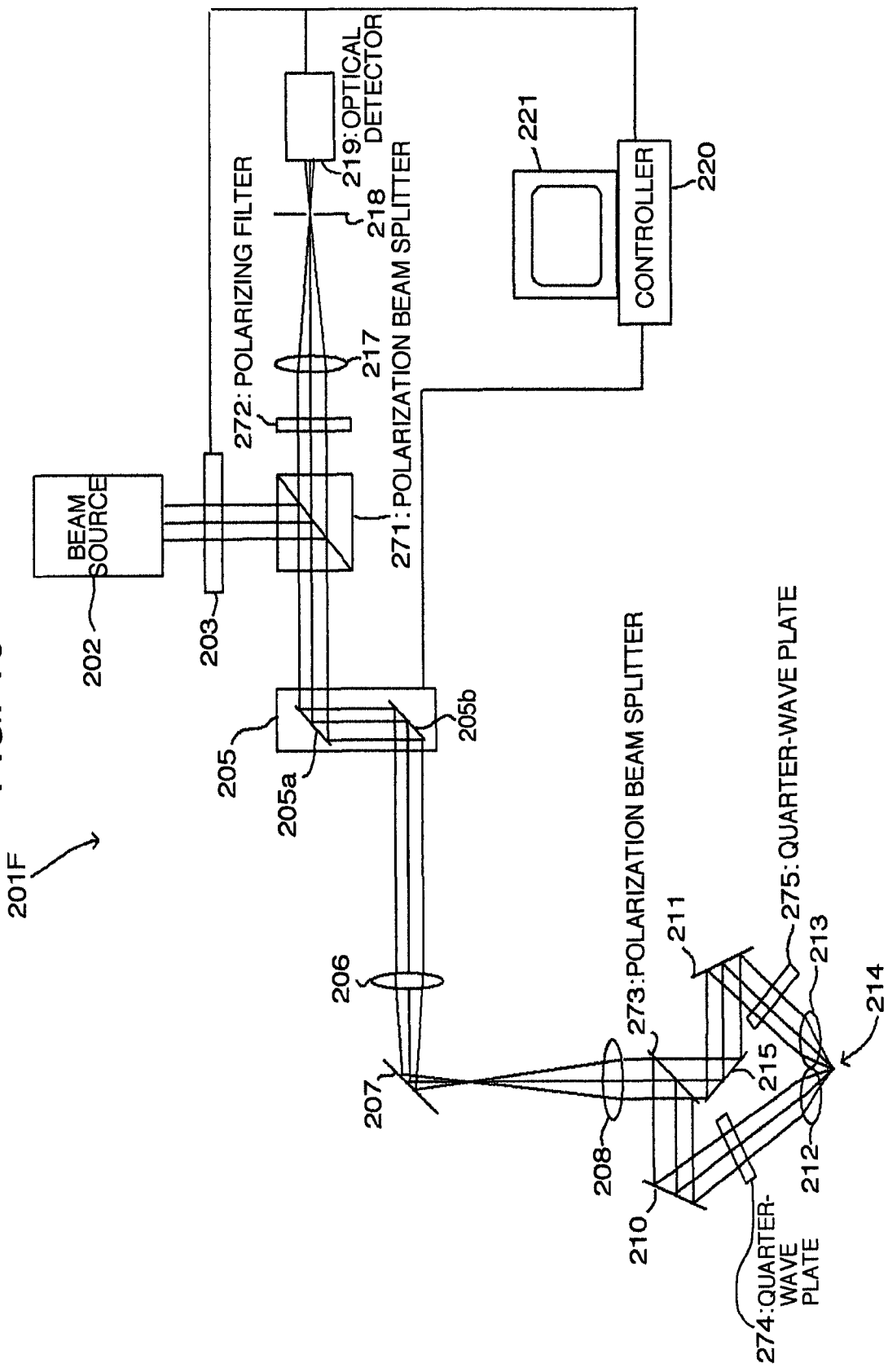
FIG. 19 is a block diagram showing a configuration of the microscope device according to Embodiment 9.

FIG. 19 is a block diagram showing the configuration of the microscope device according to Embodiment 9. In the figure, elements identical to those of Embodiment 3 are denoted by like reference numerals, omitting description thereof.

As shown in FIG. 19, with the microscope device 201F according to the present embodiment, a polarization beam splitter 271 is used in place of the dichroic mirror 204 (FIG. 12) for Embodiment 3, and a polarizing filter 272 is used in place of the fluorescent filter 216 (FIG. 12). Further, a polarization beam splitter 273 is used in place of the dichroic mirror 209 (FIG. 12), and a quarter-wave plate 274 is inserted between a mirror 210 and an objective lens 212 while a quarter-wave plate 275 is inserted between a mirror 211, and an objective lens 213.

Next, there is described hereinafter operation of the microscope device 201F according to the present embodiment.

A laser beam emitted from a laser beam source 202 has linearly polarized light, and the linearly polarized light is reflected by the polarization beam splitter 271, subsequently, passing through the same optical path as is shown in Embodiment 3 to be reflected by the polarization beam splitter 273. The linearly polarized light is reflected by the mirror 210 to be subsequently turned into circularly polarized light by the quarter-wave plate 274, thereby forming a focal point 214 by the action of the objective lens 212.

Reflected/scattered light rays from the focal point 214 are collected by the objective lens 213 to pass through the quarter-wave plate 275 again, whereupon the reflected/scattered light rays are turned into polarized light differing in polarizing direction by 90 degrees from an incident laser beam to be reflected by the mirror 211, and a mirror 215, the polarized light subsequently being transmitted through the polarization beam splitter 273 this time.

Light rays recovered by the objective lens 212 pass through the polarization beam splitter 273 due to similar change in plane of polarization, and do not proceed toward an imaging lens 208, so that the light rays are not recovered. Accordingly, with the present embodiment as well, light rays only from the hatched region shown in FIG. 14 are recovered.

Light rays from the objective lens 213 return through the optical path of the laser beam, in a reverse direction, to pass through the polarization beam splitter 271 this time, whereupon a polarized light component thereof is selected by the polarizing filter 272 to be detected by an optical detector 219 via a pin hole 218.

As described above, with the microscope device 201F according to the present embodiment, by use of two units of the objective lenses 212, 213, an optical system for irradiating a laser beam is separated from an optical system for detecting reflected/scattered light rays, so that it is possible to enhance resolution in the direction of the optical axis. Furthermore, since an illumination optical system is made up independently from a detection optical system, the microscope device according to the present embodiment has a configuration wherein the reflected/scattered light rays from various spots of the path of the illumination optical system, (the reflected/scattered light rays being a cause of a noise), have difficulty in entering the path of the detection optical system, so that the microscope device is extremely excellent in the S/N ratio, and is suitable for observation of a deep part of a texture. In addition, since a near infrared laser beam is used for the light source, the microscope device is excellent in allowing illumination rays to transmit through a living organism, thereby enabling the reflected, reflected/scattered light rays from the deep part of the living organism to be detected while keeping an excellent S/N ratio.

It is to be pointed out that an application range of the second invention is not limited to those embodiments described in the foregoing. The present invention is widely applicable to a microscope device wherein an objective lens of an illumination optical system for irradiating an illumination rays and an objective lens of a detection optical system for detecting feedback light rays based on the illumination rays are positioned at spots where respective primary axes of the objective lenses have undergone parallel translation against each other, the objective lenses being disposed such that respective focal planes thereof coincide with each other.

There are described hereinafter embodiments of the microscope device according to the third invention.

Embodiment 10

There is described hereinafter a microscope device according to Embodiment 10 with reference to FIGS. 20 to 23.

Figure 20:
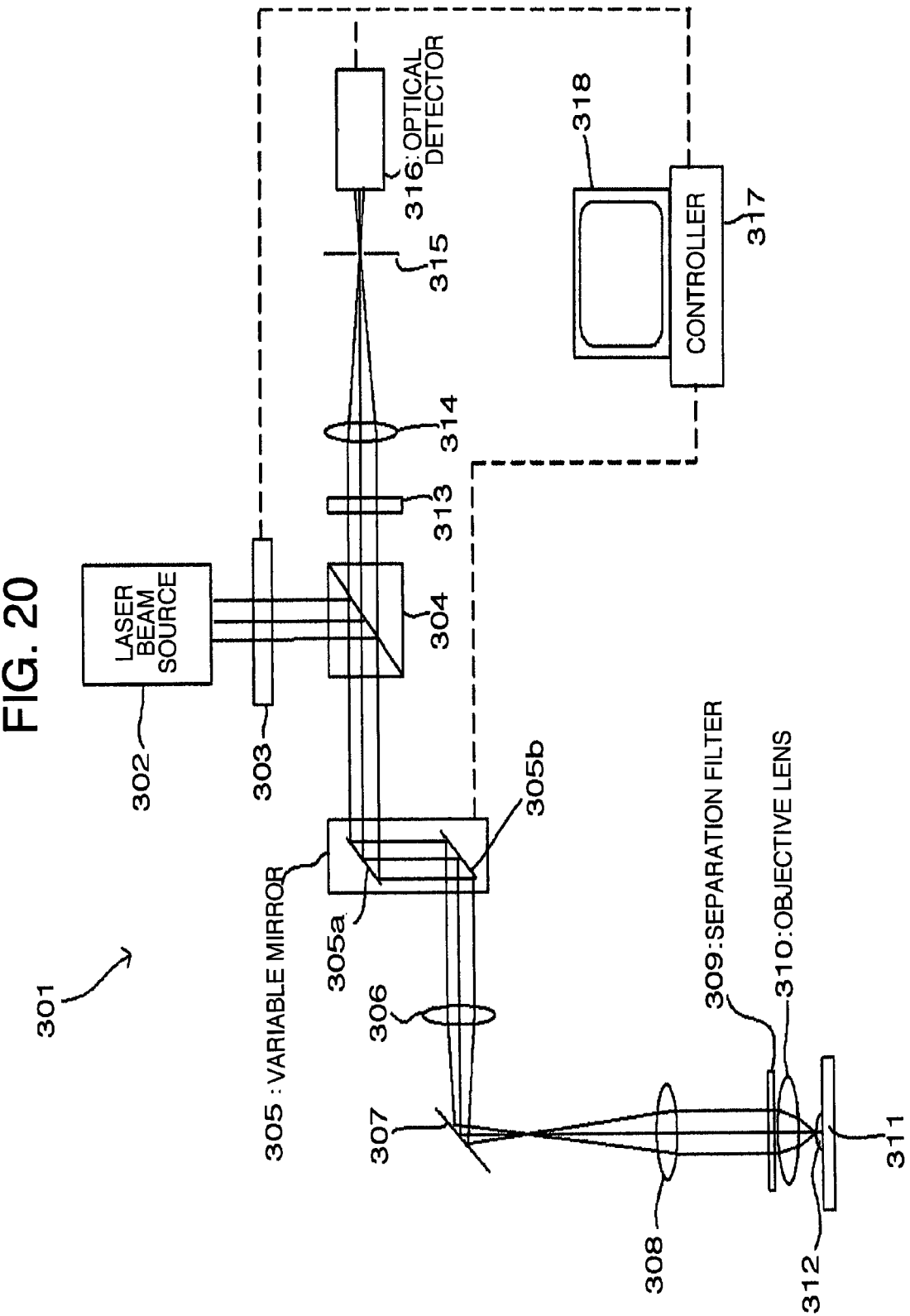
FIG. 20 is a block diagram showing a configuration of a microscope device according to Embodiment 10.

FIG. 20 is a block diagram showing a configuration of the microscope device according to Embodiment 10.

As shown in FIG. 20, a microscope device 301 according to the present embodiment is provided with a laser beam source 302 for outputting a laser beam at a near infrared wavelength, and an electric shutter 303 is disposed in front of the laser beam source 302. Further, there are provided a dichroic mirror 304 for altering orientation of the laser beam, and a scanning optical unit 305 for scanning the laser beam.

The dichroic mirror 304 has characteristics of reflecting the laser beam, and allowing fluorescent rays excited by the laser beam to transmit therethrough. The scanning optical unit 305 comprises a variable mirror 305a rotatable around a rotation axis, and a variable mirror 305b rotatable around an axis substantially orthogonal to the rotation axis of the variable mirror 305a.

Further, the microscope device 301 according to the present embodiment is provided with a pupil projection lens 306 for converging light rays, a mirror 307 for deflecting the laser beam, an imaging lens 308, and an objective lens 310. A separation filter 309 is provided in close proximity to a position of a pupil of the objective lens 310.

Figure 21:
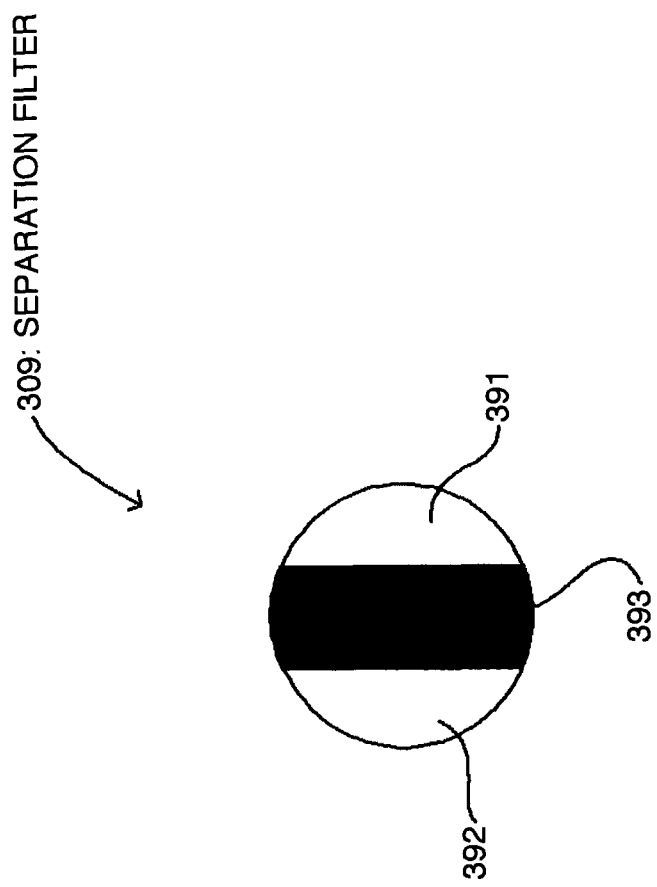
FIG. 21 is a view showing the structure of a separation filter.

FIG. 21 is a view showing a structure of the separation filter 309. As shown in FIG. 21, the separation filter 309 is comprised of a region 391 for allowing only a laser beam to pass therethrough, a region 392 for allowing only fluorescent rays to pass therethrough, and a light-blocking region 393.

Further, the microscope device 301 has a stage 311 on which a specimen 312 is placed. Furthermore, a fluorescent filter 313 for causing fluorescent rays emitted from the specimen 312 to be selectively transmitted therethrough, a lens 314 for converging the fluorescent rays, a pin-hole member 315 with a pin-hole formed therein, and an optical detector 316 for detecting light rays having passed through the pin-hole of the pin-hole member 315 are disposed in close proximity to the dichroic mirror 304.

Still further, the microscope device 301 comprises a controller 317, and a display monitor 318, and on the basis of control by the controller 317, there are executed opening/closing of the electric shutter 303, scanning of the laser beam by the scanning optical unit 305, and acquisition of a signal from the optical detector 316, and outputting information to the display monitor 318.

Next, there is described operation of the microscope device according to the present embodiment hereinafter.

The specimen 312 with a fluorescence indicator to be excited by the laser beam from the laser beam source 302, introduced therein, is placed on the stage 311.

When the electric shutter 303 is open, the laser beam from the laser beam source 302 passes through the electric shutter 303 to be guided to the scanning optical unit 305 by the action of the dichroic mirror 304, thereby being scanned in an optional direction by the scanning optical unit 205.

The laser beam further passes through the pupil projection lens 306, the mirror 307, and the imaging lens 308, subsequently falling on the separation filter 309 provided in close proximity to the position of the pupil of the objective lens 310.

Figure 22:
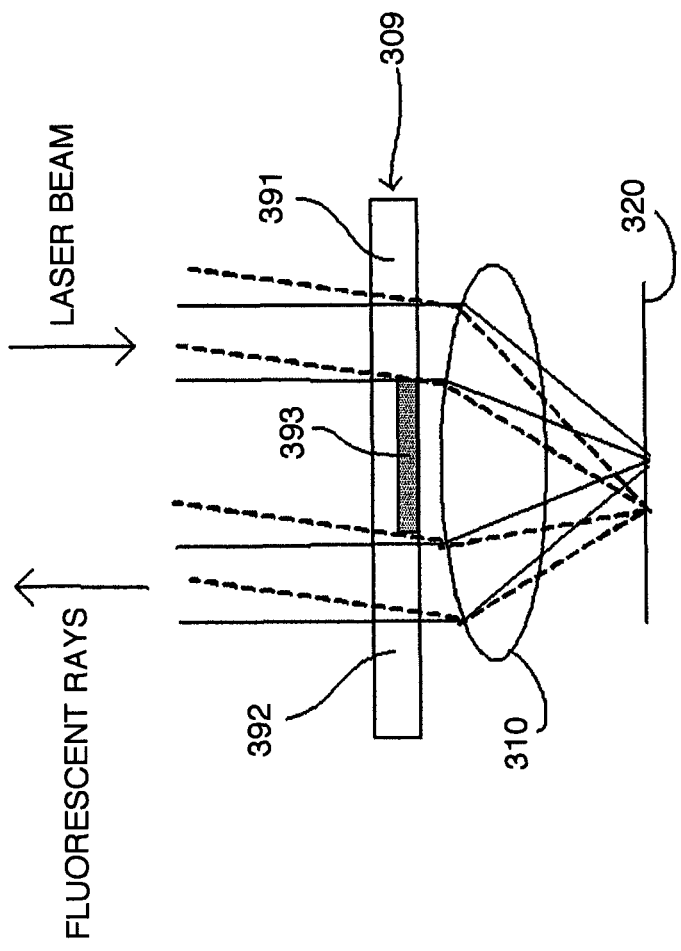
FIG. 22 is a view showing the function of the separation filter.

FIG. 22 is a view showing the function of the separation filter 309.

Since the separation filter 309 is made up such that the laser beam can transmit through only a portion thereof (the region 391), only a portion of the laser beam passes therethrough before entering the objective lens 310. The portion of the laser beam is converged by the objective lens 310, and a convergence point is scanned on a focal plane 320 by the scanning optical unit 305. The fluorescence indicator of the specimen is excited by the laser beam, thereby emitting fluorescent rays. The fluorescent rays are captured by the objective lens 310 to subsequently proceed to the separation filter 309, however, the separation filter 309 allows the fluorescent rays to pass through only a portion thereof (the region 392).

As shown in FIG. 20, the fluorescent rays having passed through the separation filter 309 advance in a reverse direction in relation to the laser beam so as to be guided to the dichroic mirror 304 via the imaging lens 308, the mirror 307, the pupil projection lens 306, and the scanning optical unit 305. The fluorescent rays are transmitted through the dichroic mirror 304, whereupon a specific wavelength component of the fluorescent rays are selectively transmitted therethrough by the fluorescent filter 313, and fluorescent rays only from the focal plane 320 are selected by the lens 314 and the pin-hole member 315 before entering the optical detector 316.

An output signal from the optical detector 316 is guided to the controller 317 to be converted into a digital signal in sync with scanning control by the scanning optical unit 305, whereupon image data corresponding to a scanning position is prepared to be displayed on the display monitor 318, or the image data is stored in an internal memory.

Figure 23:
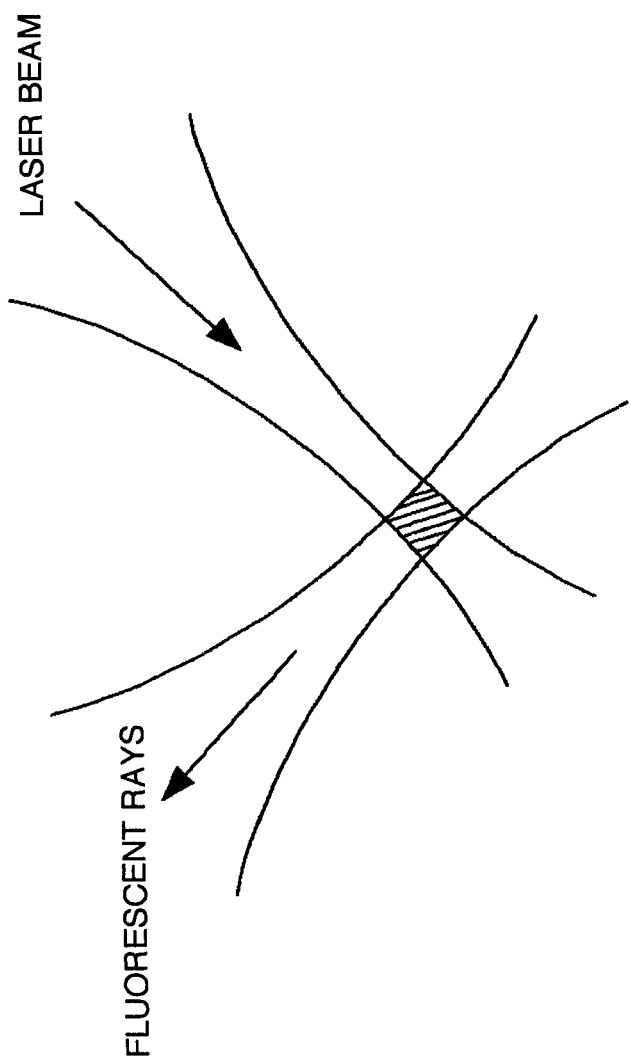
FIG. 23 is a view showing a region in close proximity to a convergence point of an objective lens.

FIG. 23 is a view showing a region in close proximity to a convergence point of the objective lens 310. As shown in FIG. 23, a fluorescent substance is excited by the laser beam incoming from the right side, and the fluorescent rays are detected from the left side, making only a partial use of the pupil of the objective lens 310, so that resolution in the horizontal direction slightly deteriorates, but resolution depthwise is excellent because the fluorescent rays in a hatched region of FIG. 23 are selectively detected.

When the optical system is made up such that the optical axis of the laser beam intersects the optical axis of detected fluorescent rays at an angle around 90°, the hatched region of FIG. 23 will be the smallest in size, so that the most excellent resolution can be obtained. Further, since the optical path of the laser beam is separated from the optical path of the detected fluorescent rays, fluorescent rays outside of the hatched region of FIG. 23, excited by the laser beam, will not easily detected, so that an image can be picked up with an excellent S/N ratio at the time of observation of a deep part of an object.

Furthermore, since the fluorescent rays only in the hatched region will return, confocal effects are obtainable even without use of the pin-hole member 315, however, if the pin-hole member is inserted, this will further improve SN.

Now, as to an installation position of the separation filter 309, the separation filter 309 is preferably installed in close proximity to the position of the pupil of the objective lens 310, but the same may be installed inside the scanning optical unit 305 where the position of the pupil is projected, or in the vicinity thereof, or the separation filter 309 may be inserted in parallel paths between the scanning optical unit 305, and the dichroic mirror 304. It need only be sufficient to install the separation filter in the vicinity of a spot where the position of the pupil of the objective lens 310 is relayed.

Still further, a pattern on the separation filter 309 is not limited to that described in the foregoing, and respective regions for use in selecting light rays to be transmitted may be radially or concentrically patterned. Other patterns may be adopted as long as similar effects can be gained.

Thus, with the microscope device according to Embodiment 10, since the optical system for irradiating the laser beam is separated from the optical system for detection, resolution in the direction of the optical axis is excellent. Furthermore, since the illumination optical system is made up independently from the detection optical system, the fluorescent rays from various spots of the path of the illumination optical system, (the fluorescent rays being a cause of a noise), have difficulty in entering the path of the detection optical system, so that the microscope device is extremely excellent in the S/N ratio, and is suitable for observation of a deep part of a texture.

Embodiment 11

There is described hereinafter a microscope device according to Embodiment 11 with reference to FIG. 24.

Figure 24:
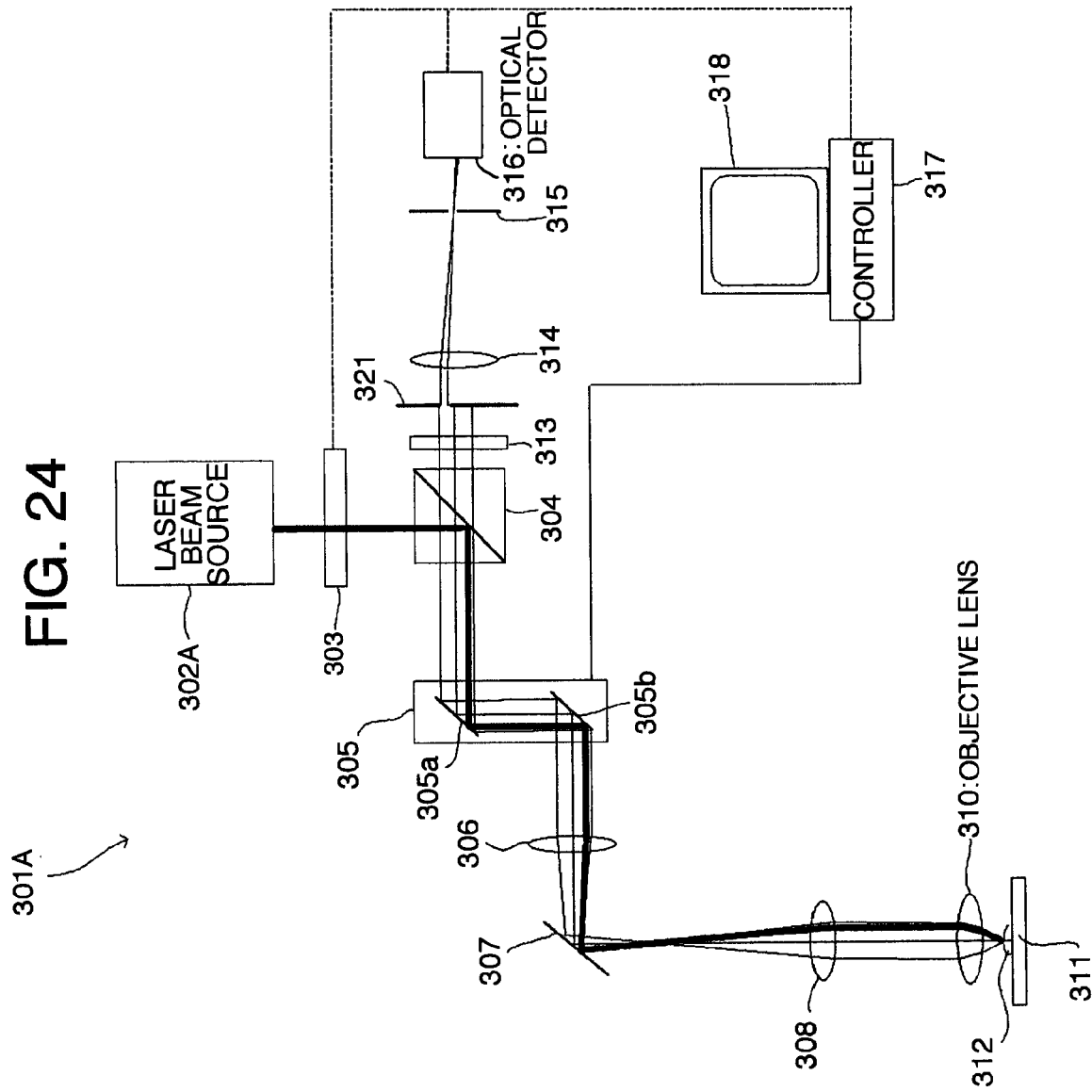
FIG. 24 is a block diagram showing a configuration of the microscope device according to Embodiment 11.

FIG. 24 is a block diagram showing a configuration of the microscope device according to Embodiment 11. In the figure, elements identical to those of Embodiment 10 are denoted by like reference numerals, omitting description thereof.

As shown in FIG. 24, with the microscope device 301A according to Embodiment 11, a laser beam from a laser beam source 302A is narrowed down in size to thereby pass through an optical path off the enter of an optical axis. Further, there is provided a light-shield mask 321 for selection of feedback light rays (fluorescent rays).

In FIG. 24, an optical path of the laser beam is an optical path indicated by a heavy line, and the laser beam enters from the right side of an objective lens 310, in FIG. 24. Fluorescent rays from a specimen 311 return in the form of a beam as thick as a pupil diameter, as shown by a solid line in the figure, and only a portion thereof is taken out through a light-shield mask 321, whereupon a light beam having passed through a pin hole 315 is detected by an optical detector 316.

Light rays passing through the light-shield mask 321 being a light beam passing through the left side of the objective lens 310, the light-shield mask 321 acts, in effect, in the same way as the separation filter 309 according to Embodiment 10. Further, the light-shield mask 321 may be provided in close proximity to the pin hole 315.

With the microscope device according to the present embodiment, most of the laser beam can be utilized, so that an additional advantage of excellent efficiency is gained in addition to the advantageous effect of Embodiment 10.

Embodiment 12

There is described hereinafter a microscope device according to Embodiment 12 with reference to FIGS. 25 to 27. In the figure, elements identical to those of Embodiment 10 are denoted by like reference numerals, omitting description thereof.

With the microscope device according to Embodiment 12, a separation filter differs in structure from that for the microscope device according to Embodiment 10.

Figure 25:
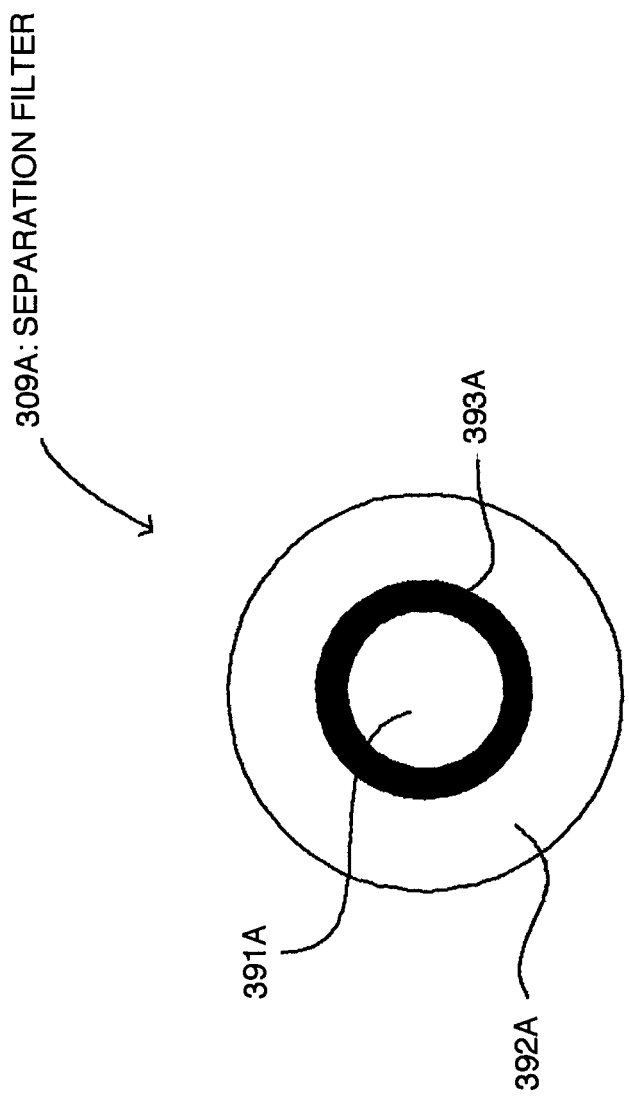
FIG. 25 is a view showing the structure of a separation filter according to Embodiment 12.

FIG. 25 is a view showing the structure of a separation filter 309A for use in the microscope device according to the present embodiment.

As shown in FIG. 25, with the separation filter 309A, a region 391A for allowing only a laser beam to pass therethrough, a light-blocking region 393A, and a region 392A for allowing only fluorescent rays to pass therethrough are concentrically provided in sequence from inside toward outside of the separation filter 309A.

Figure 26:
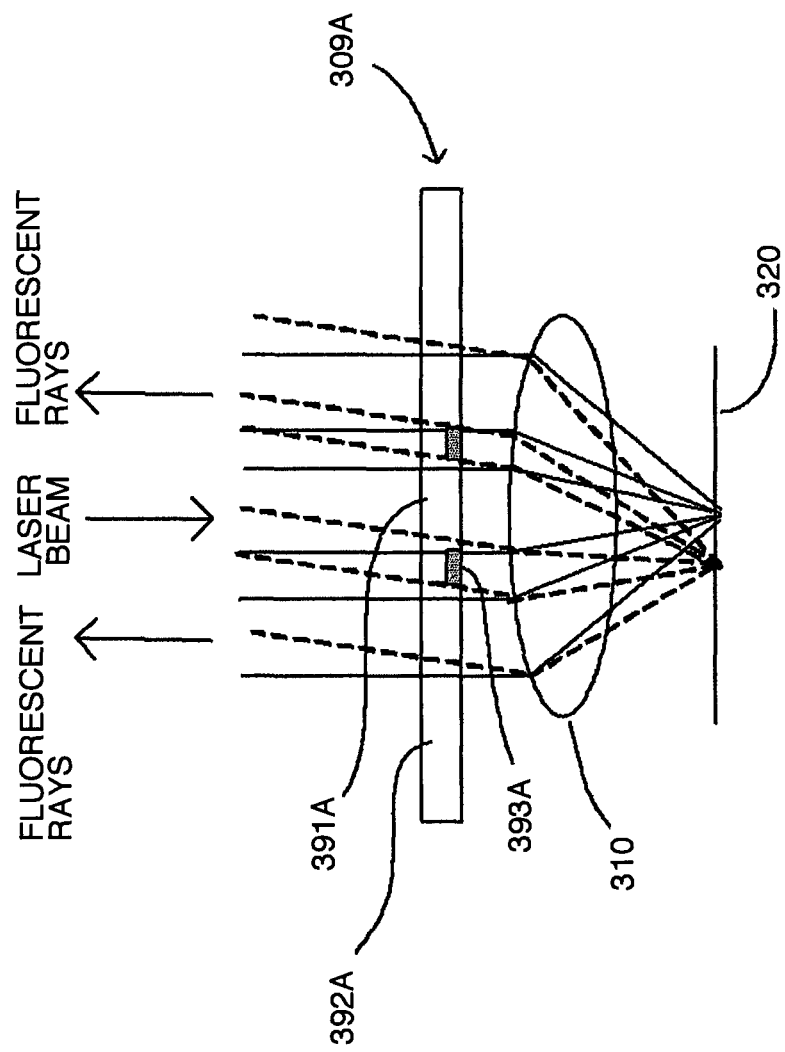
FIG. 26 is a view showing the function of a separation filter.

FIG. 26 is a view showing the function of the separation filter 309A.

As shown in FIG. 26, with the microscope device according to the present embodiment, a laser beam from a laser beam source is narrowed down in size so as to correspond to the region 391A of the separation filter 309A. The laser beam having passed through the region 391A undergoes convergence by the action of an objective lens 310. The fluorescent rays from a convergence point having passed through the region 392A are turned back to advance through the same optical path as an optical of the laser beam.

Figure 27:
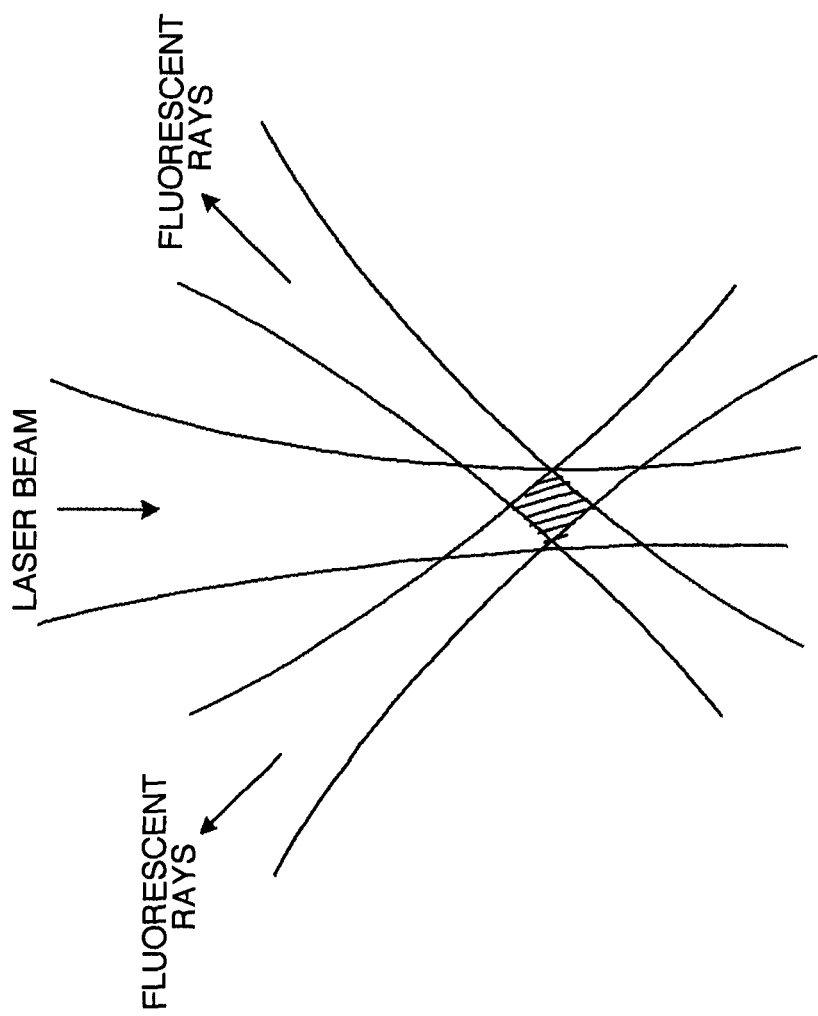
FIG. 27 is a view showing a region in close proximity to a convergence point of an objective lens.

FIG. 27 is a view showing a region in close proximity to the convergence point of the objective lens 310.

As shown in FIG. 27, with the present embodiment, a fluorescent substance is excited by the laser beam from the region close to the optical axis, thereby detecting the fluorescent rays outgoing from outer sides of the region. By so doing, the fluorescent rays in the hatched region are selectively detected, so that resolution depthwise is excellent as is the case with Embodiment 10.

Now, as to the installation position of the separation filter 309A, the separation filter 309A is preferably installed in close proximity to the position of the pupil of the objective lens 310, but the same may be installed at a spot, or in the vicinity thereof, inside the scanning optical unit 305, where the position of the pupil is projected, or the separation filter 309A may be inserted in parallel paths between the scanning optical unit 305, and the dichroic mirror 304. It need only be sufficient to install the separation filter in the vicinity of a spot where the position of the pupil of the objective lens 310 is relayed.

With the microscope device according to the present embodiment, most of the laser beam can be utilized, so that an additional advantage of excellent efficiency is gained in addition to the advantageous effect of Embodiment 10.

Embodiment 13

There is described hereinafter a microscope device according to Embodiment 13 with reference to FIG. 28. With the microscope device according to Embodiment 13, there is adopted a canning method differing from that for Embodiment 10.

Figure 28:
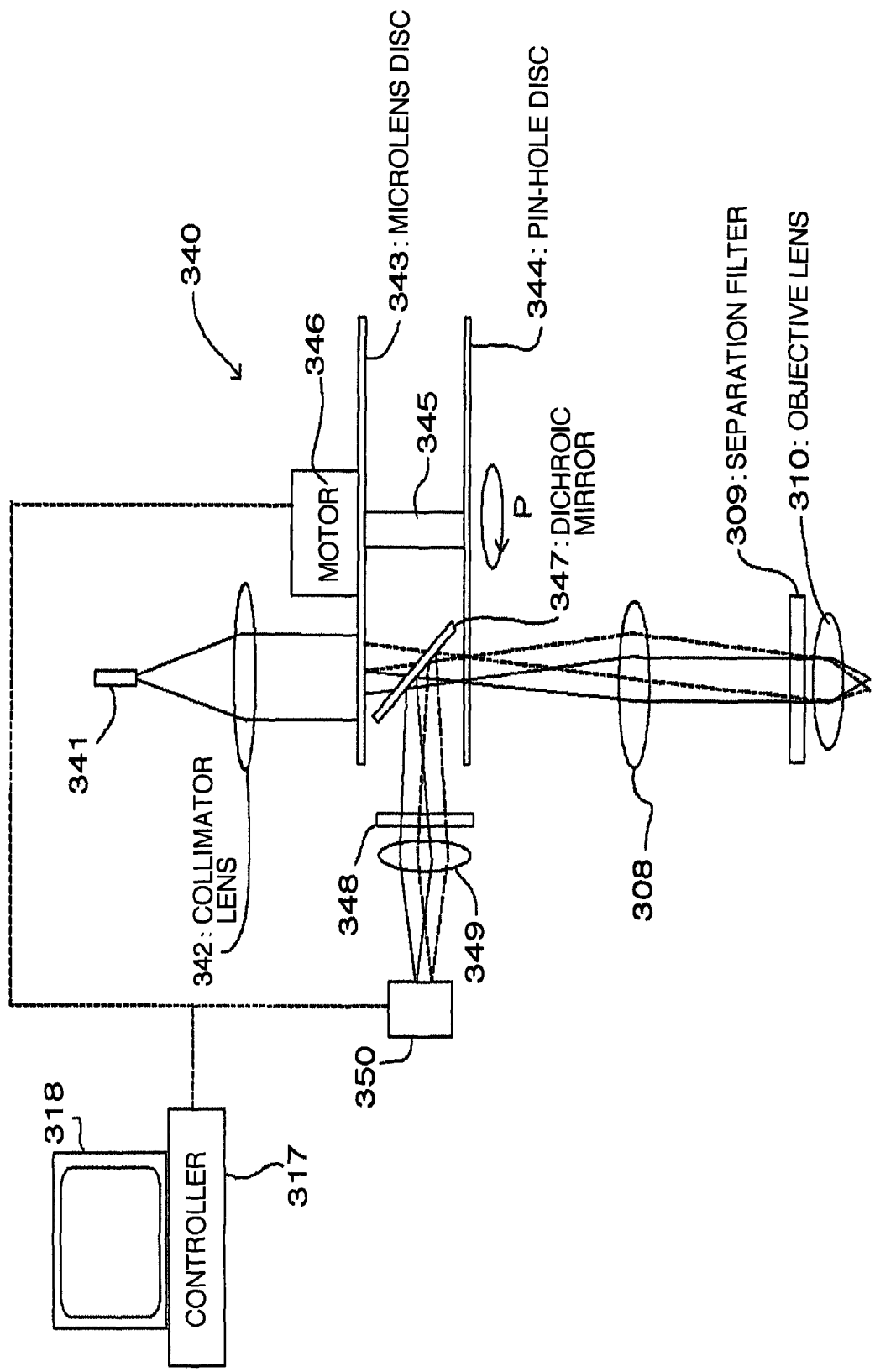
FIG. 28 is a block diagram showing a configuration of a microscope device according to Embodiment 13.

FIG. 28 is a block diagram showing a configuration of the microscope device according to Embodiment 13. In the figure, elements identical to those of Embodiment 10 are denoted by like reference numerals, omitting description thereof.

As shown in FIG. 28, with the microscope device according to the present embodiment, a laser beam from a laser beam source falls on a scanner unit 340.

The scanner unit 340 comprises a laser beam irradiation sub-unit 341 for applying a laser beam from a tip of an optical fiber connected to a laser beam source, and a collimator lens 342. Further, the scanner unit 340 has a microlens disc 343 with arrays of microlenses disposed thereon, and a pin-hole disc 344 on which pin-holes are disposed in the same pattern as a disposition pattern of the microlenses. The microlens disc 343, and the pin-hole disc 344 are linked to each other with a linkage drum 345, and are integrally rotatable by a motor 346. Further, a dichroic mirror 347 is disposed between the microlens disc 343, and the pin-hole disc 344. Furthermore, a fluorescent filter 348, a camera lens 349, and a camera 350 are disposed in the scanner unit 340.

An imaging lens 308, and an objective lens 310 are disposed below the pin-hole disc 344 of the scanner unit 340. A separation filter 309 is provided in close proximity to the position of the pupil of the objective lens 310 as in the case of Embodiment 10. Use may be made of the separation filter 309A according to Embodiment 12 in place of the separation filter 309. The camera 350, and the motor 346 are connected to a controller 317, thereby adjusting synchronization in rotation, and exposure time.

Next, there is described hereinafter operation of the microscope device according to the present embodiment.

The laser beam applied from the tip of the optical fiber of the laser beam irradiation sub-unit 341 is converted into parallel rays by the collimator lens 342. The parallel rays are applied to the microlens disc 343 to be transmitted through the dichroic mirror 347 by the action of each of the microlenses so as to be focused at pin-holes on the pin-hole disc 344, corresponding to the microlenses, respectively.

The laser beam having passed through the pin-hole disc 344 are converted into parallel rays by the action of the imaging lens 308, the parallel rays having an inclination corresponding to respective positions of the pin-holes of the pin-hole disc 344 through which the laser beam has passed. When the parallel rays fall on the objective lens 310, an image of a focal point is formed on a focal plane in such a way as to correspond to the inclination of the parallel rays, so that the parallel rays falling on the objective lens 310 are focused at a position corresponding to the inclination of the parallel rays.

In FIG. 28, light rays at the center of an optical axis is indicated by a solid line, and light rays off the center of the optical axis is indicated by a broken line. Fluorescent rays generated at the focal point are collected by the objective lens 310 to be turned into parallel rays. At this point in time, an incident light is applied to the objective lens 310 from the right side thereof, in FIG. 28, owing to the effect of a separation filter 309, and fluorescent rays passing the left side of the objective lens 310 passes through the separation filter 309 to be turned back (refer to FIG. 22). The fluorescent rays pass through the same optical path, thereby passing through the same respective pin holes of the pin-hole disc 344 again. Then, the fluorescent rays having passed through the respective pin holes are reflected by the dichroic mirror 347, whereupon a specific wavelength component of the fluorescent rays is selected by the fluorescent filter 348, and an image is formed by the action of the camera lens 349 to be picked up by the camera 350.

Now, when the microlens disc 343, and the pin-hole disc 344 are integrally rotated, the fluorescent rays passing through the respective pin holes will scan focal planes corresponding thereto, and after the individual fluorescent rays pass through the same respective pin holes again, the individual fluorescent rays scan image elements of the camera 350. By so doing, the fluorescent rays on the respective focal planes are projected on the camera 350 to thereby enable observation. Further, in this case, the fluorescent rays from other than the respective focal planes are hardly able to pass through the respective pin-holes, and are therefore hardly able to reach the camera 350. As a result, the camera 350 picks up confocal images of the fluorescent rays only from the respective focal planes.

As shown in FIG. 23, the fluorescent substance is excited from the right side, and the fluorescent rays are detected from the left side, making only a partial use of the pupil of the objective lens 310, so that resolution in the horizontal direction slightly deteriorates, but resolution depthwise is excellent because the fluorescent rays in the hatched region of FIG. 23 are detected.

When the optical system is made up such that the optical axis of the laser beam intersects the optical axis of detected fluorescent rays at an angle around 90°, the hatched region of FIG. 23 is the smallest in size, so that excellent resolution can be obtained. Further, with the present embodiment as well, the optical path of the laser beam is separated from the optical path of the detected fluorescent rays, so that fluorescent rays outside of the hatched region of FIG. 23, excited by the laser beam, is not easily detected, and an image can be picked up with an excellent S/N ratio at the time of observation of a deep part of an object.

Further, if adjacent optical paths of the optical system, passing through the pin hole, overlap each other in close proximity to a specimen, this will invite deterioration in SN, so that it is preferable to adopt the pin-hole disc 344 or the like, having a pin-hole pattern with such intervals as to prevent optical paths in close proximity to the specimen from overlapping each other.

With the microscope device according to Embodiment 13, use is made of the scanner unit 340 for scanning a laser beam by rotation of the discs, so that an advantage of high scanning speed is gained in addition to the advantageous effect of Embodiment 10.

Embodiment 14

Figure 29:
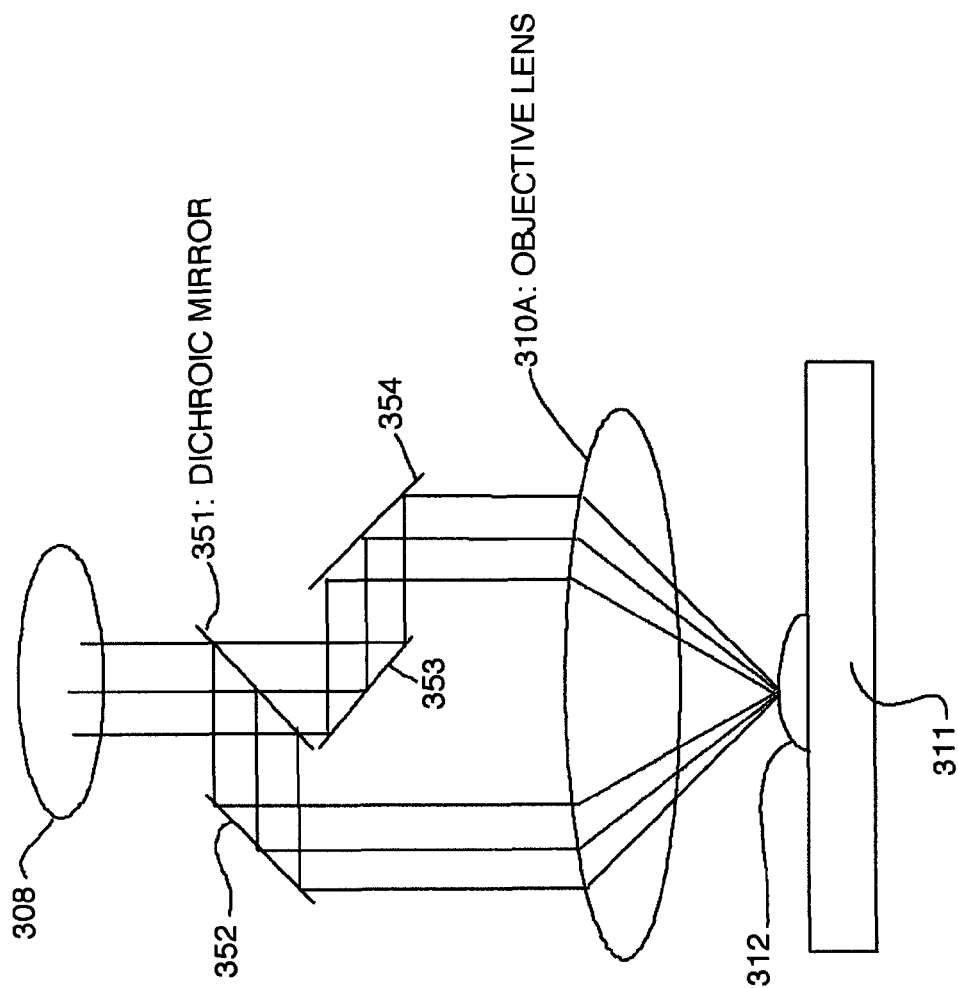
FIG. 29 is a block diagram showing a configuration of the periphery of an objective lens of a microscope device according to Embodiment 14.

There is described hereinafter a microscope device according to Embodiment 14 with reference to FIG. 29. FIG. 29 is a block diagram showing a configuration of the periphery of an objective lens of the microscope device according to Embodiment 14.

FIG. 29 shows a part of the microscope device according to the present embodiment, differing in configuration from the microscope device according to Embodiment 10, and other parts thereof are the same in configuration as those for Embodiment 10.

With the microscope device according to the present embodiment, an optical path from an imaging lens 308 to a specimen 312 differs from that for Embodiment 10.

As shown in FIG. 29, with the present embodiment, use is made of a dichroic mirror 351 to thereby separate a detection optical path from an optical path of illumination rays from the imaging lens 308 to the specimen 312. More specifically, disposed ahead of the imaging lens 308 is the dichroic mirror 351 for reflecting light rays at a wavelength of the laser beam, and light rays longer in wavelength than the laser beam. Further, disposed in close proximity thereto are three sheets of reflecting mirrors 352, 353, 354. Furthermore, for an objective lens 310A, use is made of an objective lens relatively large in diameter.

With the microscope device according to the present embodiment, a near infrared laser beam converted into parallel rays by the imaging lens 308 are reflected by the dichroic mirror 351, and the reflecting mirror 352 to fall on the objective lens 310A as light rays in parallel with, and offset from the primary axis of the objective lens 310A.

As shown in FIG. 29, the light rays are focused on the specimen 312, whereupon fluorescent rays are emitted from the specimen 312. A portion of the fluorescent rays passes through another optical path symmetrical to an optical path of illumination rays with respect to the primary axis of the objective lens 310A to be converted into parallel rays again by the objective lens 310A before reflection by the mirrors 354, 353. The fluorescent rays pass through the dichroic mirror 351 having transmission property for fluorescent wavelengths to return in the same optical path as that of the illumination light rays. Thereafter, the fluorescent rays return similarly in manner to the case of Embodiment 10 to be transmitted through a dichroic mirror 304 before detection by an optical detector 316 (refer to FIG. 20).

With the microscope device according to Embodiment 14, since the optical system for irradiating the laser beam is separated from the optical system for detection, resolution in the direction of the optical axis is excellent. Furthermore, since the illumination optical system is made up independently from the detection optical system, the fluorescent rays from various spots of the path of the illumination optical system, (the fluorescent rays being a cause of a noise), have difficulty in entering the path of the detection optical system, so that the microscope device is extremely excellent in the S/N ratio, and is suitable for observation of a deep part of a texture.

Embodiment 15

There is described hereinafter a microscope device according to Embodiment 15 with reference to FIG. 30.

Figure 30:
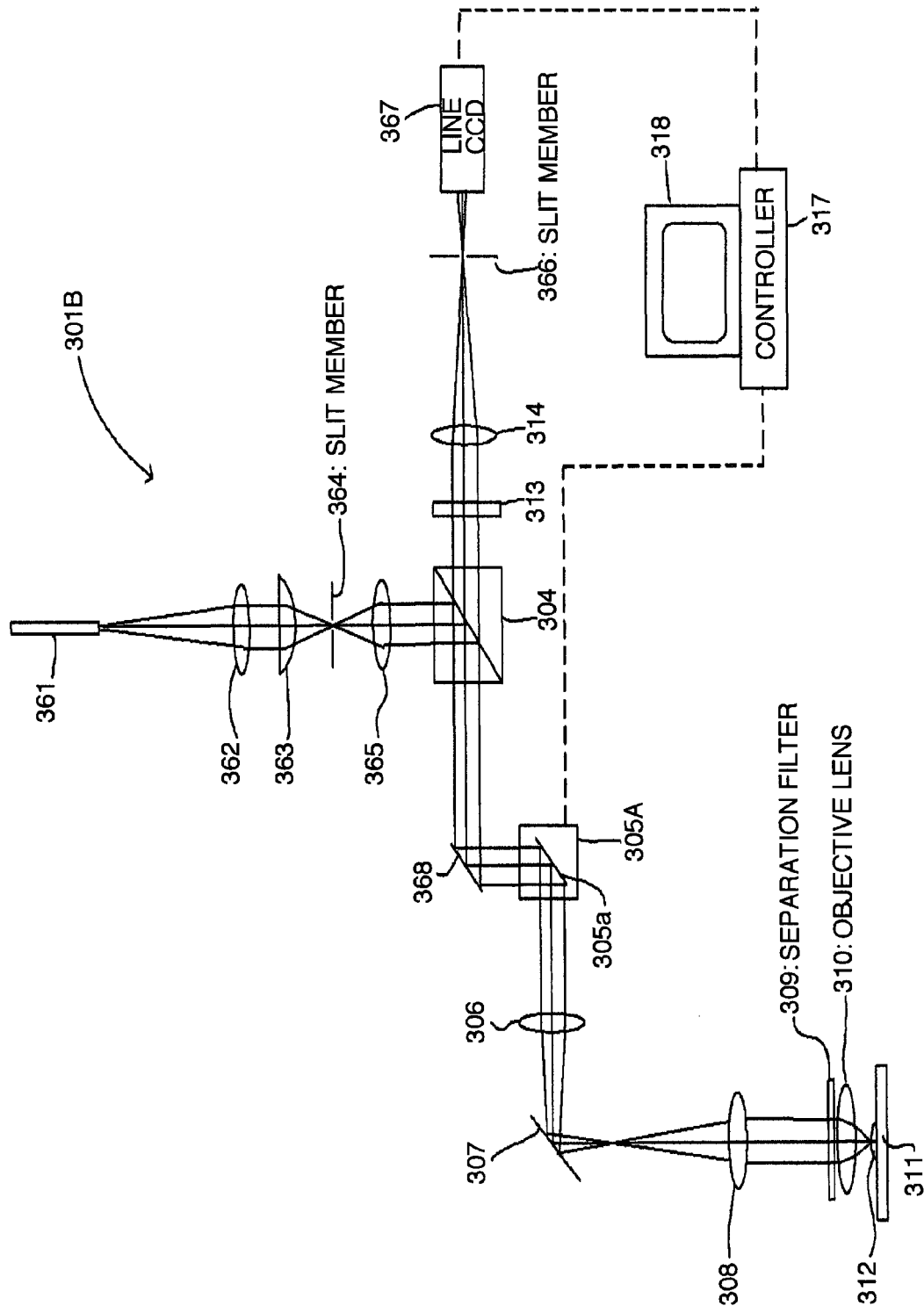
FIG. 30 is a block diagram showing a configuration of a microscope device according to Embodiment 15.

FIG. 30 is a block diagram showing a configuration of the microscope device 301B according to Embodiment 15. In the figure, elements thereof, identical to those of Embodiment 10, are denoted by like reference numerals, omitting description thereof.

With the microscope device 301B according to Embodiment 15, light rays in a line-like form are projected. The microscope device according to the present embodiment has an optical fiber 361 for irradiating a laser beam from a laser beam source (not shown). Disposed ahead of the optical fiber 361 are a collimator lens 362, a cylindrical lens 363, a slit member 364 having a slit opened in a direction perpendicular to the plane of the figure, and an imaging lens 365. An optical scanning unit 305A has a galvano-mirror 305a rotatable around a rotation axis perpendicular to the plane of the figure. In place of the variable mirror 305b according to Embodiment 10 (FIG. 20), a fixed mirror 368 is disposed. Further, in place of the pin-hole member 315 according to Embodiment 10 (FIG. 20), a slit member 366 having a slit opened in a direction perpendicular to the plane of the figure is disposed, and a line CCD 367 is used as an optical detector.

There is described hereinafter operation of the microscope device 301B according to the present embodiment.

The laser beam from the laser beam source is transmitted as from a point-source by the optical fiber 361 to be converted into parallel rays by the collimator lens 362 before being condensed into the form of a line by the action of the cylindrical lens 363. Condensed rays in the form of the line, having passed through the slit 363 disposed at a condensing point, subsequently pass through the imaging lens 365.

Thereafter, as shown in FIG. 30, the condensed rays form an image on a focal plane by the action of an objective lens 310 via an optical path identical to that for Embodiment 10, the image being in the form of the line extending in the direction perpendicular to the plane of the figure. The fluorescent rays from this line are recovered by the objective lens 310, however, with respect to individual points on the line, the fluorescent rays only from the hatched region shown in FIG. 23 are recovered owing to the effect of a separation filter 309 as is the case with Embodiment 10. The fluorescent rays are again turned into images at the slit of the slit member 366 by the action of a lens system, and only the fluorescent rays from the focal plane, having passed through the slit, are detected by the line CCD 367.

Further, the line is scanned on the focal plane in a direction perpendicular to the line by operating the galvano-mirror 305a, which information is detected by the line CCD 367 to be turned into images by a controller 317.

With the microscope device 301B according to Embodiment 15, a set of focal points of the illumination rays is in the form of the line, and a set of detection points as detected above is also in the form of a line coinciding with the set of the focal points, thereby adopting a configuration wherein the line is scanned in one direction, so that an additional advantage of shorter scanning time is gained in addition to the advantageous effect of Embodiment 10.

Embodiment 16

There is described hereinafter a microscope device according to Embodiment 16 with reference to FIG. 31.

Figure 31:
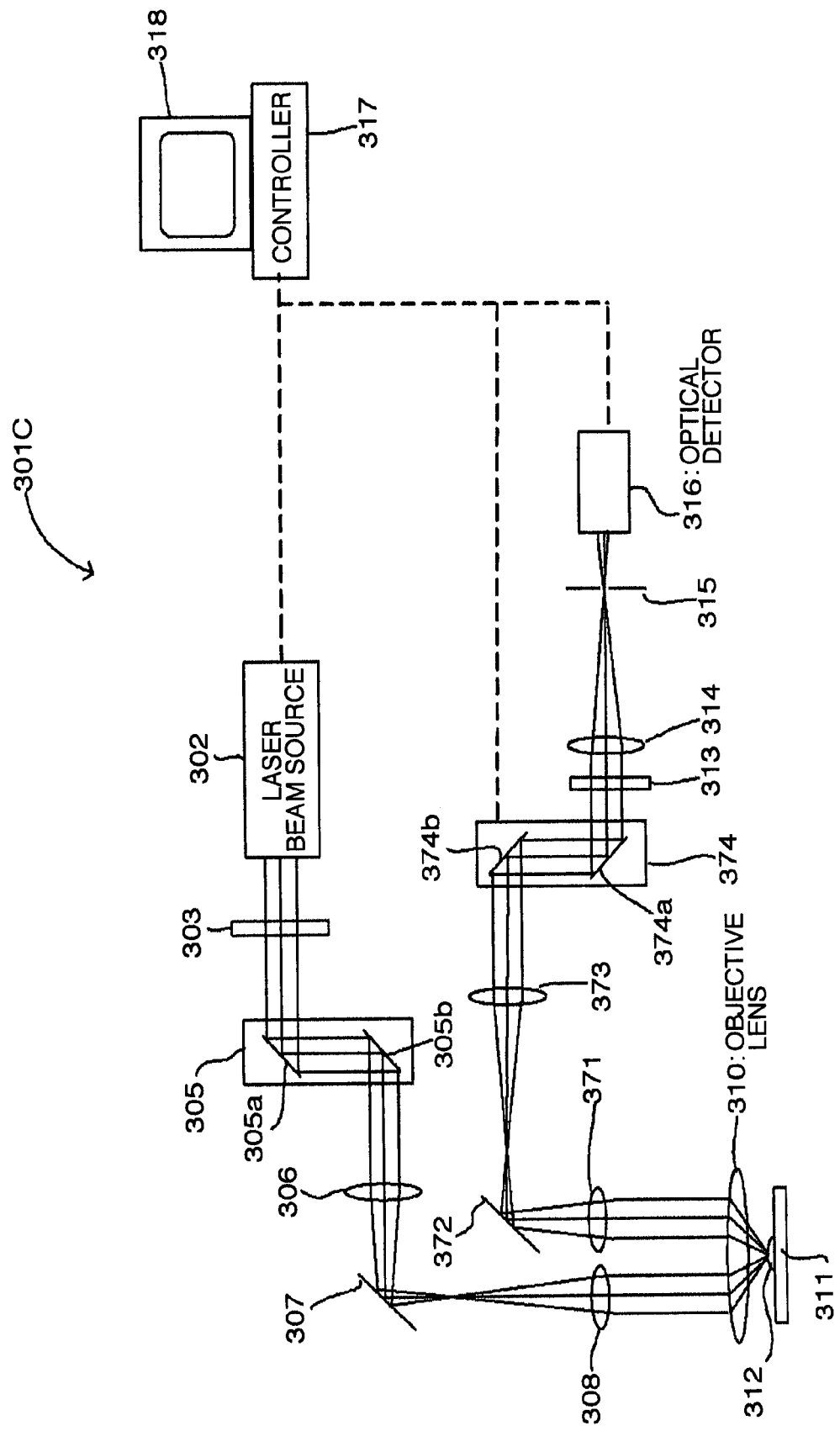
FIG. 31 is a block diagram showing a configuration of a microscope device according to Embodiment 16.

FIG. 31 is a block diagram showing a configuration of a microscope device 301C according to Embodiment 16. In the figure, elements thereof, identical to those of Embodiment 10, are denoted by like reference numerals, omitting description thereof.

With the microscope device 301C according to the present embodiment, a configuration is adopted wherein an illumination optical system is fully separated from a detection optical system.

As shown in FIG. 31, the dichroic mirror 304 disposed in the optical path of Embodiment 10 is not used in an optical path of the illumination optical system. Further, parallel rays from an imaging lens 308 are adapted to fall on an objective lens 310 so as to be offset from the primary axis of the objective lens 310, and the separation filter 309 used in Embodiment 10 is eliminated. Further, fluorescent rays recovered by the objective lens 310 are rendered symmetrical with the laser beam of the illumination optical system with respect to the optical axis of the objective lens 310, and an optical path after the objective lens 310 comprises an imaging lens 371, a mirror 372, a pupil projection lens 373, and a scanning optical unit 374 comprising two sheets of galvano-mirrors 374a, 374b. An optical path from a fluorescent filter 313 to an optical detector 316 is the same as that for Embodiment 10.

With the microscope device 301C according to the present embodiment, the laser beam from a laser beam source 302 falls on the objective lens 310 via an electric shutter 303, a scanning optical unit 305, a pupil projection lens 306, a mirror 307, and the imaging lens 308 to be focused by the objective lens 310. The fluorescent rays from a focal point are recovered by the objective lens 310. In this case, as the parallel rays from the imaging lens 308 fall on the objective lens 310 so as to be offset from the primary axis of the objective lens 310, so the fluorescent rays to be recovered, as well, are recovered in a direction offset from the primary axis of the objective lens 310, so that the fluorescent rays only from the hatched region of FIG. 23 are recovered.

The fluorescent rays are turned into parallel rays to pass through the imaging lens 371 to be then reflected by the mirror 372, being turned into parallel rays again by the pupil projection lens 373 before passing through the scanning optical unit 374, whereupon a wavelength component is selected by the fluorescent filter 313. Thereafter, the fluorescent rays are converged on a pin hole 315 by the action of a lens 314, whereupon the fluorescent rays only from a focal plane are selected by the lens 314, and the pin hole 315 to be delivered to the optical detector 316.

Further, at the time when a controller 317 causes the scanning optical unit 305 to scan on the focal plane, the controller 317 drives the scanning optical unit 305 in sync with the scanning optical unit 374, thereby executing a control such that there will occur no change in the direction of the fluorescent rays proceeding toward the pin hole 315 even if a change occurs in the direction of the parallel rays entering the scanning optical unit 374.

An output signal from the optical detector 316 is guided to the controller 317 to be converted into a digital signal in sync with scanning control by the scanning optical unit 305, whereupon image data corresponding to a scanning position is prepared to be displayed on a display monitor 318, or the image data is stored in an internal memory.

Thus, with the microscope device 301C according to the present embodiment, an optical path of feedback light rays are made up of optical components independent from those of an optical path of illumination rays, thereby completely separating those optical paths from each other, so that it is possible to remove stray light rays, such as feedback light rays from the illumination optical system in addition to advantageous effect of Embodiment 10, and an additional advantage is therefore gained in that the S/N ratio of images is further improved.

Embodiment 17

There is described hereinafter a microscope device according to Embodiment 17 with reference to FIGS. 32, 33.

Figure 32:
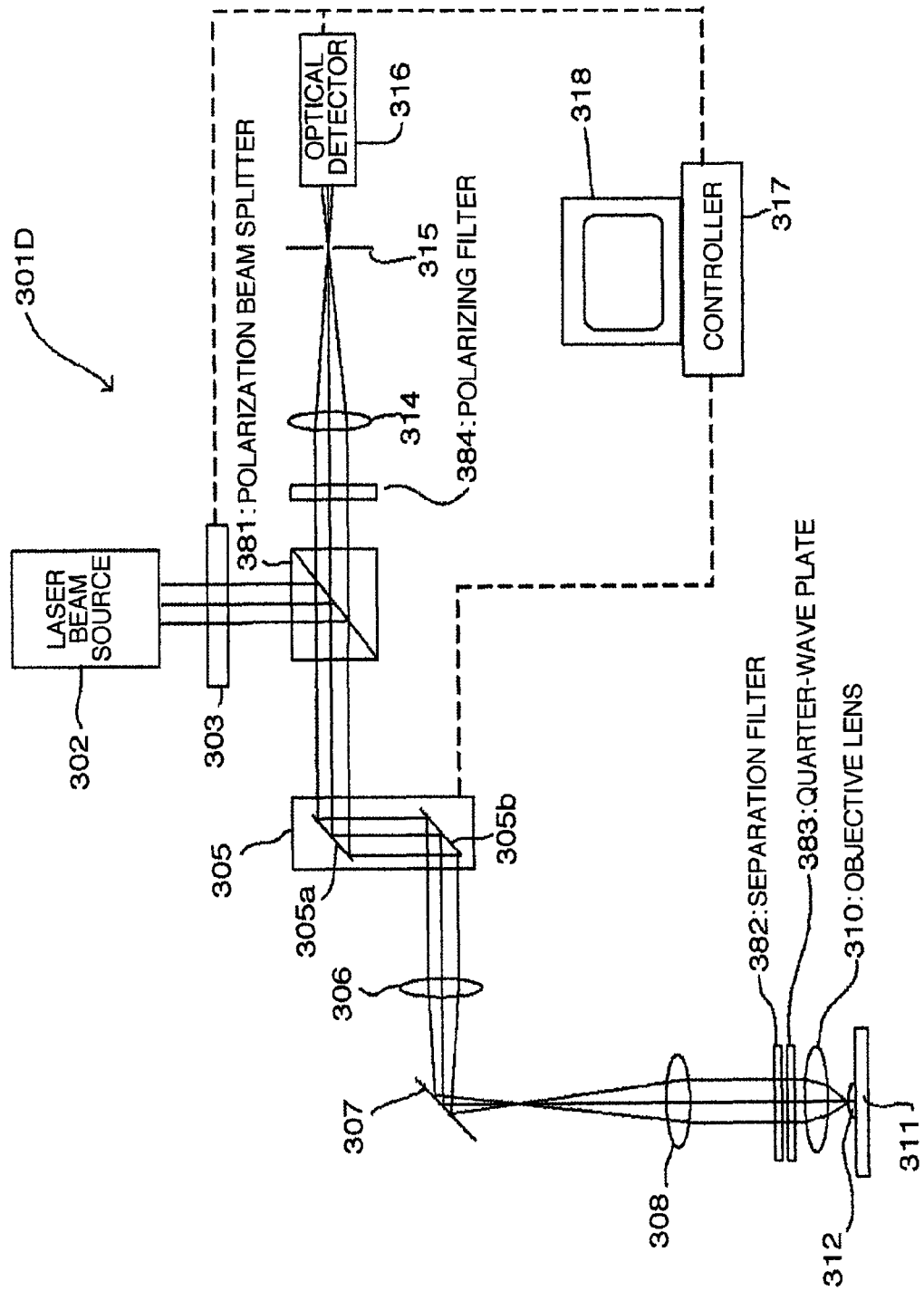
FIG. 32 is a block diagram showing a configuration of a microscope device according to Embodiment 17.
Figure 33:
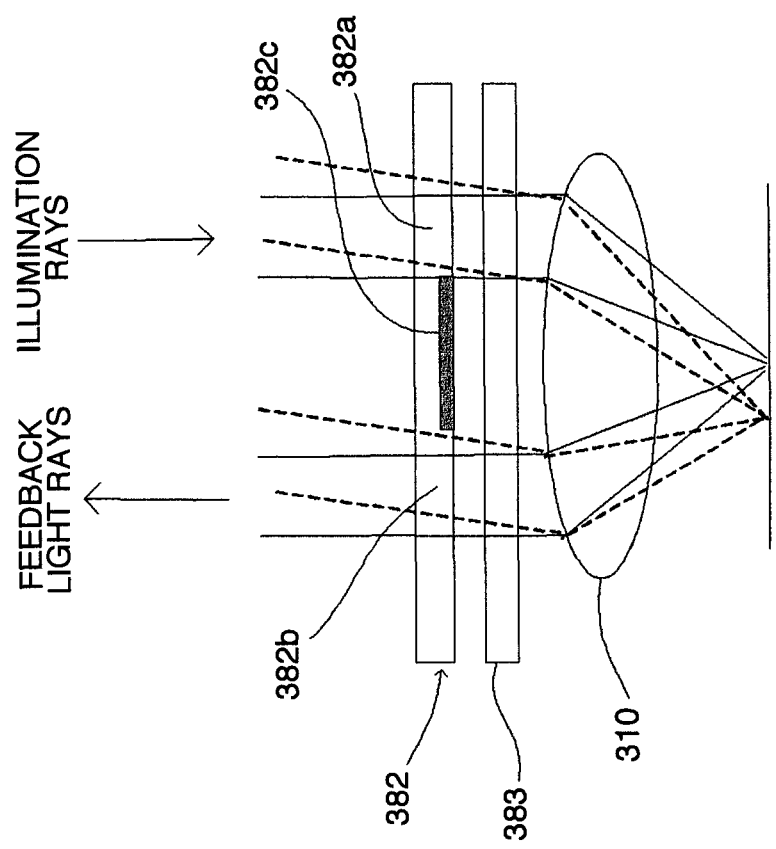
FIG. 33 is a view showing the function of a separation filter.

FIG. 32 is a block diagram showing the configuration of a microscope device 301D according to Embodiment 17. FIG. 33 is a view showing the function of a separation filter. Elements thereof, identical to those of Embodiment 10, are denoted by like reference numerals, omitting description thereof.

With the microscope device according to the present embodiment, the invention is applied to a microscope device wherein feedback light rays are reflected/scattered light rays instead of fluorescent rays.

As shown in FIG. 32, with the microscope device 301D according to the present embodiment, a polarization beam splitter 381 is used in place of the dichroic mirror 304 for Embodiment 10, and a polarizing filter 384 is used in place of the fluorescent filter 313. Further, a separation filter 382 making use of polarized light is adopted in place of the separation filter 309. As shown in FIG. 33, a right-side region 382a of the separation filter 382 is comprised of a polarizing filter whose polarization direction of linearly polarized light passing therethrough differs by 90 degrees from that of a polarizing filter of a left-side region 382b of the separation filter 382, and a light-blocking region 382c is provided between the right-side region 382a, and the left-side region 382b. Further, a quarter-wave plate 383 is inserted before an objective lens 310.

With the microscope device 301D made up as described above, a laser beam has linearly polarized light, and is reflected by the polarization beam splitter 381, subsequently, passing through the same optical path as shown in Embodiment 10 before entering separation filter 382. Herein, the linearly polarized light is transmitted through only the right-side region 382a of the separation filter 382, adapted to pass polarized light of the laser beam. The linearly polarized light is turned into circularly polarized light by the quarter-wave plate 383 to be focused by the objective lens 310. Reflected/scattered light rays from a focal point are collected by the objective lens 310 to pass through the quarter-wave plate 383 again, whereupon the reflected/scattered light rays are turned into polarized light differing in polarizing direction by 90 degrees from an incident laser beam to be transmitted through the left-side region 382b of the separation filter 382. In this case, since feedback light rays differ in polarizing direction from the right-side region 382a by 90 degrees, the feedback light rays cannot be transmitted through the right-side region 382a. The feedback light rays transmitted through the left-side region 382b return through an optical path of the laser beam in a reverse direction to be transmitted through the polarization beam splitter 381, subsequently, a polarized light component of the feedback light rays being selected by the polarizing filter 384 before detected by an optical detector 316 via a pin-hole 315.

Thus, with the microscope device according to Embodiment 17, it becomes possible to detect reflected/scattered light rays from a deep part of a living organism. Further, the optical system for irradiating the laser beam is separated from the optical system for detection, resolution in the direction of the optical axis is excellent. Furthermore, since the illumination optical system is made up independently from the detection optical system, light rays from various spots of the optical path of the illumination optical system, (the light rays being a cause of a noise), have difficulty in entering the optical path of the detection optical system, so that the microscope device is extremely good in S/N ratio, and is suitable for observation on a deep part of a texture.

Embodiment 18

There is described hereinafter a microscope device according to Embodiment 18 with reference to FIG. 34.

Figure 34:
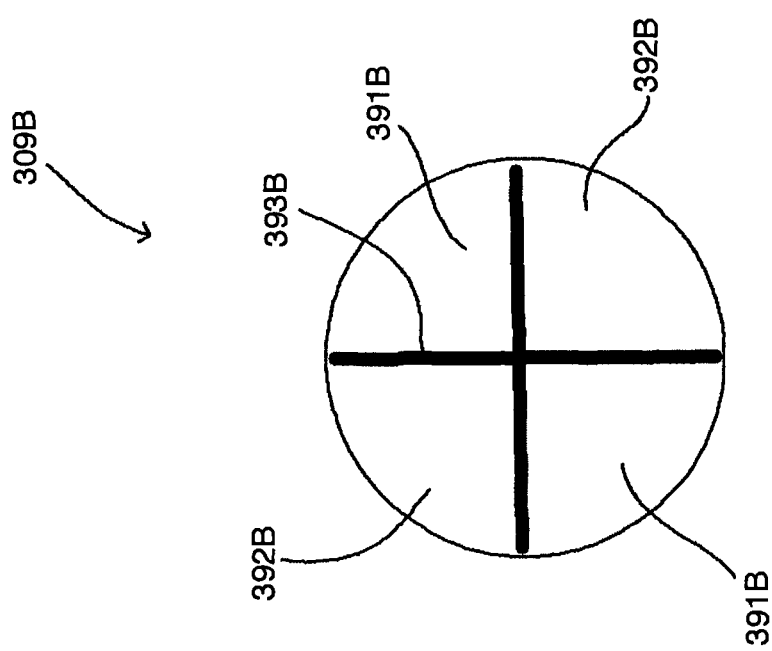
FIG. 34 is a view showing a structure of a separation filter according to Embodiment 18.

FIG. 34 is a view showing a structure of a separation filter 309B adopted in place of the separation filter 309 that is used in the microscope device 301 according to Embodiment 10. Elements of the present embodiments, other than that, are identical to those of Embodiment 10, omitting therefore description thereof.

With the separation filter 309B, regions for selecting light rays to be transmitted are radially disposed. As shown in FIG. 34, the separation filter 309B is comprised of regions 391B for allowing a laser beam only to pass therethrough, regions 392B for allowing fluorescent rays only to pass therethrough, and a light-blocking region 393B. The regions 391B are disposed at respective positions diametrically opposite to each other with respect to the optical axis, and the regions 392B are disposed in the same way.

In the separation filter 309B, the illumination optical system, and the detection optical system pass through respective opposing positions of the pupils of the objective lens 310, so that a focal point is reduced in size, thereby improving resolution.

An application scope of the third invention is not limited to those embodiments described as above. The third invention is widely applicable to a microscope device wherein a specimen is irradiated with illumination rays via an objective lens to thereby form a focal point of the illumination rays on the specimen while acquiring feedback light rays from the focal point via the objective lens before detection by a detector.

Now, there are described hereinafter the embodiments of the microscope device according to the fourth invention.

Embodiment 19

There is described hereinafter a microscope device according to Embodiment 19 with reference to FIGS. 35 to 38.

Figure 35:
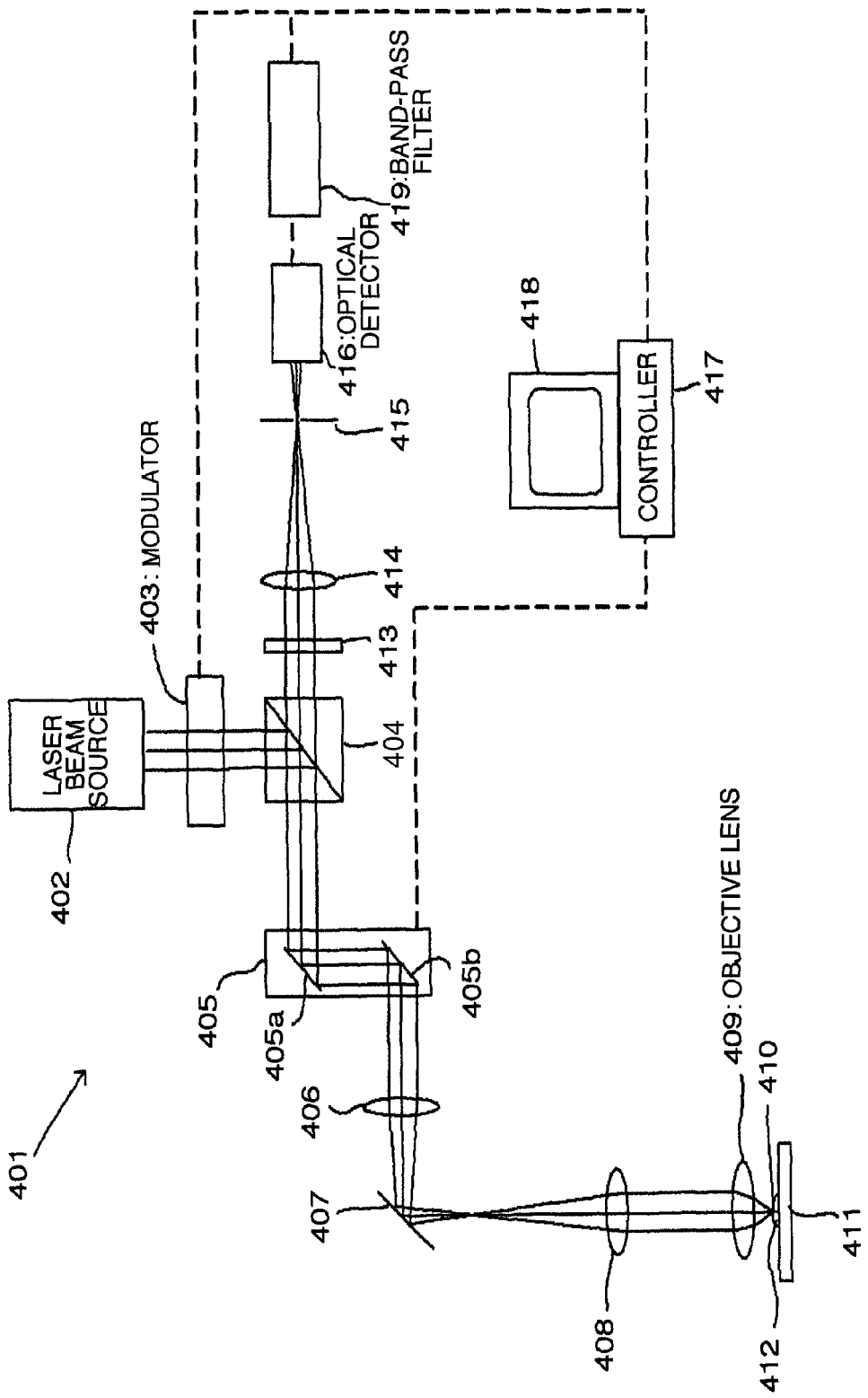
FIG. 35 is a block diagram showing a configuration of a microscope device according to Embodiment 19.

FIG. 35 is a block diagram showing the configuration of the microscope device according to Embodiment 19. As shown in FIG. 35, a microscope device 401 according to the present embodiment has a laser beam source 402 for outputting collimated light rays at a near infrared wavelength, and a modulator 403 is disposed in front of the laser beam source 402.

Figure 36:
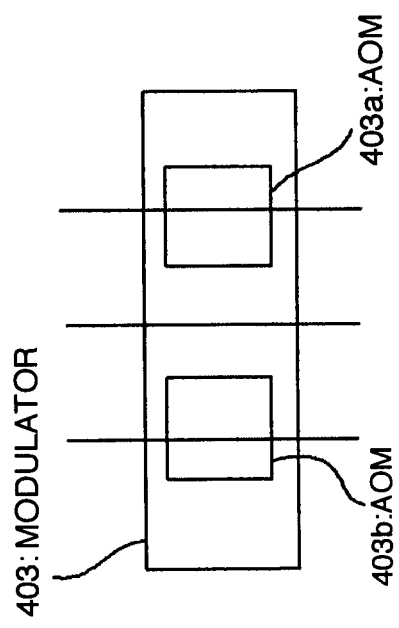
FIG. 36 is a view showing a configuration of a modulator.

FIG. 36 is a view showing a configuration of the modulator 403. As shown in FIG. 36, the modulator 403 comprises a first AOM (acoustooptic modulator element) 403a for modulating a portion of a laser beam, on the right side thereof, in FIG. 36, at a frequency f1=10.1 MHz, and a second AOM 403b for modulating a portion of the laser beam, on the left side thereof, in FIG. 36, at a frequency f2=10 MHz. The same effect can be obtained through modulation regardless of whether it is a case of intensity modulation, phase modulation, or frequency modulation.

As shown in FIG. 35, disposed further ahead of the modulator 403 are a dichroic mirror 404 for altering orientation of the laser beam, and a scanning optical unit 405 for scanning the laser beam.

The dichroic mirror 404 exhibits reflecting and transmission properties, variable depending on wavelength, having characteristics of reflecting the laser beam, and allowing fluorescent rays excited by the laser beam to be transmitted therethrough.

The scanning optical unit 405 comprises a variable mirror 405a rotatable around a rotation axis, and a variable mirror 405b rotatable around an axis substantially orthogonal to the rotation axis of the variable mirror 405a.

Further, the microscope device 401 according to the present embodiment is provided with a pupil projection lens 406 for converging light rays, a mirror 407 for deflecting the laser beam, an imaging lens 408, and an objective lens 409. Further, a stage 411 with a specimen 412 placed thereon is provided ahead of the objective lens 409.

Furthermore, a fluorescent filter 413 for causing fluorescent rays emitted from the specimen 412 to be selectively transmitted therethrough is provided in close proximity to the dichroic mirror 404 while a lens 414 for converging the fluorescent rays, a pin-hole member 415 with a pin-hole formed therein, and an optical detector 416 for detecting light rays having passed through the pin-hole of the pin-hole member 415 are sequentially disposed ahead of the fluorescent filter 413. A signal from the optical detector 416 is delivered to a controller 417 via a band-pass filter 419.

The controller 417 executes control of scanning with the scanning optical unit 405, acquisition of the signal from the optical detector 416, control of the modulator 403, and so forth. Furthermore, information is outputted to a display monitor 418.

There is described operation of the microscope device 401 according to the present embodiment hereinafter.

A specimen 412 with a fluorescence indicator to be excited by the laser beam from the laser beam source 402, introduced therein, is disposed on the stage 411.

The laser beam from the laser beam source 402 falls on the modulator 403, whereupon the portion of the laser beam, on the right side thereof, is modulated at the frequency f1=10.1 MHz by the AOM 403a, and the portion of the laser beam, on the left side thereof, is modulated at the frequency f2=10 MHz by the AOM 403b. Those laser beams are guided to the scanning optical unit 405 by the dichroic mirror 404 to be scanned in an optional direction by the scanning optical unit 405.

The laser beams further pass the pupil projection lens 406, the mirror 407 and the imaging lens 408 before falling on the objective lens 409. The laser beams each are converged by the objective lens 409, and respective convergence points are scanned on a focal plane by the scanning optical unit 405.

Figure 37:
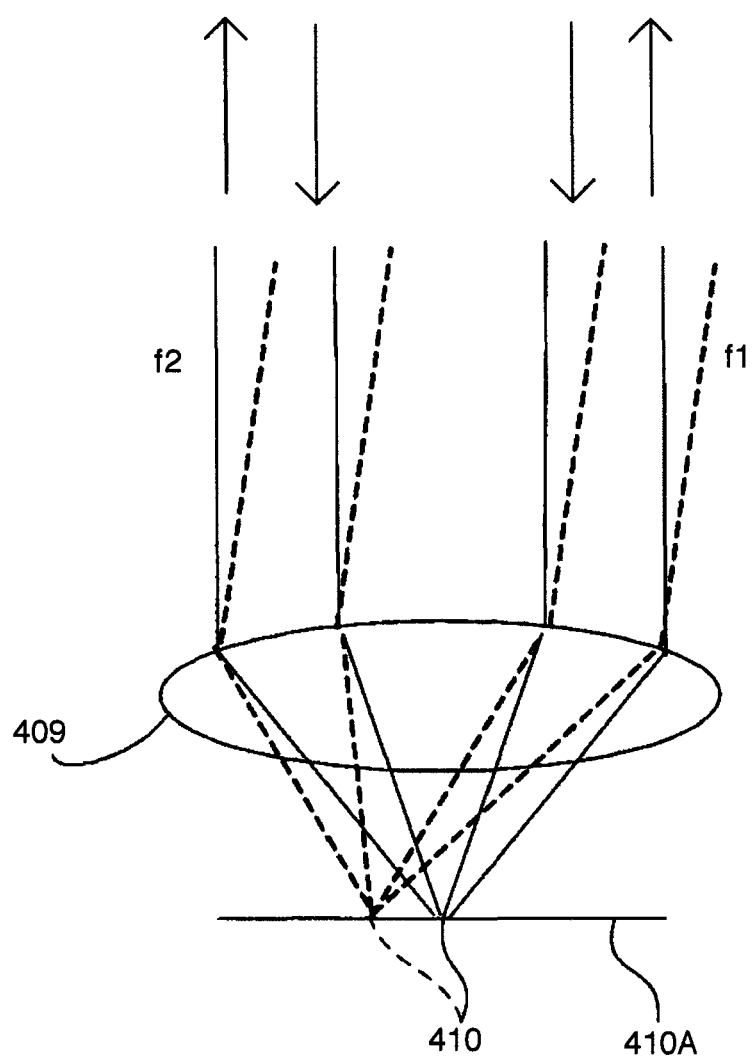
FIG. 37 is a view showing a way in which respective convergence points are scanned.

FIG. 37 is a view showing a way in which the respective convergence points are scanned. In FIG. 37, solid line, and dotted line each indicate a light flux of the laser beam for scanning.

As shown in FIG. 37, an incident angle of the laser beam falling on the objective lens 409 undergoes a change by the action of the scanning optical unit 405, whereupon the convergence point 410 is scanned on the focal plane 410A. The laser beam modulated at the frequency f1, and the laser beam modulated at the frequency f2 fall on the objective lens 409 at respective incident angles in relation thereto, differing from each other, so that respective optical paths thereof, from the objective lens 409 up to a point of focusing, are separate from each other without overlapping each other.

Figure 38:
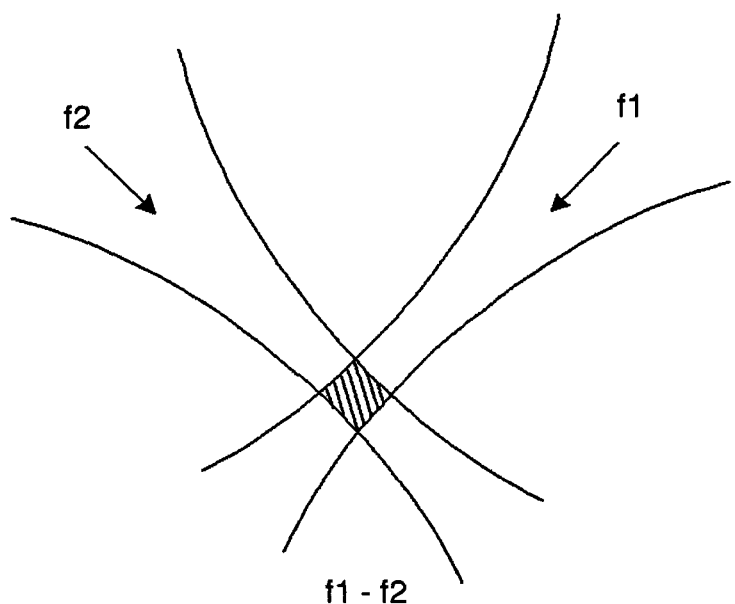
FIG. 38 is a view showing a region where laser beams subjected to modulation at different frequencies overlap each other.

FIG. 38 is a view showing a region where the laser beams subjected to modulation at different frequencies overlap each other. A hatched region of FIG. 38 indicates a region where two optical paths of the laser beams intersect each other. As shown in FIG. 38, the laser beams subjected to the respective modulations overlap each other only in this region. Interference between the two laser beams occurs only in this region, inducing intensity modulation at 100 kHz, as a difference frequency between the two laser beams. The fluorescence indicator contained in the specimen 412 is excited by the laser beams as modulated, thereby emitting fluorescent rays.

The fluorescent rays are captured by the objective lens 409, in the whole region thereof, to advance in a direction opposite from a direction in which the laser beam advances, being subsequently guided to the dichroic mirror 404 via the imaging lens 408, the reflecting mirror 407, the pupil projection lens 406, and the scanning optical unit 405. Further, the fluorescent rays are transmitted through the dichroic mirror 404, and a specific wavelength component of the fluorescent rays is selectively transmitted through the fluorescent filter 413, whereupon light rays only from the focal plane are selected by the lens 414 and the pin-hole member 415 before entering the optical detector 416.

An output signal from the optical detector 416 is delivered to the band-pass filter 419, whereupon frequencies only in the vicinity of 100 kHz, as a difference frequency, are extracted. The signal is further guided to the controller 417 to be converted into a digital signal in sync with scanning control, whereupon image data corresponding to a scanning position is prepared. The image data is displayed as images on the display monitor 418, or the image data is stored in the internal memory of the controller 417.

Further, it is possible to move the objective lens, or the specimen toward the optical axis of the objective lens by use of an actuator (not shown) to thereby observe images at different depths. Furthermore, it is also possible to operatively connect the scanning optical unit 405 to the actuator to thereby observe images in an optional section or three-dimensional information.

Thus, with the microscope device 401 according to the present embodiment, interference between two laser beams modulated at different frequencies is caused to occur only in an intersection region of respective focal points, and intensity modulation at a frequency corresponding to a difference in frequency between the two laser beams is applied only in the intersection region, so that the fluorescent rays only from this region has a frequency component corresponding to the difference in frequency. With the microscope device 401 according to the present embodiment, this frequency component only is extracted by the band-pass filter 419, so that it becomes possible to detect information on the fluorescent rays in the intersection region with an excellent S/N ratio, enabling information on the fluorescent rays at a deep part of a living organism to be acquired.

Further, if there is adopted a configuration wherein the optical axis of a right-side optical path of the laser beam intersects the optical axis of a left-side optical path of the laser beam, after the objective lens 409, so as to form approximately 90 degrees, the intersection region shown in FIG. 38 will be the smallest in size, in which case the best resolution can be obtained.

Furthermore, since the fluorescent rays only from the intersection region shown in FIG. 38 are extracted by the band-pass filter 419, the confocal effect can be gained without use of the pin-hole member 415, however, if the pin-hole is inserted, this will further enhance an S/N ratio.

With the present embodiment, the modulator 403 is disposed in front of the laser beam source, however, there is no limitation to a position of the modulator 403. The modulator 403 may be disposed, for example, at a spot of the optical path, after reflection by the dichroic mirror 404, or in the vicinity of the pupil of the objective lens 409. Otherwise, the modulator 403 may be inserted in the vicinity of the scanning optical unit 405 where the position of the pupil of the objective lens 310 is relayed.

Further, even if there is adopted a configuration wherein two optoelectronic modulator elements (EOM) are used in place of the modulator 403 to thereby apply phase modulation, or frequency modulation, the same effect can be gained. Still further, other modulation means may be used.

Yet further, the AOMs 403a, 403b each may be used as a frequency shifter. In such a case, if the laser beams are caused to fall on AOMs 403a, 403b driven at given frequencies differing from each other, and use is made of diffracted light subjected to frequency modulation, the same effect can be gained.

Further, as a light source for illumination, use of a light source short in interference distance is more preferable, and if a near infrared SLD (Super Luminescent Diode), white light, LED, and so forth are used as a light source, interference does not occur in a region where optical path lengths differs from each other, except for the vicinity of a focal point, thereby further enhancing an S/N ratio.

Still further, if use is made of extremely short pulsed light, the same effect can be gained.

Yet further, with the present embodiment, two modulated lights are overlapped one another by use of one unit of the objective lens, however, the invention is not limited thereto, and the modulated lights may be overlapped one another by use of a plurality of objective lenses with respective focal points aligned with each other.

Further, a nonlinear phenomenon arising due to excited light modulated at the difference frequency, in the intersection region, may be utilized. For example, multiphoton fluorescent rays generated by excited light as modulated may be detected. Furthermore, secondary harmonics rendering a wavelength of the excited light as modulated to be halved, and higher-order harmonics may be detected.

Still further, with the present embodiment, a component of the output signal, representing the difference between the two modulated frequencies, is extracted, however, depending on modulated frequencies to be used, a component of the output signal, representing a sum of the two modulated frequencies, may be extracted.

Furthermore, the variable mirror is shown as optical scanning means, however, the invention is not limited thereto, and use may be made of an acoustooptic deflection element, and an electric modulation deflection element. Further, scanning may be made on literature, a part or the whole of a microscope.

Thus, with the microscope device 401 according to the present embodiment, laser beams for illuminating a specimen are irradiated from different regions of the pupil of an objective lens after applying modulation at different frequencies thereto, and intensity modulation at a difference frequency is caused to occur in a region where convergence points of the two laser beams intersect each other, whereupon fluorescent rays are excited by the laser beams, thereby emitting fluorescent rays, and only a difference frequency component of the fluorescent rays as generated is extracted, so that the microscope device is extremely good in S/N ratio, and is suitable for observation on a deep part of a texture.

Embodiment 20

There is described hereinafter a microscope device according to Embodiment 20 with reference to FIG. 39. With microscope device according to Embodiment 20, reflected/scattered light rays are detected instead of detecting fluorescent rays.

Figure 39:
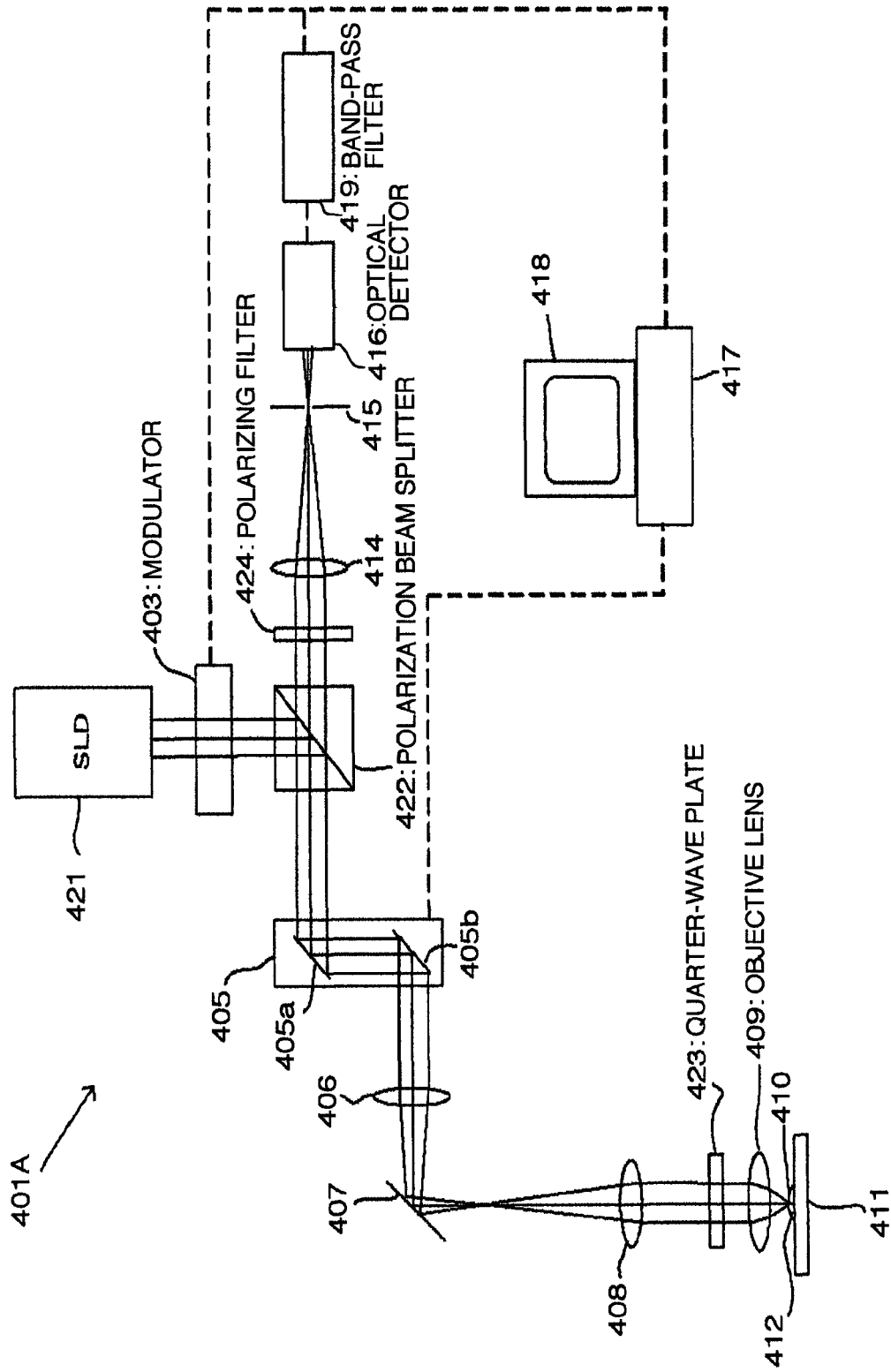
FIG. 39 is a block diagram showing a configuration of a microscope device according to Embodiment 20.

FIG. 39 is a block diagram showing a configuration of the microscope device according to Embodiment 20. In the figure, elements identical to those of Embodiment 19 are denoted by like reference numerals, omitting description thereof.

With the microscope device 401A according to the present embodiment, a near infrared SLD 421 (Super Luminescent Diode) emitting collimated light rays is used as a light source. Further, a polarization beam splitter 422 is used in place of the dichroic mirror 404 for Embodiment 19, and a polarizing filter 424 is used in place of the fluorescent filter 413. Further, a quarter-wave plate 423 is inserted before an objective lens 409.

A modulator 403 comprises a first AOM (acoustooptic modulator element) 403a for modulating a portion of a laser beam, on the right side thereof, in FIG. 36, at frequency f1=10.1 MHz, and a second AOM 403b for modulating a portion of the laser beam, on the left side thereof, in FIG. 36, at frequency f2=10 MHz.

Now, operation of the microscope device according to the present embodiment is described hereinafter.

The collimated light rays from the SLD 421 has linearly polarized light. The linearly polarized light is modulated by the modulator 403, and reflected by the polarization beam splitter 422, subsequently, passing through the same optical path as is shown in Embodiment 19 to be turned into circularly polarized light, respectively, by the quarter-wave plate 423, thereby forming a focal point by the action of the objective lens 409.

As is the case with Embodiment 19, interference is caused to occur only in an intersection region of the focal points, and intensity modulation at the difference frequency (100 kHz) is applied to the circularly polarized light. Reflected/scattered light rays from the focal point are collected by the objective lens 409 to pass through the quarter-wave plate 423 again, whereupon the reflected/scattered light rays are turned into polarized light differing in polarizing direction from incident light by 90 degrees to return through an optical path of the illumination rays, in the reverse direction, the polarized light subsequently being transmitted through the polarization beam splitter 422 this time, whereupon a polarized light component of the reflected/scattered light rays is selected by the polarizing filter 424 before detection by an optical detector 416 via a pin-hole member 415.

An output signal from the optical detector 416 is delivered to a band-pass filter 419, whereupon frequencies only in the vicinity of 100 kHz, as the difference frequency, are extracted. The signal is further guided to the controller 417 to be converted into a digital signal in sync with scanning control, whereupon image data corresponding to a scanning position is prepared. The image data is displayed as images on the display monitor 418, or the image data is stored in the internal memory of the controller 417.

Since the SLD 421 for use in the microscope device 401A outputs the collimated light rays having a coherence length on the order of about 10 μm, interference occurs only when optical path lengths are equal to each other. The collimated light rays undergo various scattering, but interference occurs only in the vicinity of a focal point where the optical path lengths become equal to each other. As it is possible to detect only feedback light rays due to interference light occurring in the vicinity of the focal point, information on the focal point can be detected with an excellent S/N ratio even by use of reflected/scattered light rays.

Further, instead of extracting the difference frequency (100 kHz), harmonics having a (f1-f2) component, generated in the intersection region, due to a nonlinear phenomenon, may be extracted.

Thus, with the microscope device 401A according to the present embodiment, coherent light for illuminating a specimen is irradiated from different regions of the pupil of an objective lens after applying modulation at different frequencies thereto, and intensity modulation at a difference frequency between two coherent lights is caused to occur in a region where convergence points of the two coherent lights intersect each other, whereupon only a difference frequency component of reflected/scattered light rays as emitted is extracted, so that reflected/scattered light rays from a deep part of a living organism can be detected with an excellent S/N ratio, and the microscope device is suitable for observation on a deep part of a texture.

Variations of the modulator 403 are described hereinafter. With the microscope device according to Embodiment 19, or Embodiment 20, modulators described hereunder can be substituted for the modulator 403.

Figure 40A:
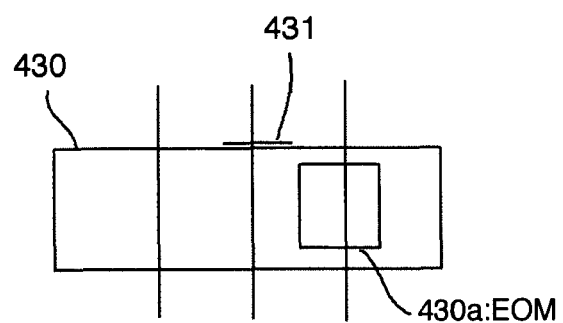
FIG. 40 is a view showing various modulators, in which FIGS. 40 (A), 40 (B) show respective modulators differing in structure.

FIG. 40(A) is a view showing a structure of another modulator 430.

As shown in FIG. 40(A), the modulator 430 comprises an electrooptical modulator element (EOM) 430a for applying phase modulation to a portion of an optical path, on the right side thereof, and a mask 431 for shielding the vicinity of the center of the optical path from light. Light rays subjected to phase modulation overlap the light rays not subjected to phase modulation in the intersection region, whereupon interference occurs to thereby cause intensity modulation at a modulated frequency, and excitation is caused by those light rays, so that fluorescent rays have the modulated frequency. The fluorescent rays are extracted by the band-pass filter 419 for allowing only a modulated frequency component to be transmitted therethrough. With adoption of such a configuration as described, the same effect as is obtained in the case of using the modulator 403 (FIG. 36) is obtained. Further, even if the AOM is inserted in place of the EOM 430a, and frequency shift is applied, the same effect can be obtained.

FIG. 4 (B) is a view showing a structure of still another modulator 440.

The modulator 440 comprises four sheets of mirrors 441, 442, 443, 444, two trapezoidal prisms 445, 446, and two piezoelectric elements 447, 448 for applying vibration to the trapezoidal prisms 445, 446, respectively.

Figure 40B:
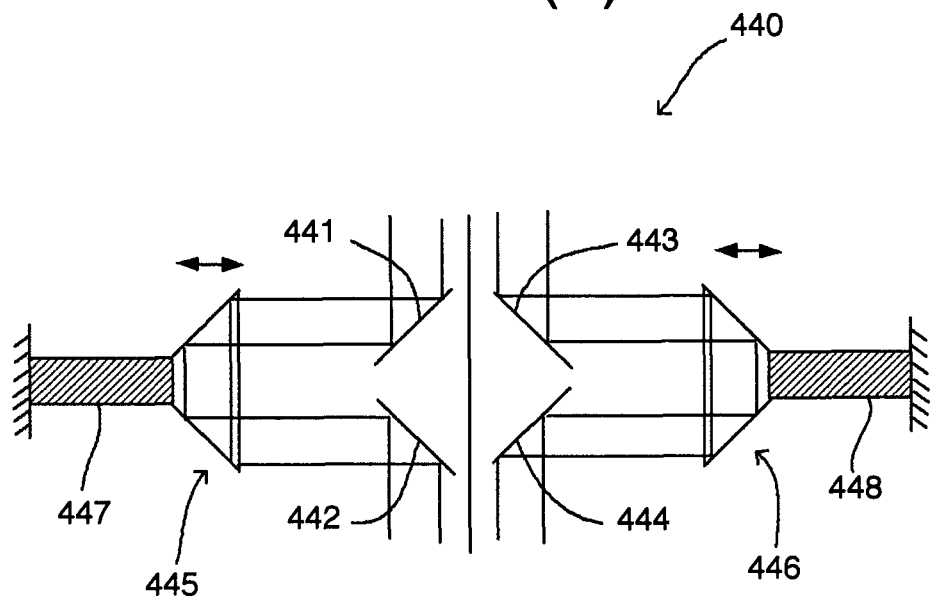

In FIG. 40(B), a portion of a light beam, on the right side thereof, is sequentially reflected by the mirror 443, the trapezoidal prism 446, and the mirror 444 to outgo downward. Further, in FIG. 40(B), a portion of a light beam, on the left side thereof, is sequentially reflected by the mirror 441, the trapezoidal prism 445, and the mirror 442 to outgo downward.

With the modulator 440, a portion of an optical path, on the right side thereof, is extracted by the mirror 443 to cause the trapezoidal prism 446 to make a reciprocating motion in a transverse direction in FIG. 40 (B) by vibrating the piezoelectric element 448 at a frequency f1, whereupon phase modulation at the frequency f1 is given to the portion of the light beam, on the right side thereof. Similarly, a portion of an optical path, on the left side thereof, is extracted by the mirror 441 to cause the trapezoidal prism 445 to make a reciprocating motion in a transverse direction in FIG. 40(B) by vibrating the piezoelectric element 447 at a frequency f2, whereupon phase modulation at the frequency f2 is given to the portion of the light beam, on the left side thereof.

With the modulator 440, modulation is given in the same way as the modulator 403 by changing the inner optical path lengths.

Figure 41A:
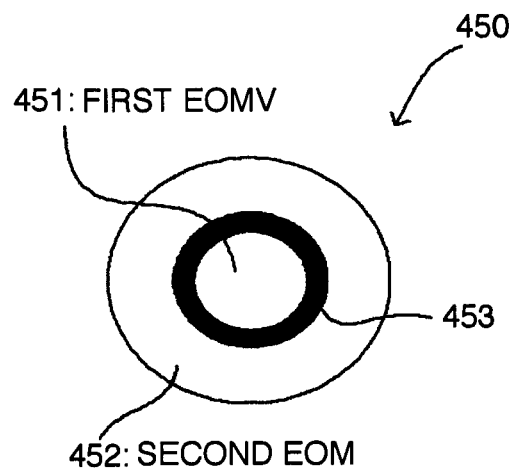
FIG. 41 is a view showing structures, and so forth of modulators, in which FIG. 41 (A) is a view of a modulator, as seen from the direction of a light source, and FIG. 41 (B) is a view showing an intersection region of light beams.

FIG. 41(A) is a view of yet another modulator 450, as seen from the direction of a light source.

A first EOM 451 is provided at the central part of an optical axis, a second EOM 452 is provided on the periphery of the optical axis, and provided therebetween is a light-blocking mask 453.

Figure 41B:
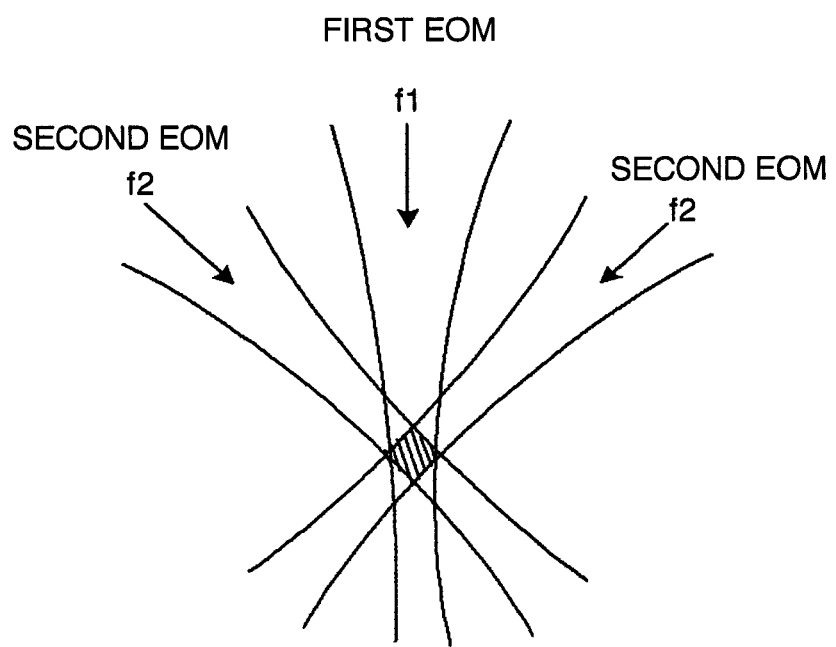

With the modulator 450, the modulation at the frequency f1 is applied to the first EOM 451 at the central part of the optical axis, and the modulation at the frequency f2 is applied to the second EOM 452 on the periphery of the optical axis, FIG. 41(B) is a view showing an intersection region of the light beams. As shown in the figure, the light beam subjected to the modulation at the frequency f1 from the center of the objective lens 409, and the light beam subjected to the modulation at the frequency f2 from the periphery of the optical axis fall on the objective lens 409, respectively, to intersect each other at the central part. As a result, it is possible to cause the intensity modulation at the difference frequency to occur only in the intersection region indicated by hatching. By so doing, the same effect as is obtained in the case of using the modulator 403 is obtained.

A way in which the optical paths are separated from each other is not limited to the above. As long as the same effect is obtained, any pattern may be adopted. Further, use may be made of light beams subjected to respective modulations at not less than three frequencies.

Figure 42:
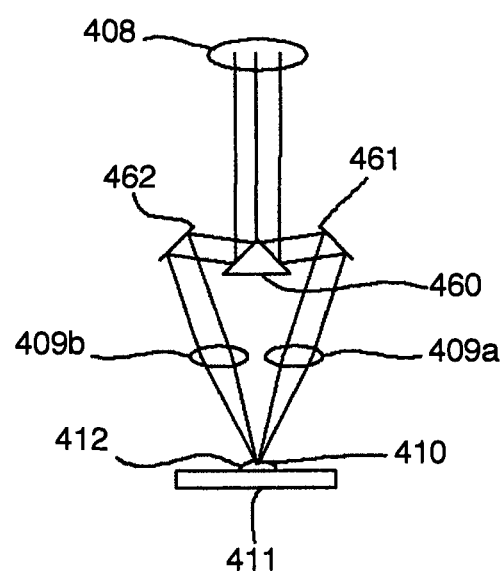
FIG. 42 is a view of a variation of the periphery of an objective lens.

FIG. 42 is a view of a variation of the periphery of the objective lens 409, showing only a part of the optical path, ahead of the imaging lens 408. As shown in the figure, a light beam is divided into two portions proceeding in respective directions by a prism 460 to be reflected by mirrors 461, 462, before falling on two objective lenses 409a, 409b, disposed such that respective optical axes are in parallel with each other. As shown in the figure, light beams having passed through the two objective lenses 409a, 409b are focused at an identical focal point 410. In this case, the two objective lenses 409a, 409b are disposed such that respective focal planes thereof coincide with each other, and the light beams are scanned with respective focal points in agreement with each other, so that the same effect as that in the case of Embodiment 19.

Embodiment 21

FIG. 43 is a block diagram showing a configuration of a microscope device according to Embodiment 21. In the figure, elements identical to those of Embodiments 19, 20 are denoted by like reference numerals, omitting description thereof.

As shown in FIG. 43, a microscope device 401B according to the present embodiment has an SLD element 470 emitting diverging light at a near infrared wavelength, short in coherence length, and disposed in front of the SLD element 470 is a beam splitter 472 for bifurcating the diverging light.

Light rays reflected by the beam splitter 472 are adapted to pass through a first EOM (optoelectronic modulator element) 403a, one of two modulators. Further, light rays having passed through the beam splitter 472 are adapted to be reflected by a mirror 473 disposed ahead of the beam splitter 472, subsequently passing through a second EOM 403b.

Herein, the EOM 403a is adapted to apply phase modulation at a frequency f1=10.1 MHz to the light rays passing therethrough, and the EOM 403b is adapted to apply phase modulation at a frequency f2=10 MHz to the light rays passing therethrough. Those EOM 403a, and EOM 403b each are electrically connected to a controller 417.

A mirror 475, a wedge prism 476, and a first objective lens 477 are disposed ahead of the EOM 403a, as shown in the figure. Further, a mirror 474, a wedge prism 478, and a second objective lens 479 are disposed ahead of the EOM 403b.

The two objective lenses 477, 479 are disposed such that respective focal point positions substantially coincide with each other, and respective optical axes intersect each other at a focal point 410. Further, a specimen 412 is placed at the focal point 410 on a motor-driven stage 482 movable in X-Y-Z-directions in which the specimen is scanned. Furthermore, two optical paths from the SLD element 470 up to the focal point 410 are made up so as to be equal in length to each other.

A detection lens 480, a fluorescent filter 481, and an optical detector 416 are disposed between the two objective lenses 477, 479. The optical detector 416 is connected to a controller 417 via a band-pass filter 419.

The controller 417 executes control of scanning on the motor-driven stage 482, acquisition of the signal from the optical detector 416, control of the modulator 403, and so forth. Or, information is outputted to a display monitor 418.

Now, operation of the microscope device 401B according to the present embodiment is described hereinafter.

The specimen 412 with a fluorescence indicator to be excited by the diverging light from the SLD element 470, introduced therein, is placed on the motor driven stage 482.

The diverging light from the SLD element 470 is collimated by a collimator lens 471 to be bifurcated by the beam splitter 472, subsequently falling on the EOMs 403a, 493b, respectively. The light rays having passed through the EOM 403a undergoes the phase modulation at the frequency f1=10.1 MHz, and the light rays having passed through the EOM 403b undergoes the phase modulation at the frequency f2=10 MHz.

The light rays having passed through the EOM 403a are reflected by the mirror 475 to be changed in orientation by the wedge prism 476, and are subsequently focused at the focal point 410 by the action of the first objective lens 477. Further, the light rays having passed through the EOM 403b are reflected by the mirror 474 to be changed in orientation by the wedge prism 478, and are subsequently focused at the same focal point 410 by the action of the second objective lens 479.

Interference between the two diverging lights occurs in close proximity to the focal point 410, whereupon intensity modulation at 100 kHz, as a difference frequency between the two diverging lights, is induced. The fluorescence indicator contained in the specimen 412 is excited by the diverging light as modulated, thereby emitting fluorescent rays.

The fluorescent rays are collected by the detection lens 480 and only a specific wavelength component of the fluorescent rays are selected by the fluorescent filter 481 to be then detected by the optical detector 416. An output signal from the optical detector 416 is delivered to the band-pass filter 419, whereupon frequencies only in the vicinity of 100 kHz, as a difference frequency, are extracted to be sent out to the controller 417.

Further, the controller 417 scans the motor-driven stage 482 and acquires fluorescence information on the specimen in a desired section such a section in the horizontal direction, vertical direction, and so forth to be outputted to the display monitor 418.

The present embodiment has the same effect as that in the case of Embodiment 19.

Further, with the present embodiment, use is made of the SLD light source emitting light rays having a coherence length on the order of about 10 μm, as is the case with Embodiment 20, and interference therefore occurs only when the optical path lengths are equal to each other. The light rays undergo various scattering at the specimen 412, but interference occurs only in the vicinity of a focal point where the optical path lengths become equal to each other. As it is possible to extract information according to fluorescent rays emitted due to the interference occurring in the vicinity of the focal point, information on the focal point can be detected with an excellent S/N ratio.

With present embodiment, there is shown the case where the respective focal point positions of the two objective lenses coincide with each other by way of example, however, the invention is not limited thereto. The same effect can be gained even in the case of a configuration wherein two light beams intersect each other in the vicinity of the focal point.

An application scope of the fourth invention is not limited to those embodiments described as above. The fourth invention is widely applicable to a microscope device wherein a specimen is irradiated with flash light rays, and feedback light rays from the specimen, on the basis of the flash light rays, are detected.

What is claimed is:

1. A microscope device, comprising:
    a laser beam source that outputs illumination rays;
    a modulator disposed in front of the laser beam source and configured to separate the illumination rays output from the laser beam source into at least two portions, and to modulate at least one of the at least two portions of the illumination rays;
    objective lenses disposed ahead of the modulator and configured to guide the at least two portions of the illumination rays such that respective optical paths overlap each other on a specimen;
    a detection means for detecting feedback light rays generated by interference light occurring in a region where the respective optical paths overlap each other; and
    a control device configured to receive a signal from the detection means and control the modulator, wherein
    the specimen is irradiated with the at least two portions of the illumination rays,
    the detection means detects the feedback light rays emitted from the specimen based on the at least two portions of the illumination rays,
    optical paths of the at least two portions of the illumination rays between the respective objective lenses and a focal point are separated from each other so as not to overlap each other,
    the feedback light rays are fluorescent rays, and the detection means detects the fluorescent rays generated by the interference light,
    the detecting means comprises an optical detector and a band-pass filter,
    a signal is delivered to the band-pass filter from the optical detector, and
    modulations at given frequencies differing from each other are applied to at least two portions of the illumination rays, and intensity modulation varying at a sum of, or a difference between at least two frequencies is induced by the interference light occurring at a focal point on the specimen.

2. The microscope device according to claim 1, wherein
    the objective lenses cause the at least two portions of the illumination rays to form only one focal point on the specimen, and
    the detection means acquires the feedback light rays generated by an interference light occurring at the only one focal point via the objective lenses for detection.

3. The microscope device according to claim 1, wherein the modulation is any of phase modulation, intensity modulation, and frequency modulation, a signal of the light rays generated by the interference light is acquired, and a frequency component corresponding to the sum of, or the difference between the at least two frequencies is extracted.

4. The microscope device according to claim 1, wherein at least two portions of the illumination rays fall on the objective lenses, respectively, as parallel rays, each being light rays smaller in size than a diameter of a pupil of the objective lens at a pupil position of the objective lens where no overlapping occurs.

5. The microscope device according to claim 1, wherein a region where the illumination rays overlap each other is scanned, and the detection means detects the feedback light rays from the respective focal points is scanned.

6. The microscope device according to claim 1, wherein the band-pass filter is an electrical band-pass filter.

* * * * *